US012801563B1

(12) United States Patent
Leather et al.

(10) Patent No.: US 12,801,563 B1
(45) Date of Patent: Nov. 17, 2026

(54) MULTI-PROCESSOR IC

(71) Applicant: OXMIQ Labs Inc., Campbell, CA (US)

(72) Inventors: Mark Leather, San Rafael, CA (US); Jiasheng Chen, Folsom, CA (US); Micah Villmow, Santa Clara, CA (US); Rajabali M. Koduri, San Francisco, CA (US)

(73) Assignee: OXMIQ Labs Inc., Campbell, CA (US)

( * ) Notice: Subject to any disclaimer, the term of this patent is extended or adjusted under 35 U.S.C. 154(b) by 0 days.

(21) Appl. No.: 18/916,650

(22) Filed: Oct. 15, 2024

Related U.S. Application Data

(60) Provisional application No. 63/574,855, filed on Apr. 4, 2024, provisional application No. 63/574,850, filed on Apr. 4, 2024.

(51) Int. Cl.
*G06F 9/30* (2018.01)
*G06F 9/38* (2018.01)
*G06F 15/80* (2006.01)

(52) U.S. Cl.
CPC ............ *G06F 15/80* (2013.01); *G06F 9/3877* (2013.01); *G06F 9/3885* (2013.01)

(58) Field of Classification Search
CPC ....... G06F 15/80; G06F 9/3877; G06F 9/3885
See application file for complete search history.

(56) References Cited

U.S. PATENT DOCUMENTS

| | | | |
|---|---|---|---|
| 4,949,250 A | 8/1990 | Bhandarkar et al. | |
| 6,192,384 B1 | 2/2001 | Dally et al. | |
| 6,389,489 B1 | 5/2002 | Stone et al. | |
| 6,581,154 B1 | 6/2003 | Zaidi | |
| 6,624,818 B1 | 9/2003 | Mantor et al. | |
| 6,708,331 B1 | 3/2004 | Schwartz | |
| 8,631,256 B2 | 1/2014 | Henry et al. | |
| 8,776,030 B2 | 7/2014 | Grover et al. | |
| 8,842,122 B2 * | 9/2014 | Nordlund .............. | G06T 15/005 345/522 |
| 8,930,676 B2 | 1/2015 | Henry et al. | |
| 8,943,119 B2 | 1/2015 | Hansen et al. | |
| 9,189,828 B2 * | 11/2015 | Gorchetchnikov ... | G06F 9/5027 |
| 9,483,318 B2 | 11/2016 | Vajapeyam | |
| 9,710,748 B2 | 7/2017 | Ross et al. | |
| 10,540,156 B2 | 1/2020 | Mineda | |
| 11,409,568 B2 | 8/2022 | Jiang et al. | |
| 11,487,846 B2 | 11/2022 | Mills et al. | |

(Continued)

OTHER PUBLICATIONS

Jiang et al.; Towards Highly Efficient DGEMM on the Emerging SW26010 Many-core Processor; 2017; IEEE (Year: 2017).*

(Continued)

*Primary Examiner* — Corey S Faherty
(74) *Attorney, Agent, or Firm* — ADELI LLP

(57) ABSTRACT

Some embodiments provide an integrated circuit (IC) including multiple processor cores placed in an arrangement on one IC die. The processor cores form a multi-core processor system and include a leader processor core and a plurality of worker cores. The leader processor core receives instructions that the multi-core processor system has to execute and distributes sets of instructions to the worker processor cores to execute in order to effectuate the execution of the received instructions.

22 Claims, 23 Drawing Sheets

(56) References Cited

U.S. PATENT DOCUMENTS

| | | | |
|---|---|---|---|
| 11,507,527 B2 | 11/2022 | Saleh et al. | |
| 11,797,410 B2 | 10/2023 | Ganapathy et al. | |
| 11,893,392 B2 * | 2/2024 | Kim | G06F 9/30036 |
| 2005/0223199 A1 | 10/2005 | Grochowski et al. | |
| 2007/0283337 A1 | 12/2007 | Kasahara et al. | |
| 2009/0083516 A1 | 3/2009 | Saleem et al. | |
| 2009/0113404 A1 | 4/2009 | Takayama et al. | |
| 2010/0023731 A1 | 1/2010 | Ito | |
| 2010/0146495 A1 | 6/2010 | Song et al. | |
| 2010/0158408 A1 | 6/2010 | El-Mahdy et al. | |
| 2012/0246654 A1 | 9/2012 | Eichenberger et al. | |
| 2013/0155080 A1 * | 6/2013 | Nordlund | G06T 15/005 345/522 |
| 2013/0191848 A1 | 7/2013 | Chapman et al. | |
| 2013/0298133 A1 | 11/2013 | Jones et al. | |
| 2014/0052923 A1 | 2/2014 | Ikeda | |
| 2014/0130052 A1 | 5/2014 | Lin et al. | |
| 2014/0181476 A1 | 6/2014 | Srinivasan et al. | |
| 2014/0310467 A1 | 10/2014 | Shalf et al. | |
| 2015/0106596 A1 | 4/2015 | Vorbach et al. | |
| 2015/0149745 A1 | 5/2015 | Eble et al. | |
| 2015/0220369 A1 * | 8/2015 | Vajapeyam | G06F 9/4881 718/105 |
| 2016/0283240 A1 | 9/2016 | Mishra et al. | |
| 2016/0321048 A1 | 11/2016 | Matsuura | |
| 2016/0350245 A1 | 12/2016 | Shen et al. | |
| 2017/0083318 A1 | 3/2017 | Burger et al. | |
| 2018/0181380 A1 | 6/2018 | Kasahara et al. | |
| 2018/0260360 A1 | 9/2018 | Samadi et al. | |
| 2018/0301119 A1 | 10/2018 | Koker et al. | |
| 2018/0322381 A1 * | 11/2018 | Liu | G06N 3/063 |
| 2018/0336456 A1 | 11/2018 | Norrie et al. | |
| 2019/0065150 A1 | 2/2019 | Heddes et al. | |
| 2019/0146857 A1 * | 5/2019 | LeBeane | G06F 9/542 719/313 |
| 2019/0347125 A1 | 11/2019 | Sankaran et al. | |
| 2020/0026568 A1 | 1/2020 | Harris | |
| 2020/0218540 A1 | 7/2020 | Kesiraju et al. | |
| 2020/0250088 A1 | 8/2020 | Barner et al. | |
| 2020/0334196 A1 | 10/2020 | Nassif et al. | |
| 2022/0012573 A1 | 1/2022 | Nagendran et al. | |
| 2022/0012934 A1 | 1/2022 | Gruen et al. | |
| 2022/0114234 A1 | 4/2022 | George et al. | |
| 2022/0171631 A1 * | 6/2022 | Kim | G06F 9/30036 |
| 2022/0197718 A1 | 6/2022 | Drepper | |
| 2022/0405228 A1 | 12/2022 | Tan et al. | |
| 2022/0413865 A1 | 12/2022 | Masanamuthu Chinnathurai et al. | |
| 2022/0414052 A1 | 12/2022 | Li et al. | |
| 2022/0414817 A1 | 12/2022 | Zad Tootaghaj et al. | |
| 2023/0004393 A1 | 1/2023 | Madduri et al. | |
| 2023/0029176 A1 | 1/2023 | Ray et al. | |
| 2023/0090973 A1 | 3/2023 | Ray et al. | |
| 2023/0205692 A1 | 6/2023 | Nori et al. | |
| 2023/0229588 A1 | 7/2023 | Aggarwal et al. | |
| 2023/0297643 A1 | 9/2023 | Shivam et al. | |
| 2023/0305978 A1 | 9/2023 | Davis et al. | |
| 2023/0315410 A1 | 10/2023 | Yang et al. | |
| 2023/0342211 A1 | 10/2023 | Kim | |
| 2024/0020119 A1 | 1/2024 | Tran | |
| 2024/0037183 A1 | 2/2024 | Du et al. | |
| 2024/0054081 A1 | 2/2024 | Blixt | |
| 2024/0086246 A1 | 3/2024 | Doiron | |
| 2024/0160448 A1 | 5/2024 | Nagata et al. | |
| 2024/0193844 A1 | 6/2024 | Fowler et al. | |
| 2024/0220250 A1 | 7/2024 | Wu | |
| 2024/0220254 A1 | 7/2024 | Mei et al. | |
| 2024/0394117 A1 | 11/2024 | Hu et al. | |
| 2024/0403013 A1 | 12/2024 | Gartmann | |
| 2025/0004861 A1 | 1/2025 | Barik et al. | |
| 2025/0181551 A1 | 6/2025 | Chakraborty et al. | |
| 2025/0190367 A1 | 6/2025 | Abraham et al. | |
| 2025/0298759 A1 | 9/2025 | Guim Bernat et al. | |
| 2025/0307343 A1 | 10/2025 | Garegrat | |

OTHER PUBLICATIONS

Kamaleldin, Ahmed, et al., "AGILER: An Adaptive Heterogeneous Tile-Based Many-Core Architecture for RISC-V Processors," Apr. 18, 2022, IEEE.

Author Unknown, "What is PyTorch, and How Does It Work: All You Need to Know," Simplilearn, Nov. 7, 2023, retrieved from https://semiwiki.com/semiconductor-manufacturers/tsmc/313540-inverse-lithography-technology-a-status-update/.

Diamant, Ron, et al., "Accelerate deep learning and innovate faster with AWS Trainium", Amazon Web Services, AWS re:Invent, Nov. 28-Dec. 2, 2022, Las Vegas, NV.

Gupta, Pradeep, "CUDA Refresher: The CUDA Programming Model", Nvidia, Jun. 26, 2020, retrieved from https://developer.nvidia.com/blog/cuda-refresher-cuda-programming-model/.

Hsu, Kuan-Chieh, et al., "Simultaneous and Heterogeneous Multi-threading," MICRO '23: Proceedings of the 56th Annual IEEE/ACM International Symposium on Microarchitecture, Toronto, ON, CA, Oct. 28-Nov. 1, 2023, pp. 137-152, ACM.

Lam, Chester, "Hot Chips 2023: AMD's Phoenix SoC," Chips and Cheese, Sep. 16, 2023, retrieved from https://chipsandcheese.com/p/hot-chips-2023-amds-phoenix-soc.

Mcafee, David, "On-Chip AI Integration is the Future of PC Computing", AMD, Sep. 28, 2023, retrieved from https://www.amd.com/en/blogs/2023/on-chip-ai-integration-is-the-future-of-pc-computi.html.

Non-Published Commonly Owned U.S. Appl. No. 18/916,645, filed Oct. 15, 2024, 113 pages, OXMIQ Labs Inc.

Non-Published Commonly Owned U.S. Appl. No. 18/916,646, filed Oct. 15, 2024, 113 pages, OXMIQ Labs Inc.

Non-Published Commonly Owned U.S. Appl. No. 18/916,647, filed Oct. 15, 2024, 113 pages, OXMIQ Labs Inc.

Non-Published Commonly Owned U.S. Appl. No. 18/916,648, filed Oct. 15, 2024, 113 pages, OXMIQ Labs Inc.

Non-Published Commonly Owned U.S. Appl. No. 18/916,649, filed Oct. 15, 2024, 84 pages, OXMIQ Labs Inc.

Non-Published Commonly Owned U.S. Appl. No. 18/916,652, filed Oct. 15, 2024, 85 pages, OXMIQ Labs Inc.

Non-Published Commonly Owned U.S. Appl. No. 18/916,654, filed Oct. 15, 2024, 84 pages, OXMIQ Labs Inc.

Non-Published Commonly Owned U.S. Appl. No. 18/916,656, filed Oct. 15, 2024, 103 pages, OXMIQ Labs Inc.

Non-Published Commonly Owned U.S. Appl. No. 18/916,657, filed Oct. 15, 2024, 85 pages, OXMIQ Labs Inc.

Sathe, Tejas, "Tutorial: A quick overview of tensorflow2.0," Analytics Vidhya, Aug. 1, 2020, retrieved from https://medium.com/analytics-vidhya/tutorial-a-quick-overview-of-tensorflow2-0-b28e5c6906fa.

Screen captures from YouTube video clip entitled "Meteor Lake: AI Acceleration and NPU Explained", 4 pages, uploaded on Dec. 11, 2023 by Intel Technology. Retrieved from Internet: https://www.youtube.com/watch?v=QSzNoX0qpIE.

* cited by examiner

MULTI-PROCESSOR IC

CLAIM OF BENEFIT TO PRIOR APPLICATIONS

This application claims the benefit of U.S. Provisional Patent Application 63/574,850 and U.S. Provisional Patent Application 63/574,855, both filed Apr. 4, 2024. U.S. Provisional Patent Applications 63/574,850 and 63/574,855 are both incorporated herein by reference.

BACKGROUND

In recent years, there has been an exponential trajectory in the demand for efficient and large-scale computation. There are many fields today that have ever-increasing need for compute resources. Examples of such fields include Artificial Intelligence (AI), image processing, robotics, automated driving, data mining, etc. It is estimated that the world will need one million times more compute with dramatically improved memory integration and capacity, to meet the needs of the world in the near future.

In addition, many computationally intensive applications need to store and process an ever-increasing amount of data in the memories of the devices on which these applications operate. However, in many systems today, the compute and memory architectures are not designed in a robust integrated manner, which slows the speed of memory access for the compute resources of these systems.

Many in recent years have turned to developing and using Graphics Processing Units (GPUs) to provide the desired computation resources. However, GPUs have many limitations that are not optimal for many applications today. Additionally, GPU architectures have many limitations that are sub-optimal for many of these applications.

Some silicon design teams are attempting to design new central processor, graphics processor and tensor processor designs. However, many of the new designs being proposed still cannot efficiently execute different programs that are based on different programming paradigms. Examples of such programming paradigms include Single Program Multiple Data (SPMD), Multiple Program Unstructured Data (MPUD), Single Program Unstructured Data (SPUD), Single Program Structured Data (SPSD), Matrix Operations Structured Data (MOSD), and Matrix Operations Unstructured Data (MOUD).

BRIEF SUMMARY

Some embodiments of the invention provide a processor core arrangement that includes several heterogeneous processor cores, each of which includes at least two different types of processor sub-cores. This processor core arrangement is defined on one integrated circuit (IC) die in some embodiments. One example of a heterogeneous processor core arrangement is an array of heterogeneous processor cores.

In some embodiments, each heterogeneous processor core in the processor core arrangement includes at least (1) one scalar processor sub-core that is optimal for processing scalar-based instructions (i.e., instructions that involve operations, e.g., computations, on scalar data, also called scalar operands below), (2) one a vector sub-core that is optimal for processing vector-based instructions (i.e., instructions that involve operations, e.g., computations, on vector data, also called vector operands below), and (3) one matrix sub-core that is optimal for processing matrix-based instructions (i.e., instructions that involve operations, e.g., computations, on matrix data, also called matrix operands below). For brevity, these operations are referred to as scalar instructions, vector instructions and matrix instructions below. Also, in the discussion below, a processor core with at least one scalar processor sub-core, at least one vector processor sub-core and at least one matrix processor sub-core is called an SVM (scalar, vector, matrix) processor core, or SVM core.

In some embodiments, two or more of the different processor sub-cores of each heterogeneous processor core share at least one cache (e.g., the scalar, vector and matrix sub-cores of an SVM core all share at least one cache, e.g., an L2 cache). Also, in some embodiments, two or more of the different processor sub-cores of each heterogeneous processor core share at least one set of registers (e.g., the vector and matrix sub-cores of an SVM core share one set of registers).

In some embodiments, one SVM core in an SVM core array is designated as a leader SVM core of the array and the other SVM cores of the array are designated as worker SVM cores. The leader core in some embodiments is the core that is responsible for distributing the core array's workload (e.g., sets of instructions, or commands, that the core array has to execute) to the worker cores to execute. In some embodiments, the leader core (1) receives sets of instructions (e.g., from a host computer's CPU) for the core array to execute, (2) from the received instruction sets, generates sets of instructions (also called work items or command bundles) for the worker cores to execute, and (3) distributes the generated sets of instructions (i.e., distributes the work items) to the worker cores to execute. In some embodiments, the leader core can also act as a worker core that executes its generated sets of instructions, while in other embodiments, the leader core cannot be a worker core.

In some embodiments, the sets of instructions that the leader core receives are not tied to any specific resource of the core array. For instance, the received sets of instructions do not account for the number of cores in the core array, for the actual sizes of registers of the cores of the core array, etc. The received sets of instructions in some embodiments are expressed in terms of a virtual instruction set architecture (ISA) format that is not tied to the specific types of resources used by the cores of the core array. This allows the programs and/or devices that provide the received instruction sets for execution to have no knowledge of the internal structure and/or workings of the core array. In these embodiments, the leader core generates, from the virtual ISA (vISA) instructions, physical ISA (pISA) instructions (i.e., instructions specified in terms of a pISA format) that are tied to the resources of the core array or at least take into account the resources of the core array. In some embodiments, the pISA instructions account for (e.g., are tied to) the sizes of the registers of the cores, the number of cores in the core array, etc.

In generating the sets of instructions for execution, the leader core can also generate multiple instances of one set of instructions (i.e., multiple work items) for multiple executions by multiple worker cores in parallel. This parallel computing of one set of instructions increases the throughput of the core array when one set of instructions has to be executed multiple times. For example, in some embodiments, one set of instructions is executed multiple times in parallel by a set of worker cores to output multiple values of one parameter.

The leader core generation of the instruction sets is part of the leader core's compiler capability in some embodiments.

The leader core's compiler operation transforms the received sets of instructions from a format that is not associated with the specific resources of the core array (e.g., a vISA format) to a format that is associated with or takes into account the specific resources of the core array (e.g., a pISA format). In addition to this compiler capability, the leader core can also perform re-compiling operations in some embodiments. A re-compiling operation replaces a set of instructions (e.g., a set of code, a set of commands) that the leader core identifies as being sub-optimal for the resources of the core array or sub-optimal in general, with another set of instructions (e.g., commands) that are deemed to be more optimal for the resources of the core array or more optimal in general.

In some embodiments, the leader core distributes the generated sets of instructions to the worker cores through a pull model. In this model, the leader core stores each generated set of instructions in a queue for retrieval by a worker core (e.g., a worker core that is idle). In some embodiments, the leader core notifies the worker cores that it has stored one or more new work items (i.e., one or more new instruction sets) in the queue for retrieval by any worker core that is available for processing a new work item. In other embodiments, the leader core distributes the generated sets of instructions to the worker cores through a push model. In one such push model, the leader core directly sends to a worker core a work item that the leader core has assigned to the worker core for execution by that worker core.

In some embodiments, SVM cores of an SVM core array have an interconnect fabric that communicatively links the SVM cores to each other. Some embodiments also use multiple SVM core arrays to form larger multi-processor systems. In some such embodiments, each SVM core array is a distinct compute block (CB) with interconnect fabric that connects the core array to other core arrays (i.e., to other compute blocks).

The multi-processor system of some embodiments includes multiple CBs in a single CB arrangement (e.g., one CB array), and the CBs in this arrangement (e.g., array) share one or more memory units. In some such embodiments, one particular CB can access a memory unit that is a "local" memory unit of the particular CB as it is near the particular CB (e.g., is a physical adjacent neighbor of the CB), or can access a more "remote" memory unit that is not a neighbor of the particular CB (e.g., is not physically adjacent to the particular CB) or is not near the particular CB.

In the multi-processor system of some embodiments, multiple CBs in a CB array share a common memory address space to access several memory units shared among the CBs. In some embodiments, one example of a remote memory unit for a particular CB is a memory unit that is a local memory unit of another CB (e.g., as it is a physically adjacent neighbor of the other CB), where the other CB does not neighbor the particular CB in the CB array. Other embodiments define a remote memory unit for a particular CB differently (e.g., specify that the remote memory unit is a memory unit on another CB than the particular CB).

In some embodiments, all the CBs that use the common memory address space to access a common set of memory units use one memory addressing scheme to access all the memory units. In other words, all the CBs in these embodiments use a common set of addresses to access all the memory units that are within one address space as each location in each memory is identifiable through just one address.

Other embodiments allow CBs to access memories through local addresses for local memories of the CBs and through global addresses for remote memories of the CB. In other words, a particular CB in some embodiments uses a local addressing scheme to access a memory that is local to the particular CB, but uses a global addressing scheme to access a remote memory that is not local to the particular CB (e.g., a memory that is not near the particular CB or does not neighbor the particular CB). However, in some of these embodiments, the local and remote memories of the CBs are within one common memory address space as each location in any memory is addressable through one unique local address and one unique global address.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a processor core arrangement that includes several heterogeneous processor cores, each of which includes at least two different types of processor sub-cores. This processor core arrangement is defined on one integrated circuit (IC) die in some embodiments. One example of a heterogeneous processor core arrangement is an array of heterogeneous processor cores.

In some embodiments, each heterogeneous processor core in the processor core arrangement includes at least (1) one scalar processor sub-core that is optimal for processing scalar-based instructions (i.e., instructions that involve operations, e.g., computations, on scalar data, also called scalar operands below), (2) one vector sub-core that is optimal for processing vector-based instructions (i.e., instructions that involve operations, e.g., computations, on vector data, also called vector operands below), and (3) one matrix sub-core that is optimal for processing matrix-based instructions (i.e., instructions that involve operations, e.g., computations, on matrix data, also called matrix operands below). For brevity, these instructions are referred to as scalar instructions, vector instructions and matrix instructions below. Also, in the discussion below, a processor core with at least one scalar processor sub-core, at least one vector processor sub-core and at least one matrix processor sub-core is called an SVM (scalar, vector, matrix) processor core, or SVM core.

In some embodiments, two or more of the different processor sub-cores of each heterogeneous processor core share at least one cache (e.g., the scalar, vector and matrix sub-cores of an SVM core all share at least one cache, e.g., an L2 cache). Also, in some embodiments, two or more of the different processor sub-cores of each heterogeneous processor core share at least one set of registers (e.g., the vector and matrix sub-cores of an SVM core share one set of registers).

Figure 1:
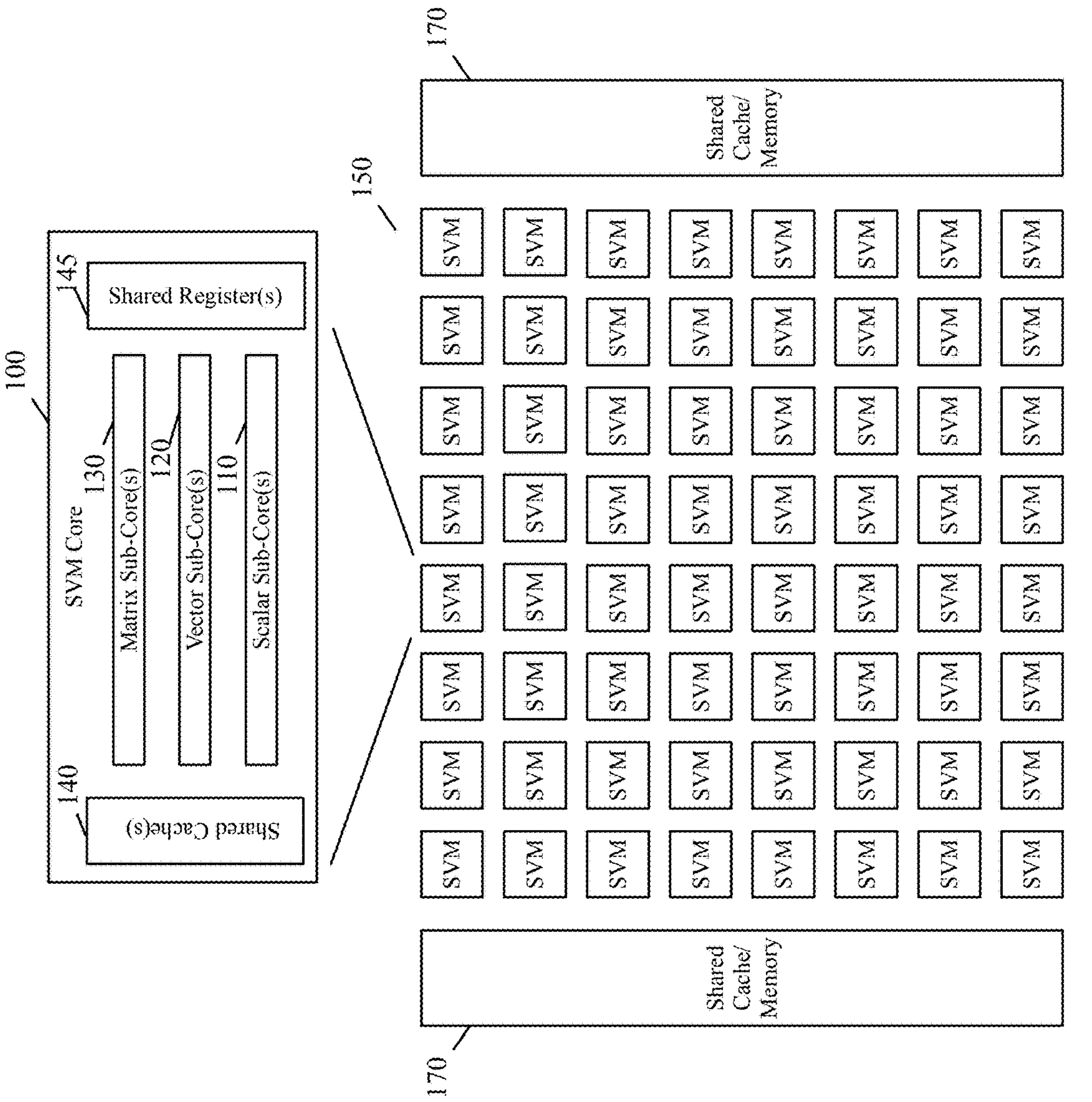
FIG. 1 conceptually illustrates an example processor core array formed with a novel heterogenous core architecture.

FIG. 1 conceptually illustrates an example of a processor core array 150 that includes the novel heterogenous processor cores of some embodiments. In this example, the array is an 8×8 array that is formed by 64 identical SVM cores 100 arranged in eight rows and eight columns. In other embodiments, the SVM cores in the SVM cores are not identical. Also, in other embodiments, the SVM core array can have any arbitrary dimensions, e.g., can be any N×M array, with N and M as two integer values that are equal or different.

In some embodiments, the processor core array 100 serves as a hardware accelerator on a device (e.g., a computer) on which the array operates and performs a subset of operations that the device's processor (e.g., the computer's central processing unit, CPU) passes to the array. Several examples of this hardware accelerator operation of the core array will be described below. In other embodiments, the processor core array is the main processor resource of the device on which the array operates.

Each SVM core 100 in the processor core array 150 includes three different types of sub-cores. Specifically, each SVM core 100 includes one or more scalar sub-cores 110, one or more vector sub-cores 120, and one or more matrix sub-cores 130. Each SVM core 100 also includes one or more shared caches 140 and one or more shared registers 145. Also, the different SVM cores 100 in the array 150 in some embodiments share cache and/or memory units, as further described below.

In some embodiments, the different sub-cores 110-130 of each SVM core 100 are optimal for executing different types of instructions. For instance, in some embodiments, the scalar sub-core 110 is optimal for executing a scalar instruction, the vector sub-core 120 is optimal for executing a vector instruction, and the matrix sub-core 130 is optimal for executing a matrix instruction.

In some embodiments, each of the sub-cores 110-130 includes at least a control unit, an Arithmetic Logic Unit (ALU), and one or more other components, such as program counters, registers, etc. In some embodiments, the control units of the scalar, vector, and matrix sub-cores decode instructions that respectively specify scalar, vector, and matrix operations. The control unit of each sub-core in some embodiments decodes the instructions that the sub-core has to execute.

In some embodiments, each sub-core's ALU performs one or more types of ALU operations that are needed to effectuate execution of the instruction decoded by its associated control unit. Examples of these operations include arithmetic operations (e.g., add, subtract, multiply, divide, etc.), logic operations (e.g., bitwise logic operations such as "AND" operations and "OR" operations), and/or bit shift operations. As further described below, the ALUs of the scalar, vector, and matrix sub-cores 110-130 in some embodiments can respectively perform scalar, vector, and matrix operations on respectively scalar, vector, and matrix data in one clock cycle (e.g., for performing computations on scalar, vector, and matrix operands in one clock cycle).

A control unit of a sub-core in some embodiments is responsible for directing the operations of its sub-core. In some embodiments, a control unit controls the execution of one instruction by fetching the instruction, decoding the instruction to produce one or more control signals, fetching any required data needed for the execution of the decoded instructions, and directing (via the produced control signals) the ALU of its sub-core to execute the instruction. A control unit of a sub-core can be a hardware control unit or a software control unit (e.g., a microcode engine executed by a scalar processor, such as a small RISC-V core).

In some embodiments, the vector and matrix sub-cores 120-130 of one SVM core 100 share one control unit (while having different ALUs). This shared control unit can be employed within one of the sub-cores 120-130 or external to the sub-cores 120-130 but still part of the SVM core 100. Alternatively, in some embodiments, the vector and matrix sub-cores 120-130 have their own separate control units. In some embodiment, the scalar sub-core 110 of an SVM core 100 has its own control unit for directing the execution of scalar instructions.

In some embodiments, the control unit of the scalar sub-core 110 also dispatches instructions to execute to the vector and matrix sub-cores 120-130 of its SVM core 100. As further described below, these dispatched instructions are in some embodiments stored in one or more instruction input queues from which they are retrieved by the control unit of the vector sub-core 120 or the matrix sub-core 130. The control unit of the vector sub-core 120 or the matrix sub-core 130 has a load/store (LD/ST) engine in some embodiments that retrieves any data needed for execution of the instructions in the input queue. In other embodiments, this LD/ST engine is not part of the control unit of the vector sub-core 120 or the matrix sub-core 130.

In some embodiments, a vector sub-core 120 is a processor core that, in one clock cycle, can operate on an entire one-dimensional vector (1) that is identified in one instruction and (2) that is up to a certain size (e.g., 1-by-X size, where X is an integer) supported by the sub-core's ALU. In other words, the vector sub-core 120 in some embodiments can execute, in one clock cycle, a vector instruction (e.g., an instruction specifying a vector operation) with a vector as the instruction's operand.

In some embodiments, a vector instruction includes (1) a field specifying an opcode that identifies a set of one or more operations to perform and (2) one or more fields that specify an operand on which to perform the set of operations. In some embodiments, the operand fields include (1) a vector register specifier field identifying a particular vector register that has the first element of the vector, and (2) a length field specifying the number of elements in the vector. In some embodiments, all of the elements of a vector are of the same type (e.g., all elements are floating point numbers or integers or characters).

In some embodiments, a vector sub-core 120 has one or more specialty components that allow it to execute vector instructions in one cycle. Examples of such specialty components include (1) registers that efficiently store and access vector data and (2) one or more ALUs that efficiently perform vector computations. In some embodiments, the vector ALU of the vector sub-core 120 optimally performs operations on vector data. For instance, the vector ALU of the vector sub-core of some embodiments can perform in one clock cycle a vector computation on a vector operand. To perform such a computation in one clock cycle, the vector ALU in some embodiments has one or more specialty components, such as a vector multiply unit, a vector adder unit, etc. In some embodiments, the specialty components allow the vector ALU to perform in one clock cycle several computations in parallel on several elements of the vector operand, so that the vector ALU can complete a vector computation on the vector operand in one clock cycle.

In some embodiments, a matrix sub-core 130 is a processor core that, in one clock cycle, can operate on an entire two-dimensional matrix (1) that is identified in one instruction and (2) that is up to a certain size (e.g., X-by-Y size, where X and Y are integers) supported the sub-core's ALU. In other words, the matrix sub-core 130 in some embodiments can execute, in one clock cycle, a matrix instruction (e.g., an instruction specifying a matrix operation) with a matrix as the instruction's operand.

In some embodiments, a matrix instruction includes (1) a field specifying an opcode that identifies a set of one or more operations to perform and (2) one or more fields that specify an operand on which to perform the set of operations. In some embodiments, the operand fields include (1) a matrix register specifier field identifying a particular matrix register that has the first element of the matrix, (2) a first length field specifying the number of elements in the matrix in a first dimension of the matrix, and (3) a second length field specifying the number of elements in the matrix in a second dimension of the matrix. The matrix instructions in some embodiments are not limited to specifying 2D matrices but can specify tensors in three or more dimensions. In some embodiments, all of the elements of a matrix or higher-dimensional tensor are of the same type (e.g., all elements are floating point numbers or integers or characters).

In some embodiments, a matrix sub-core 130 has one or more specialty components that allow it to execute matrix instructions in one cycle. Examples of such specialty components include (1) registers that efficiently store and access matrix data and (2) one or more ALUs that efficiently perform matrix computations (e.g., 2D matrix computations or tensor computations in 3D or higher dimensions. In some embodiments, the matrix ALU of the matrix sub-core 130 optimally performs operations on matrix data (e.g., 2D matrix data, 3D or higher dimensional tensor data, etc.). For instance, the matrix ALU of the matrix sub-core of some embodiments can perform in one clock cycle a matrix computation on a matrix operand. To perform such a computation in one clock cycle, the matrix ALU in some embodiments has one or more specialty components, such as a matrix multiply unit, a matrix adder unit, etc. In some embodiments, the specialty components allow the matrix ALU to perform in one clock cycle several computations in parallel on several elements of the matrix operand, so that the matrix ALU can complete a matrix computation on the matrix operand in one clock cycle.

In some embodiments, a scalar sub-core 110 is a processor core that, in one clock cycle, can operate on one or more scalar operands specified by a scalar instruction. The scalar sub-core 110 of some embodiments has a scalar ALU that performs scalar operations (e.g., scalar computations) on scalar data. This scalar ALU in some embodiments does not have specialty components (e.g., vector or matrix multipliers, vector or matrix adders, etc.) to allow the scalar ALU to perform in one clock cycle vector or matrix operations (e.g., calculation) on the vector or matrix operand sizes on which the vector or matrix ALU of the vector or matrix sub-core operates in one clock cycle.

Figure 2:
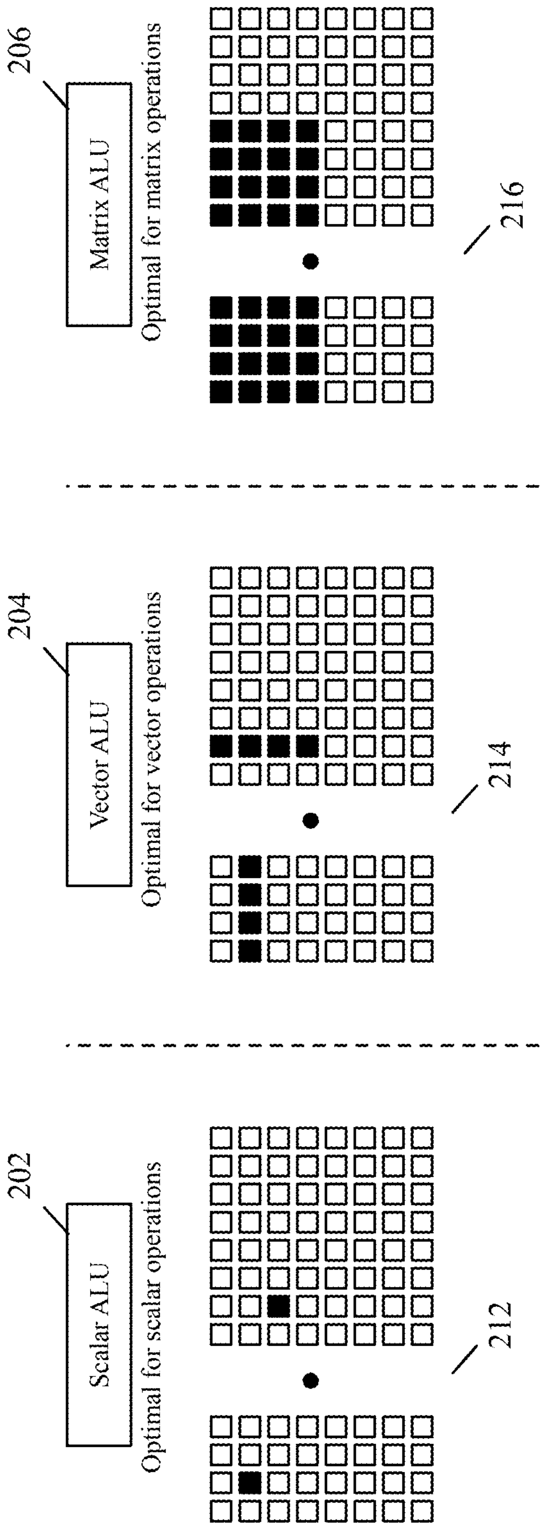
FIG. 2 conceptually illustrates examples of scalar, vector, and matrix computations performed by a scalar ALU, a vector ALU, and a matrix ALU.

FIG. 2 conceptually illustrates examples of scalar, vector, and matrix computations performed by a scalar ALU 202, a vector ALU 204, and a matrix ALU 206. This figure illustrates that the different types of ALUs optimally perform computations on different sized data units. Specifically, this figure shows the scalar ALU 202 performing a computation 212 involving two scalar values. It also shows the vector ALU 204 performing a computation 214 on two N-element vectors. Lastly, this figure shows a matrix ALU 206 performing a computation 216 on two 4×4 matrices.

In some embodiments, the scalar ALU not having specialty vector or matrix components does not prevent the scalar ALU from performing vector or matrix operations (e.g., computations), but rather just prevents the scalar ALU from performing these operations as efficiently (e.g., as quickly) as the vector and matrix ALUs. Similarly, in some embodiments, the vector ALU not having specialty matrix components does not prevent the vector ALU from performing matrix operations (e.g., computations), but rather just prevents the vector ALU from performing these operations as efficiently (e.g., as quickly) as the matrix ALUs.

Accordingly, one of ordinary skill in the art will realize that, in some embodiments, a scalar sub-core 110 can perform vector and matrix operations, a vector sub-core 120 can perform scalar and matrix operations, and a matrix sub-core 130 can perform scalar and vector operations. However, other embodiments only allow the scalar sub-core of an SVM core to perform scalar operations, the vector sub-core of the SVM core to perform vector operations, and the matrix sub-core of the SVM core to perform matrix operations.

As the scalar, vector and matrix ALUs of the scalar, vector and matrix sub-cores perform optimally on different sized data units, some embodiments use these sub-cores for different types of operations (e.g., for different types of tasks). For instances, some embodiments use the scalar sub-cores 110 for general purpose operations that are today typically performed by CPU cores, use the vector sub-cores 120 for operations (e.g., image processing operations, vector-based neural-network operations, other vector-based AI operations, etc.) that are today typically performed by Graphics Processing Unit (GPU) cores, and use the matrix sub-cores 130 for operations (e.g., matrix-based neural network operations, other matrix-based AI operations, etc.) that are today typically performed by Tensor Processing Unit (TPU) cores.

Using different types of sub-cores 110-130 in each SVM core 100 of the core array 150 allows for more efficient execution of instructions of many different types that are based on many different programming paradigms, such as Multiple Program Unstructured Data (MPUD), Single Program Unstructured Data (SPUD), Single Program Structured Data (SPSD), Matrix Operations Structured Data (MOSD), Matrix Operations Unstructured Data (MOUD), and Single Program Multiple Data (SPMD). Different processor core architectures (e.g., CPU architectures, GPU architectures, and TPU architectures) are optimal for executing programs that are based on different programming paradigms. Hence, the core array 150 is very efficient at executing many different types of programs that are based on many different programming paradigms as it has many heterogeneous cores, each of which has three different types of sub-cores that are optimal for one or more of the different programming paradigms.

While some embodiments use the scalar sub-cores of the SVM cores to parallel process the same or different scalar instructions, other embodiments do not use the scalar sub-cores of the SVM cores for parallel processing of the scalar instructions. Instead, some embodiments just use the scalar sub-core 110 of some, most, or all of the SVM cores to receive instructions that its respective SVM core has to process and to dispatch the operations(s) that are needed for the execution of these instructions to the vector sub-core 120 and/or matrix sub-core 130 of its SVM core to perform (e.g., dispatch the received vector or matrix instructions to the vector sub-core 120 or matrix sub-core 130 to execute).

The different sub-cores 110-130 of one SVM core 100 in some embodiments operate asynchronously. In such embodiments, the scalar sub-core 110 is able to continue performing operations (e.g., executing scalar instructions and/or dispatching vector/matrix instructions to the vector/matrix sub-cores 120-130, etc.) without waiting for the vector and/or matrix sub-cores 120-130 to finish executing earlier dispatched operations (e.g., earlier dispatched instructions). In some embodiments, as discussed in more detail below, the scalar sub-core 110 enqueues operations for the vector and/or matrix sub-cores in a set of input queues for the vector and matrix sub-cores 120-130 (e.g., a shared input queue or a set of separate input queues for the sub-cores), and the vector and/or matrix sub-cores 120-130 retrieve these operations from the set of input queues in order to execute these operations asynchronously. This asynchronous execution allows for even higher performance and greater efficiency of the SVM core 100 and the array 150.

In some embodiments, a common instruction set architecture (ISA) is used to define the instructions for execution by the different sub-cores of all the SVM cores 100 in the array 150. For example, in some embodiments, the instructions processed by the sub-cores 110-130 of the SVM cores 100 are Reduced Instruction Set Computer (RISC) format, or RISC V (RISC-V) format with one or more extensions (such as vector extensions and matrix extensions). RISC-V is an open standard ISA based on established RISC principles. In other embodiments, the instructions processed by the sub-cores 110-130 of the SVM cores 100 are Complex Instruction Set Computer (CISC) format.

Using a common ISA to define the operations for the scalar, vector, and matrix sub-cores allows program developers to have a unified approach for specifying scalar, vector, and matrix operations needed for a large variety of different computational tasks. Also, in some embodiments, the common ISA allows the developers to specify the desired sub-cores for executing different types of instructions. The common ISA in some embodiments is at a more abstract level that does not account for some of the more specific features of the SVM core array, such as the number cores in the array, the sizes of the registers, etc. Hence, some embodiments employ compilers that convert the abstract instructions specified through the common ISA to instructions that are tied to all of the specific features of the SVM cores.

Instead of the developer selecting the different sub-cores, or in conjunction with this functionality, the compilers of some embodiments are designed to proactively select different types of sub-cores for execution of different types of operations, e.g., to specify a vector sub-core for executing a vector instruction and a matrix sub-core for executing a matrix instruction. The compilers of some embodiments also compile to the common ISA legacy programs that have been written for legacy CPU, GPU, and/or TPU architectures, and then compile these common ISA instructions to instructions for execution by the SVM cores of the processor core array 150.

The above-described compiling operations are further described in a concurrently filed U.S. patent application Ser. No. 18/916,645, entitled "Generation and Distribution of Commands for Parallel Execution at Core Array", which is incorporated herein by reference. In still other embodiments, the compilers compile the legacy programs that have been written for legacy CPU, GPU and TPU architectures directly to instructions for execution by the SVM cores of the processor core array 150. This is also further described in the above-incorporated U.S. Patent Application.

As mentioned above, two or more sub-cores of an SVM core 100 in some embodiments share a set of registers. For instance, in some embodiments, the vector and matrix sub-cores 120 and 130 share a set of registers 145 to store data while executing vector and matrix instructions. Alternatively, in other embodiments, all three sub-cores 110-130 share the registers 145 to use while executing scalar, vector, and matrix instructions. In addition to the shared registers, one or more of the sub-cores 110, 120, and 130 of one SVM core 100 in some embodiments have their own set of dedicated registers that they do not share with the other sub-cores of the SVM core.

As mentioned above, two or more sub-cores of an SVM core 100 in some embodiments share one or more caches 140. In some embodiments, the shared cache 140 is shared among all three sub-cores 110-130 of the SVM core 100, while in other embodiments the shared cache 140 is shared among only two of the sub-cores 110-130 of the SVM core 100 and not the other sub-core (e.g., only shared between the vector and matrix sub-cores 120 and 130). The shared cache 140 can be an L1 or an L2 cache for storing data used for instructions executed by the sub-cores 110-130 or produced through the execution of these instructions.

In some embodiments one of the sub-cores 110-130 executes an operation to compute data that is to be used by another of the sub-cores 110-130 and stores this computed data in the cache for the other sub-core to retrieve. As an example, the matrix or vector sub-core (i.e., the matrix or vector ALU) might compute data in a first clock cycle and store this data in the shared cache 140. In a subsequent clock cycle, the other of the matrix or vector sub-core retrieves the data from the shared cache 140 for a subsequent computation. More specifically, in some embodiments the matrix or vector control unit retrieves the data from the shared cache in a second clock cycle in order to provide the retrieved data to its matrix or vector ALU for a computation in a third clock cycle (the first, second, and third clock cycles not necessarily being consecutive clock cycles).

In some embodiments, one or more memory block and one or more cache blocks are also shared among two or more different SVM cores 100 of the core array 150. In some embodiments, the cache blocks shared among the different SVM cores are L2 cache blocks, while in other embodiments they are L3 cache blocks. In some embodiments, the memory block(s) shared among the SVM cores of the core array include one or more volatile memory blocks, such as Random Access Memory (RAM) blocks.

In some embodiments, all of the SVM cores of the array 150, and the respective sub-cores of these cores, use one unified set of addresses to access the cache and memory blocks 170 shared among these cores and sub-cores. In other words, to access a particular location in the cache or memory block shared among these cores and sub-cores, each core and its associated sub-cores uses the same address to access the particular location.

The cache and memory blocks that are shared among the SVM cores 100 of the core array connect with these SVM cores through different interfaces in different embodiments. Examples of these interfaces include two dimension (2D) interfaces, two-and-a-half dimension (2.5D) interfaces, and three dimension (3D) interfaces. These interfaces will be further described by reference to FIGS. 16 and 20-22.

While FIG. 1 conceptually illustrates one example of an SVM core, one of ordinary skill in the art will recognize that various different SVM cores may be used in the core arrays of different embodiments. As an initial note, it should be understood that the arrangement of the components 110-145 within the SVM core 100 as shown in FIG. 1 does not necessarily represent the physical arrangement of these components within the SVM core 100 and that the components 110-145 may be physically arranged in any number of different arrangements within the SVM cores.

While FIG. 1 illustrates a single scalar sub-core 110, a single vector sub-core 120, and a single matrix sub-core 130, some embodiments may have more than one of one or more of the different types of sub-cores. For example, in some embodiments the SVM cores each have a single scalar sub-core dispatching operations to multiple vector sub-cores and multiple matrix sub-cores. In other embodiments, the SVM cores each have multiple scalar sub-cores, in conjunction with one or multiple vector and matrix sub-cores. Furthermore, in different embodiments the SVM cores may include different components in addition to the sub-cores. In some embodiments, the matrix and vector sub-cores 120-130 are actually a single sub-core to which the scalar sub-core offloads all non-scalar operations (i.e., vector, matrix, and higher-dimensional tensor operations).

Figure 3:
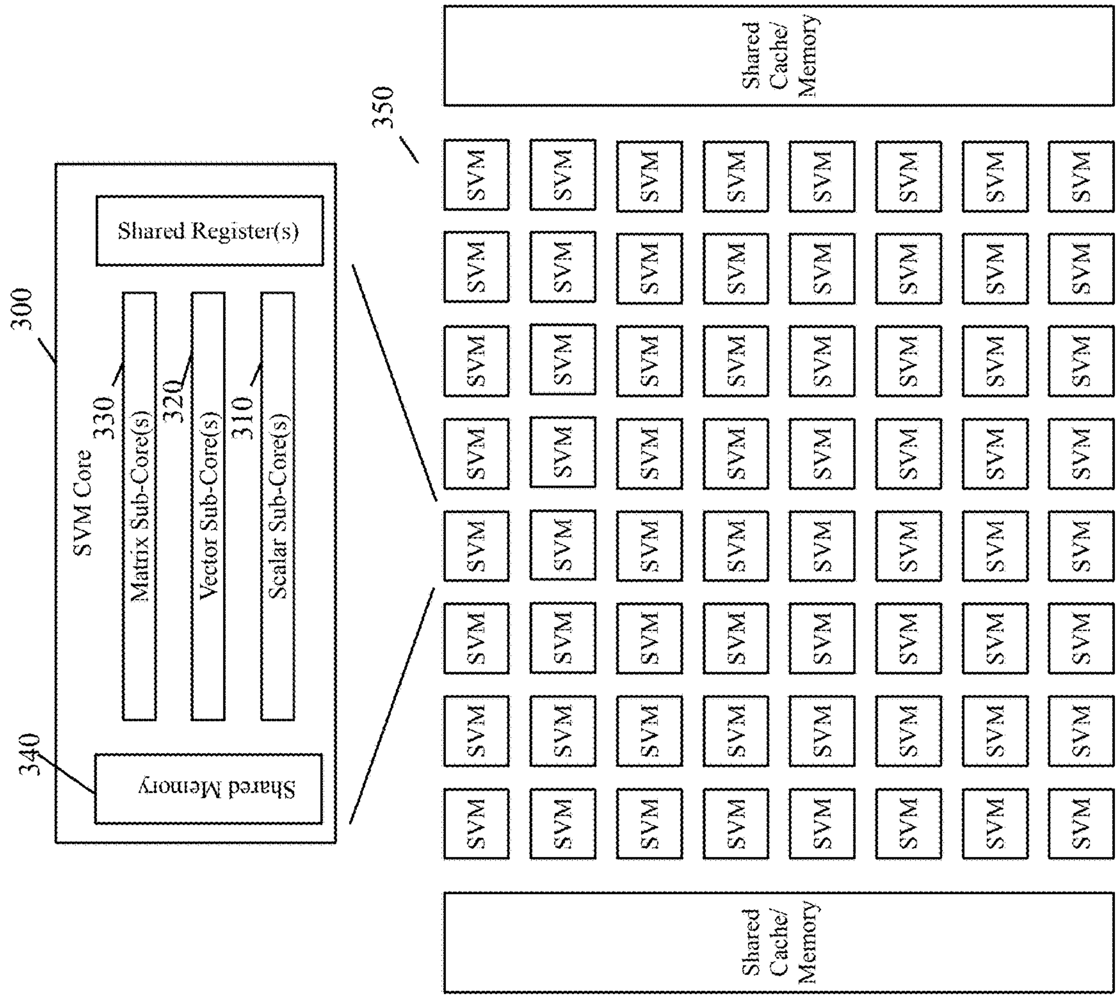
FIG. 3 conceptually illustrates a core array that does not have a shared cache.

FIG. 3 conceptually illustrates a core array 350 of SVM cores 300. The core 300 does not have a shared cache, as some embodiments do not use a shared cache (as certain applications, such as neural networks, do not require a cache for execution). Instead, the core 300 has a shared memory that is integrated within the core 300 itself. This shared memory is dynamic random access memory (DRAM) in some embodiments (e.g., LPDDR (low-power double data rate synchronous DRAM) or HBM (high bandwidth memory, also a type of synchronous DRAM). The integration of memory directly into the SVM core 300 (i.e., the location of the memory as near to the compute power as possible), in some embodiments, enables the sub-cores 330 to directly connect to this memory without data passing through an on-chip network. In some embodiments, the shared memory 340 is also shared between the cores of a core array. That is, if one of the SVM cores 300 in the core array stores data in its local memory, then a different one of the cores can access this data in a later clock cycle.

In some embodiments, the processor core array 150 (or 350) is arranged on one IC die (e.g., as a two-dimensional (2D) arrangement on one IC die). In some embodiments, the cores in the array are physically laid out as shown in the figure. That is, irrespective of the dimensions of the array, each SVM core is either on the periphery of the core (as is the case for the SVM core 100) or has eight neighboring SVM cores. Each non-periphery SVM core has two neighboring SVM cores located to either side of the SVM core horizontally, two neighboring SVM cores located to either side of the SVM core vertically, and four neighboring SVM cores located at each diagonal (45°) direction.

Figure 4:
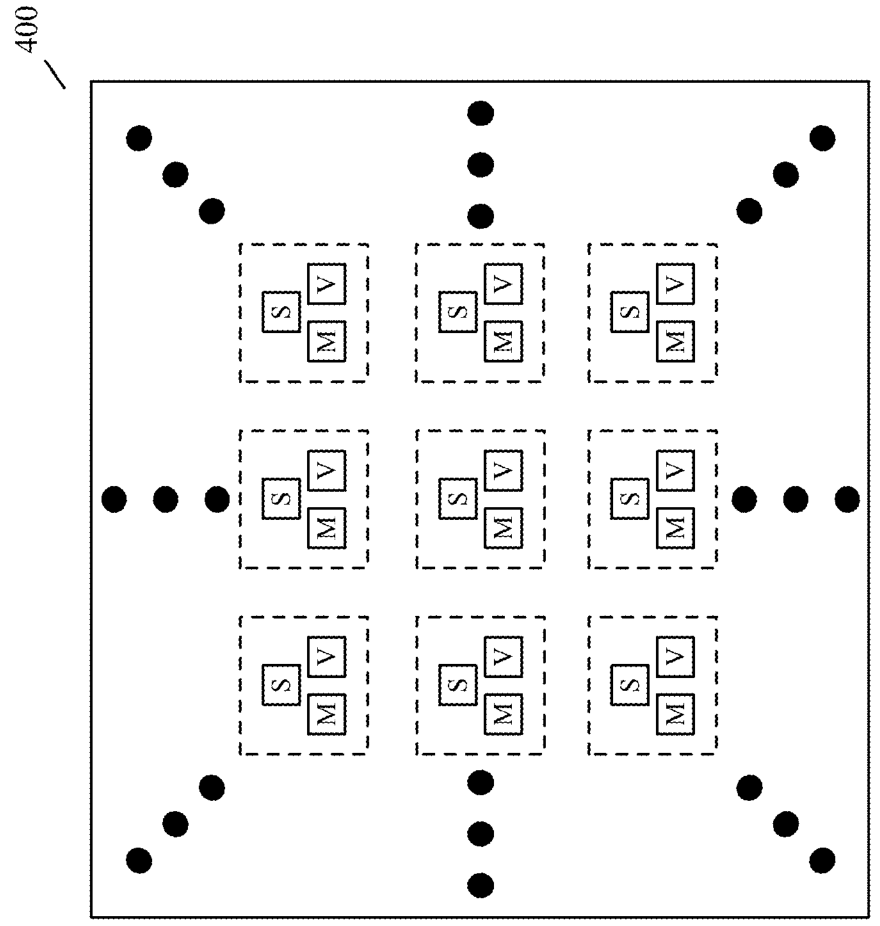
FIG. 4 conceptually illustrates a physical representation of a layout of the SVM cores of a core array in some embodiments.

FIG. 4 conceptually illustrates this physical representation of the layout 400 of the SVM cores of a core array in some embodiments (e.g., on a single physical die, or chiplet). As shown in this figure, each SVM core is associated with a separate contiguous physical region (shown by dashed lines). Except for the periphery cores, the contiguous physical region for each particular SVM core has one contiguous region for another core located each of (1) above the particular SVM core, (2) below the SVM core, (3) to the left of the SVM core, (4) to the right of the SVM core, and (5) at each of four diagonal (45°) directions, within a two-dimensional plane. The scalar, vector, and matrix sub-cores of each SVM core are located within the physical region associated with that SVM core. In some embodiments, all of the components 110-145 shown in FIG. 1 or the components 310-345 as belonging to the SVM core 100 or 300 are located within the physical region associated with that SVM core (i.e., not only the three sub-cores but also the shared cache(s), memory, and/or register(s).

In some embodiments, one SVM core in an SVM core array is designated as a leader SVM core of the array and the other SVM cores of the array are designated as worker SVM cores. The leader core in some embodiments is the core that is responsible for distributing the core array's workload (e.g., sets of instructions, or commands, that the core array has to execute) to the worker cores to execute. In some embodiments, the leader core (1) receives sets of instructions (e.g., from a host computer's CPU) for the core array to execute, (2) from the received instruction sets, generates sets of instructions (also called work items or command bundles) for the worker cores to execute, and (3) distributes the generated sets of instructions (i.e., distributes the work items) to the worker cores to execute. In some embodiments, the leader core can also act as a worker core that executes its generated sets of instructions, while in other embodiments, the leader core cannot be a worker core.

In some embodiments, the sets of instructions, or commands, that the leader core receives are not tied to any specific resource of the core array. For instance, the received sets of instructions do not account for the number of cores in the core array, for the actual sizes of registers of the cores of the core array, etc. The received sets of instructions in some embodiments are expressed in terms of a virtual instruction set architecture (ISA) format (or another virtual command format) that is not tied to the specific types of resources used by the cores of the core array. This allows the programs and/or devices that provide the received instruction sets for execution to have no knowledge of the internal structure and/or workings of the core array. In these embodiments, the leader core generates, from the virtual ISA (vISA) instructions, physical ISA (pISA) instructions (i.e., instructions specified in terms of a pISA format or another physical command format) that account for the resources of the core array. In some embodiments, the pISA instructions account for (e.g., are tied to) the sizes of the registers of the cores, the number of cores in the core array, etc.

In generating the sets of instructions for execution, the leader core can also generate multiple instances of one set of instructions (i.e., multiple work items or command bundles) for multiple executions by multiple worker cores in parallel. This parallel computing of one set of instructions increases the throughput of the core array when one set of instructions has to be executed multiple times. For example, in some embodiments, one set of instructions is executed multiple times in parallel by a set of worker cores to output multiple values of one parameter.

The leader core generation of the instruction sets is part of the leader core's compiler capability in some embodiments. The leader core's compiler operation transforms the received sets of instructions from a format that is not associated with the specific resources of the core array (e.g., a vISA format) to a format that is associated with or takes into account the specific resources of the core array (e.g., a pISA format). In addition to this compiler capability, the leader core can also perform re-compiling operations in some embodiments. A re-compiling operation replaces a set of instructions (e.g., a set of code, a set of commands) that the leader core identifies as being sub-optimal for the resources of the core array or sub-optimal in general, with another set of instructions (e.g., commands) that are deemed to be more optimal for the resources of the core array or more optimal in general.

In some embodiments, the leader core distributes the generated sets of instructions to the worker cores through a pull model. In this model, the leader core stores each generated set of instructions in a queue for retrieval by a worker core (e.g., a worker core that is idle). In some embodiments, the leader core notifies the worker cores that it has stored one or more new work items (i.e., one or more new instruction sets) in the queue for retrieval by any worker core that is available for processing a new work item. In other embodiments, the leader core distributes the generated sets of instructions to the worker cores through a push model. In one such push model, the leader core directly sends to a worker core a work item that the leader core has assigned to the worker core for execution by that worker core.

Figure 5:
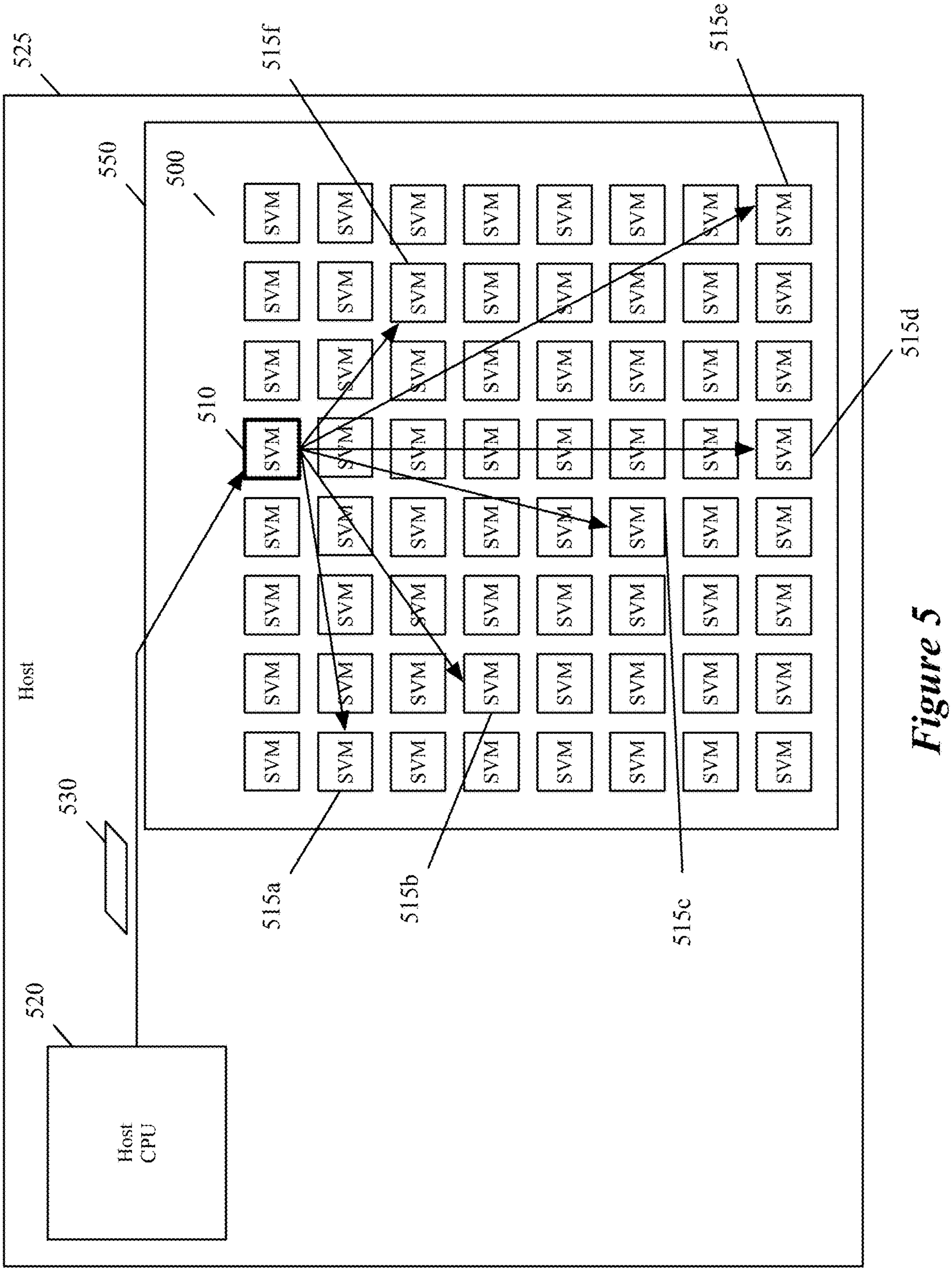
FIG. 5 conceptually illustrates an example of a core array with one SVM core designated as its leader SVM core and all other SVM cores designated as worker SVM cores.

FIG. 5 conceptually illustrates an example of a core array 500 with one SVM core 510 designated as its leader SVM core 510 and all other SVM cores 512 designated as worker SVM cores. In this example, the SVM core array 500 is part of a hardware accelerator 550 of the host computer 525. As shown, the host computer includes a host CPU 520 and the SVM core array 500, which includes one leader SVM core 510 and several worker SVM cores 265.

The host CPU 520 uses the SVM core array 500 to accelerate execution of some or all of the operations of the host CPU 520. FIG. 5 illustrates an example of the host CPU 520 sending a set of instructions 530 to the leader worker 510 for the core array to execute as part of its hardware acceleration operation. As further described below, the set of instructions 530 in some embodiments are not tied to the specific processor resource of the core array as the host CPU does not have knowledge of the size of this array and/or the compute resources of this array.

In some embodiments, the host CPU 520 uses the SVM core array 500 of the accelerator card 550 to accelerate execution of a subset of operations of the host 525 that would get the benefit of the vector and matrix sub-cores of the SVM cores of the array 500. For instance, the host CPU 520 uses the core array 500 to accelerate the execution of programs or portions of programs that involve vector and matrix computations (e.g., have vector and matrix instructions that involve vector and matrix computations on vector and matrix operands), and/or that could benefit from parallel processing of the instructions through the use of the large number of heterogeneous cores of the core array 500. In some embodiments, the host CPU 520 also uses the SVM core array 500 of the accelerator card 550 to accelerate execution of a subset of operations of the host 525 that would get the benefit of the scalar sub-cores of the SVM cores of the array 500, e.g., operations that would get the benefit of the superior scalar sub-cores of the core array 500 and/or the benefit of the parallel processing of the scalar instructions through the use of the large number of the core array's scalar sub-cores on their own or in conjunction with the vector/matrix sub-cores of the core array.

In the example illustrated in FIG. 5, the array 500 is an 8×8 array of SVM cores. One of ordinary skill will realize that other size core arrays are used in other embodiments. The core array 500 in some embodiments is a single compute block that is defined on one physical unit, such as one die or one chiplet. A chiplet in some embodiments is a die that is placed on a silicon interposer (1) to connect to other dies placed on the same interposer, and (2) to connect to off-interposer ICs (i.e., ICs that are not on the interposer) through the interposer's input/output (I/O) interface (e.g., through the interposer's ball or pin grid array). In some embodiments, the core array's die is on the same printed circuit board (PCB) as the host's CPU, while in other embodiments the core array's die is on another PCB that plugs into a bus (not shown) of the host computer 525 (e.g., a PCIE bus of the host computer).

The leader core 510 is the core that is responsible for distributing the core array's workload (e.g., sets of instructions that the core array has to execute) to the worker cores 512 to execute. In some embodiments, the leader core (1) receives, from the host computer's CPU 520, sets of instructions for the core array to execute, (2) from the received instruction sets, generates sets of instructions (i.e., work items) for the worker cores 515 to execute, and (3) distributes the generated sets of instructions (i.e., the generated work items) to the worker cores to execute.

In some embodiments, the leader core can also be a worker core that executes its generated instructions, while in other embodiments, the leader core cannot be a worker core. In some embodiments, the leader core is identical to any other core in the SVM core array. In some of these embodiments, any SVM core of the array 500 can be designated as the leader SVM core (e.g., at bootup of the host 525 by the hardware accelerator 550) as there is no differentiation between the SVM cores of the core array. In some embodiments, the leader core has the same components as the other cores but has certain components enabled that are disabled on the worker cores. For example, in some embodiments each of the SVM cores in the core array has multiple scalar cores, but all but one of the scalar cores are disabled on the worker cores. On the leader core, these additional scalar cores are used to execute various leader core operations (e.g., various compiling and scheduling operations) while one of the scalar cores executes instructions received from the host.

In other embodiments, the leader core 510 is different than the worker cores, and hence not any SVM core can be designated as the leader core. For instance, in some embodiments, the leader core has the same components as the worker cores (e.g., has the same SVM processor sub-cores) but has more resources (e.g., has bigger L1 and L2 caches, etc.) than the worker cores. In still other embodiments, the leader core 510 has different components than the worker cores (e.g., has different types of sub-cores or number of sub-cores than the worker cores). Also, while the leader core 510 is part of the same array 500 as the worker cores 515, the leader core in other embodiments resides outside of the core array, e.g., is a standalone unit on the same or different die as the core array, such as being a processor on a hardware accelerator PCB on which the core array's die is placed.

As mentioned above, the sets of instructions that the leader core receives from the host CPU 520 are not tied to any specific resource of the core array in some embodiments. For instance, the received sets of instructions do not account for the number of cores in the core array, for the actual sizes of registers of the cores of the core array, etc., as the host CPU 520 does not have any knowledge of these resources (e.g., any knowledge of the number of SVM cores, register sizes, etc.). In some embodiments, the host CPU 520 provides the sets of instructions to the leader core 510 in a vISA format that is not tied to the specific types of resources used by the cores of the core array. This allows the programs and/or devices that provide the received instruction sets for execution to have no knowledge of the internal structure and/or workings of the core array.

In some embodiments, the leader core 510 performs a compiling operation that transforms the received sets of instructions from a format that is not associated with the specific resources of the core array to a format that is associated with the specific resources of the core array. For instance, in some embodiments, the leader core 510 receives instructions from the host CPU 520 in a vISA format and performs a compiler operation to convert these instructions from their vISA format to pISA instructions (i.e., instructions specified in terms of a pISA format) that are tied to the resources of the core array or at least account for the resources of the array. In some embodiments, the pISA instructions account for (e.g., are tied to) the sizes of the registers of the cores, the number of cores in the core array, etc.

In generating the sets of instructions for execution, the leader core 510 also generates at times multiple instances of one set of instructions (i.e., multiple work items having the same set of instructions applied to different data) for multiple executions by multiple worker cores in parallel. In some embodiments, each worker core can execute one of these work items at any given time. In some embodiments, the different work items in some embodiments are executed by different worker cores, while in other cases two or more of the work items having the same set of instructions can be executed by one particular worker core when that particular worker core finishes executing one work item and is available to take on another work item for execution. The parallel execution of the different work items increases the throughput of the core array (e.g., when one set of instructions has to be executed multiple times for different sets of data or different sets of instructions have to be executed in parallel). In some embodiments, one instruction or set of instructions received by the leader core is divided by the leader core into multiple work items with the same instruction to be executed on different data in parallel by two or more worker cores (e.g., to apply the same operations to different portions of the same vector, matrix, or higher dimensional tensor).

In addition to this compiler capability, the leader core 510 also performs re-compiling operations in some embodiments. A re-compiling operation replaces a set of instructions (e.g., a set of code), that the leader core identifies as being sub-optimal for the resources of the core array or sub-optimal in general, with another set of instructions that are deemed to be more optimal for the resources of the core array or more optimal in general. The leader core's compiling and re-compiling operations are further described in the above-incorporated concurrently filed U.S. patent application Ser. No. 18/916,645, entitled "Generation and Distribution of Commands for Parallel Execution at Core Array".

Figure 7:
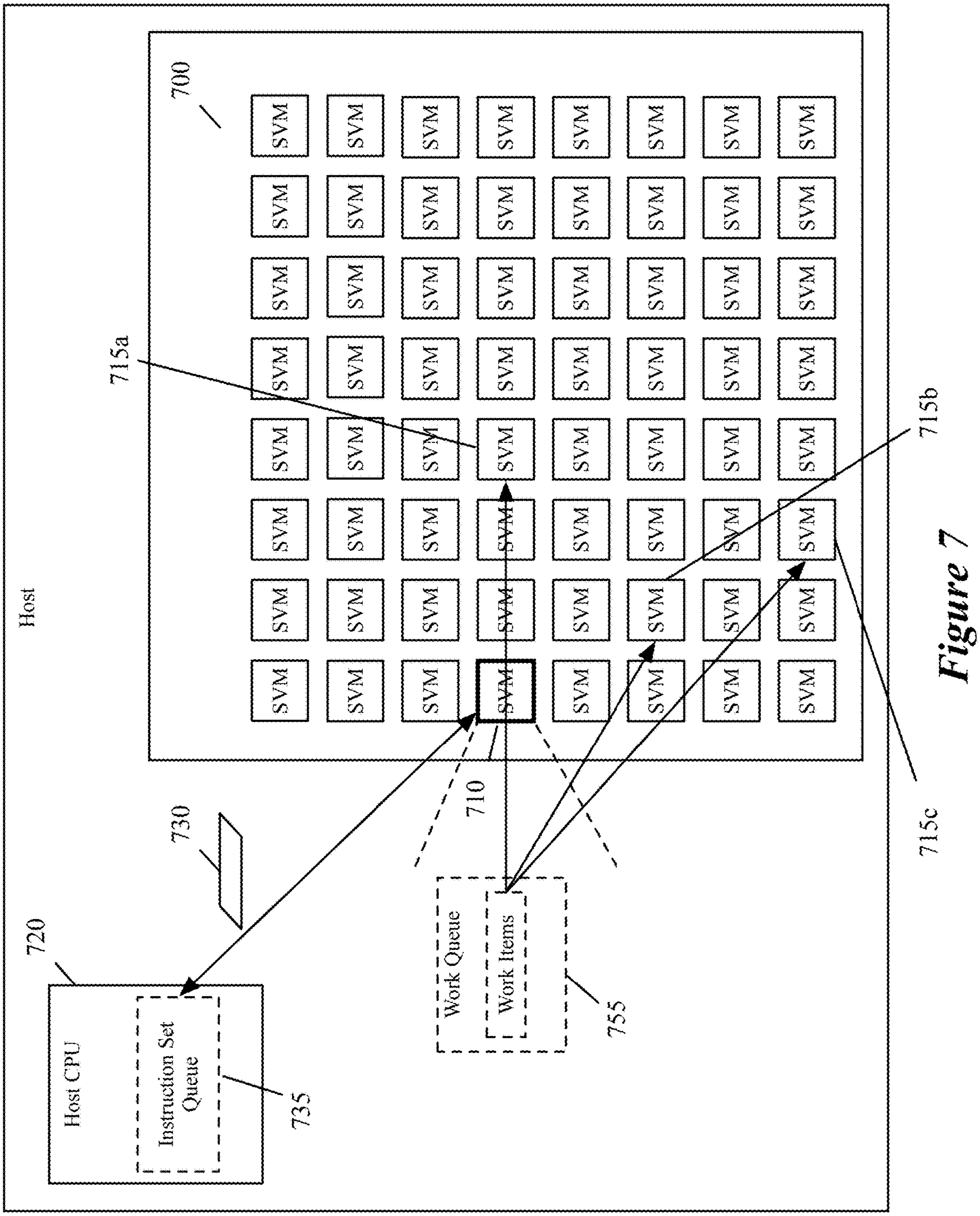
FIG. 7 conceptually illustrates another example of a core array with a leader SVM core retrieving a set of instructions from the host CPU and enqueuing work items in a work queue.

In some embodiments, the leader core 510 distributes the generated sets of instructions (i.e., the generated work items) to the worker cores 515 through a pull model. In some embodiments using such a pull model, the leader core stores each generated set of instructions in a queue for retrieval by a worker core (e.g., a worker core that is idle). In some embodiments, the leader core notifies the worker cores that it has stored new one or more new work items (i.e., one or more new instruction sets) in the queue for retrieval by any worker core that is available for processing a new work item. FIG. 7 conceptually illustrates the use of such a queue.

In other embodiments, the leader core distributes the generated sets of instructions to the worker cores through a push model. In one such push model, the leader core directly sends to a worker core a work item that the leader core has assigned to the worker core for execution by that worker core. In some of these embodiments, the leader core 510 assigns each work item to a worker core in the push model, while in the embodiments that use the pull model, the leader core 510 does not. The distribution of the work items is further described in the above-incorporated concurrently filed U.S. patent application Ser. No. 18/916,645, entitled "Generation and Distribution of Commands for Parallel Execution at Core Array".

FIG. 5 shows the leader core 510 distributing six work items (i.e., six work items having the same set of instructions) to six worker cores 515*a-f* in order to effectuate the execution of the instruction set 530 received from the host CPU 520. To fully get the benefit of the parallel processing of the worker cores, the leader core 510 can successively distribute different sets of work items to different sets of worker cores so that the different sets of worker cores can execute all the work items in parallel.

Figure 6:
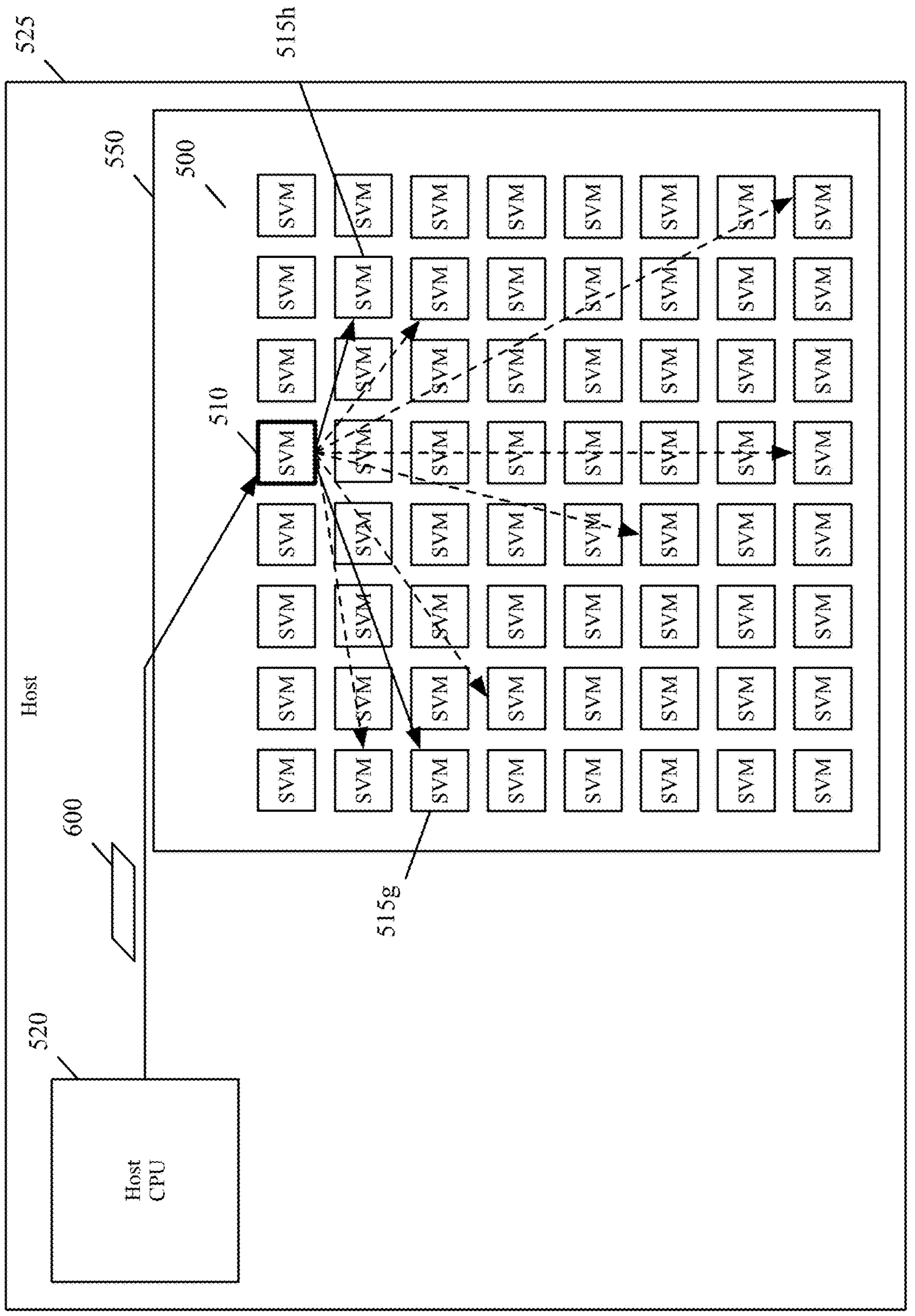
FIG. 6 conceptually illustrates that after distributing the initial six work items to six worker cores, the leader core of FIG. 5 distributes two additional work items to two worker cores.

For instance, FIG. 6 conceptually illustrates that after distributing the initial six work items to six worker cores 515*a-f*, the leader core 510 distributes two additional work items to two worker cores 515*g-h*. These latter two work items are generated for a second set of instructions 600 that the leader core receives from the host CPU. In this figure, the distribution of the six work items are depicted with dashed lines to depict their earlier distribution than the distribution of the two subsequent work items, which are depicted with the solid lines. It should be noted that had a particular one of the worker cores 515*a-f* finished processing its first work item before the leader core starts to distribute the second set of work items, this particular worker core could be the recipient of an instance of the second work item for execution (i.e., the leader core can distribute a second work-item instance to the particular worker core to execute).

As noted, in some embodiments, the leader SVM core enqueues the work items for retrieval by the worker SVM cores. FIG. 7 conceptually illustrates another example of a core array 700 with a leader SVM core 710 retrieving a set of instructions from the host CPU 720 and enqueuing work items in a work queue 755. As shown, in some embodiments, rather than pushing the set of instructions 730 to the core array 700, the host CPU 720 asynchronously enqueues sets of instructions that are to be executed by the core array in an instruction set queue 735. The leader SVM core 710 retrieves the instruction set 730 from this queue and generates a set of work items for execution by the worker SVM cores of the core array 700.

The leader SVM core 710 enqueues these generated work items in a work queue 755, which may be stored at the leader SVM core 710 (e.g., in memory or cache of the SVM core 710) or in shared memory of the core array 700. The worker SVMs (e.g., in this case worker SVMs 715*a-c*) retrieve and execute these work items from the work queue 755. Both the instruction set queue 735 and the work queue 755 are described in more detail in the above-incorporated concurrently filed U.S. patent application Ser. No. 18/916,645, entitled "Generation and Distribution of Commands for Parallel Execution at Core Array".

A worker SVM core of some embodiments has at least three sub-cores, which are (1) a scalar sub-core, (2) a vector sub-cores, and (3) a matrix sub-core. These different sub-cores are optimal for executing different types of instructions. For instance, in some embodiments, the scalar sub-core has one or more components (e.g., an ALU) that is optimal for performing a scalar computation on a scalar operand in one clock cycle, the vector sub-core has one or more components (e.g., an ALU) that is optimal for performing a vector computation on a vector operand in one cycle, and the matrix sub-core has one or more components (e.g., an ALU) that is optimal for performing a matrix computation on a matrix operand in one cycle.

In some embodiments, the scalar sub-core of a worker core initially processes a work item received by the worker core (i.e., the set of instructions that the worker core has to execute). When the work item only needs scalar computations, the scalar sub-core in some embodiments performs this computation. In some embodiments, however, the host CPU 520 does not offload to the core array 500 instruction sets that only require scalar computations or the leader core 510 does not distribute to the worker cores work items that only involve scalar computations.

When the work item includes vector or matrix computations that would benefit the vector or matrix ALUs of the vector or matrix sub-cores (i.e., the work item should be executed by the vector or matrix sub-cores), the scalar sub-core dispatches one or more of the received instructions of the work item to the vector or matrix sub-core to process. In some embodiments, the scalar sub-core dispatches vector or matrix instructions to the vector and matrix sub-cores by storing these instructions in one or more instruction input queues from where they are retrieved by the control unit(s) of the vector and matrix sub-cores.

The control unit of the vector or matrix sub-core in some embodiments also has a load/store (LD/ST) engine in some embodiments that retrieves any data needed for execution of the instructions in the input queue. In other embodiments, this LD/ST engine is not part of the control unit. The retrieved data in some embodiments is stored in a streaming storage from where the data is retrieved by the vector or matrix ALU. These components of the SVM cores will be further described below by reference to FIG. 11.

Figure 8:
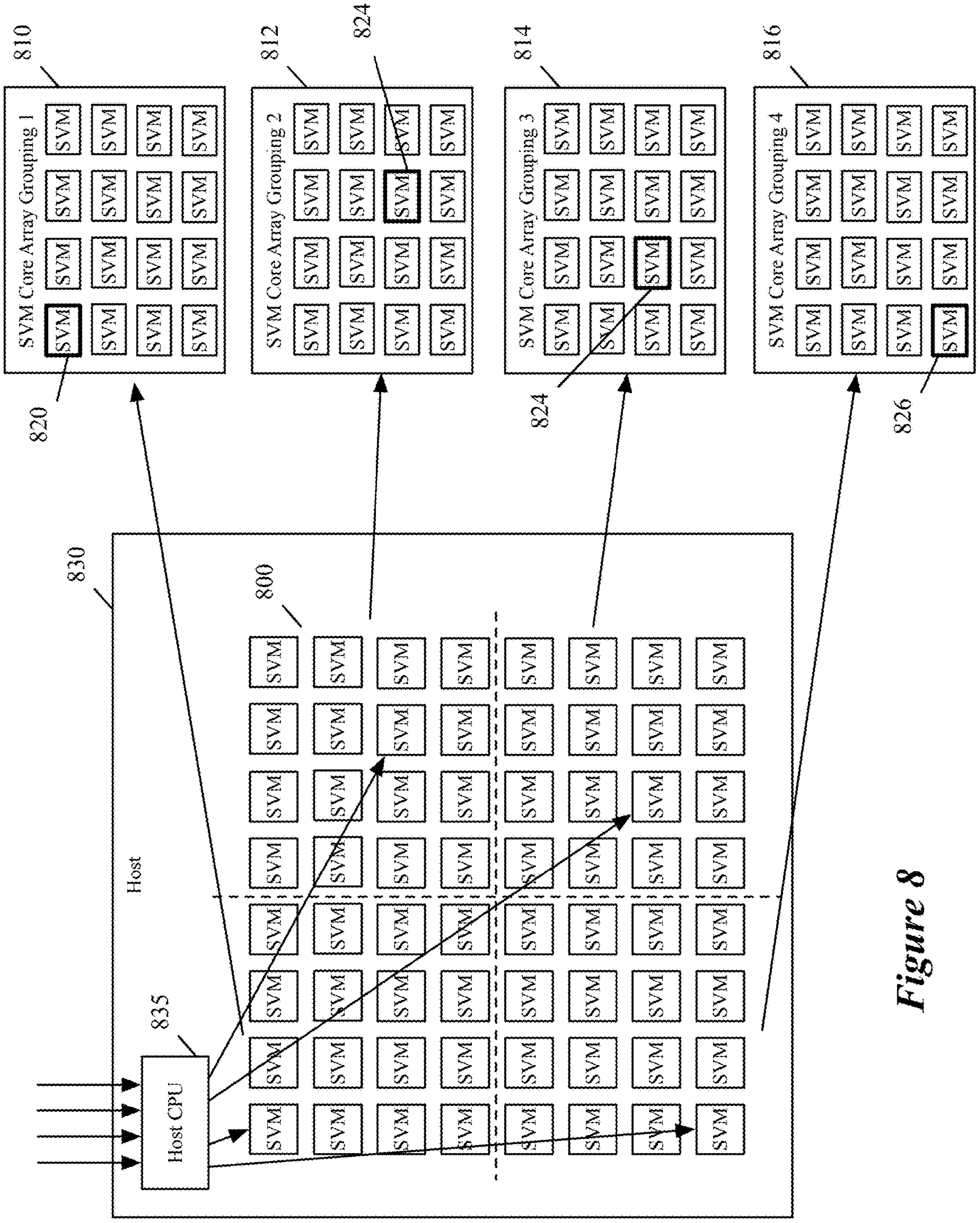
FIG. 8 conceptually illustrates one physical SVM core array being logically divided into four virtual core arrays, each with its own respective leader SVM core.

Some embodiments allow one physical SVM core array to designate multiple leader SVM cores, enabling one SVM core array to be logically broken into multiple logical SVM core array groupings that are functionally used as individual SVM core arrays. For instance, FIG. 8 conceptually illustrates one physical SVM core array 800 being logically divided into four core array groupings 810-816 (also referred to as logical or virtual core arrays), each with its own respective leader SVM core 820-826. Each SVM core array grouping 810-816 can operate separately, irrespective of the virtual core arrays belonging to one physical array 800. That is, each core array grouping 810-816 can be functionally seen as its own core array from the perspective of the host CPU 835 that provides sets of instructions to the leader cores 820-826 of these virtual core arrays 810-816.

The core array 800 is part of a host 830 along with a host CPU 835. The host CPU 835 receives instructions to offload from various different tenants and passes these instructions (e.g., vISA instructions) to the correct leader SVM cores 820-826. The leader SVM cores 820-826 then convert and distribute the instructions (e.g., as work items with pISA instructions) among their worker SVM cores for execution.

In some embodiments, one physical core array can be divided into multiple logical core arrays for use by customers (e.g., customers renting compute power in a datacenter) that do not require entire chips (i.e., entire physical core arrays) for their needs. For instance, in this example, each of four tenants uses 16 SVM cores from the physical core array 800, which has 64 total SVM cores.

While each of the SVM core array groupings 810-816 shown in this example has all of its respective SVM cores in a physically contiguous quadrant of the physical SVM core array 800, this is just one approach for grouping SVM cores within a physical core array to define different logical SVM core arrays (which may have the benefit of grouping together SVM cores that are more tightly connected through the on-chip network). In other embodiments, the SVM cores in a logical core array are not necessarily contiguously grouped within their logical core array (e.g., SVM cores of one logical core array can be interspersed with other SVM cores of other logical core arrays throughout a physical SVM core array). Furthermore, the different logical core arrays defined within a physical core array may not all have the same number of cores. For instance, the physical core array 800 could be logically divided into one logical core array with 32 SVM cores and two logical core arrays with 16 cores each. That is, a logical SVM core array can have any grouping of SVM cores with one leader SVM core and a set of one or more worker SVM cores in some embodiments.

While the above example shows one physical SVM core array divided into multiple logical arrays, some embodiments connect multiple physical arrays together to use as one set of SVM cores (i.e., as a single accelerator). For instance, FIG. 9 conceptually illustrates an example set of heterogenous core arrays 902-904 that operate as a single accelerator. In this example, one SVM core 910 in the core array 902 is designated as the leader SVM core of the entire set of arrays 902-904 to perform the scheduling and distribution of instructions for all of the SVM cores in the set of arrays 902-904. This example illustrates N different physical SVM core arrays 902-904, which may be defined on N different physical compute block units (e.g., IC dies, chiplets, etc.). Each core array 902-904 can include any number of SVM cores (i.e., different core arrays within one set operating together may include different numbers of SVM cores), and the core array set can include any number of core arrays that may be arranged in various different physical configurations with respect to each other.

The core arrays 902-904 are connected in some embodiments to execute one or more sets of instructions (e.g., to increase the number of cores that can process work items in parallel). While multiple SVM core arrays are connected, this example designates only one SVM core 910 as the leader SVM core of the entire core array set 902-904 (as denoted in bold). All of the other SVM cores of the core array set 902-904 is designated as a worker SVM core. While the individual arrays of the set 902-904 have their own leader SVM cores when operating alone in some embodiments, these leader SVM cores operate as worker SVM cores when their respective core arrays are connected into the array set 902-904. As such, the leader SVM core 910 distributes converted instructions (e.g., work items with pISA instructions) to worker SVM cores throughout the entire set of core arrays 902-904.

Figure 9:
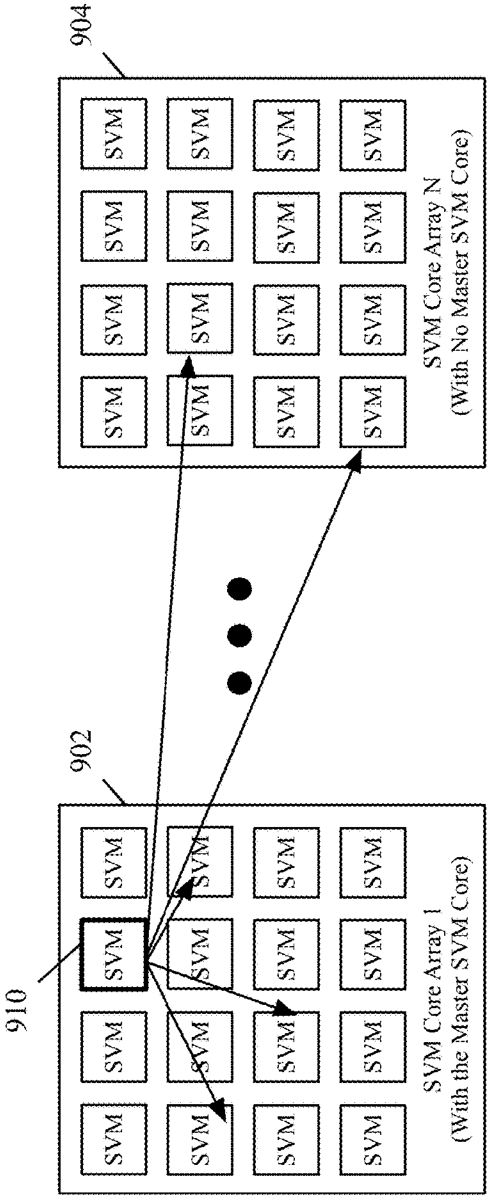
FIG. 9 conceptually illustrates an example set of heterogenous core arrays that operate as a single accelerator.
Figure 10:
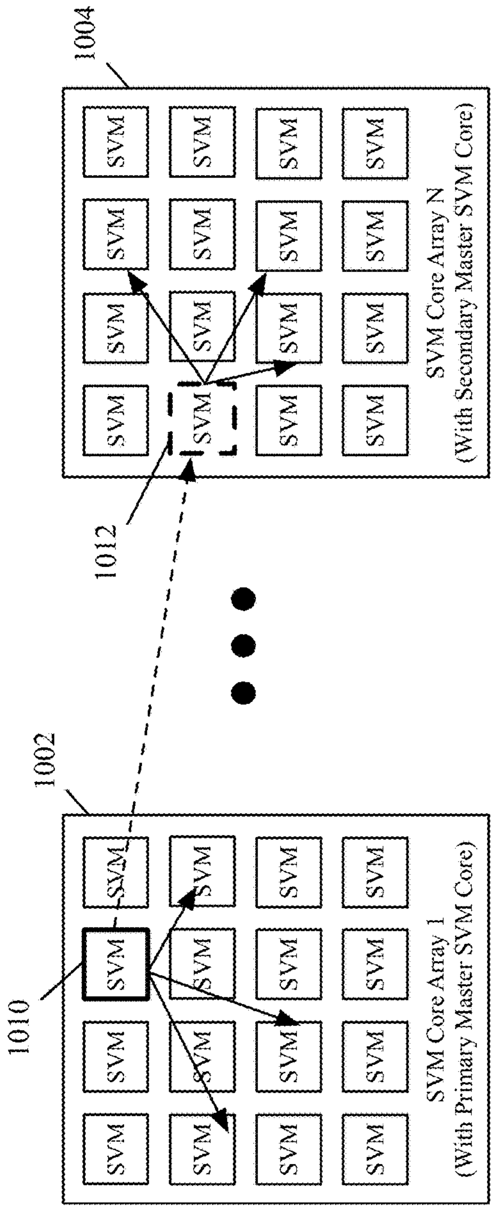
FIG. 10 conceptually illustrates another example set of heterogenous core arrays that operate as a single accelerator but with one primary leader SVM core and multiple secondary leader SVM cores.

FIG. 10 conceptually illustrates another example set of heterogenous core arrays 1002-1004 that operate as a single accelerator but with one primary leader SVM core and multiple secondary leader SVM cores. Similarly to the core array set 902-904 of FIG. 9, this figure illustrates N different physical core arrays 1002-1004 that are defined on N different single compute block physical units (e.g., IC dies, chiplets, etc.). As in the above description, each core array 1002-1004 can include any number of SVM cores and the set of core arrays may include any number of individual core arrays.

However, in this example, one SVM core 1010 of one array 1002 is designated as a primary leader SVM core (as denoted by a bolded solid line) while each other core array has a designated secondary leader SVM core 1012 (as denoted by a bolded dashed line). The primary SVM leader core 1010 performs both conversion operations and distribution operations, while the secondary leader SVM cores 1012 perform distribution operations but not conversion operations.

Thus, the primary leader SVM core 1010 is responsible for converting vISA instructions into pISA instructions and generating work items, as well as passing these work items to the worker SVM cores of its own array 1002 and to the secondary leader SVM cores 1012 of the other core arrays 1004 (using either a push distribution model or a pull distribution model). The secondary leader SVM cores 1012 distribute the received work items to their own worker SVM cores (again using either a push distribution model or a pull distribution model).

The examples of FIGS. 9 and 10 illustrate multiple array sets (i.e., multiple single compute block physical units) connected together. However, a host CPU connected to an array set sees the array set as a single device, irrespective of the number of core arrays in the set. Further, because the host CPU does not perform vISA to pISA conversion operations for instructions in some embodiments, the host CPU does not need to have any knowledge regarding the physical resources of the SVM cores, the SVM core arrays, or the array set as a whole.

As mentioned above, a worker SVM core of some embodiments has at least three sub-cores, which are (1) a scalar sub-core, (2) a vector sub-core, and (3) a matrix sub-core. These different sub-cores are optimal for executing different types of instructions. For instance, in some embodiments, the scalar sub-core has one or more components (e.g., a scalar ALU) that is optimal for performing a scalar computation on a scalar operand in one clock cycle, the vector sub-core has one or more components (e.g., a vector ALU) that is optimal for performing a vector computation on a vector operand in one cycle, and the matrix sub-core has one or more components (e.g., a matrix ALU) that is optimal for performing a matrix computation on a matrix operand in one cycle.

In some embodiments, the scalar sub-core of a worker core initially processes a work item received by the worker core (i.e., the set of instructions that the worker core has to execute). When the work item only needs scalar computations, the scalar sub-core in some embodiments performs this computation. When the work item includes vector or matrix computations that would benefit from being executed by the vector or matrix ALUs of the vector or matrix sub-cores, the scalar sub-core dispatches one or more of these instructions to the vector or matrix sub-core to process (e.g., by storing these instructions in one or more instruction input queues from which they are retrieved by the control unit(s) of the vector and matrix sub-cores). The control unit of the vector or matrix sub-core in some embodiments also has a load/store (LD/ST) engine in some embodiments that retrieves any data needed for execution of the instructions in the input queue.

Figure 11:
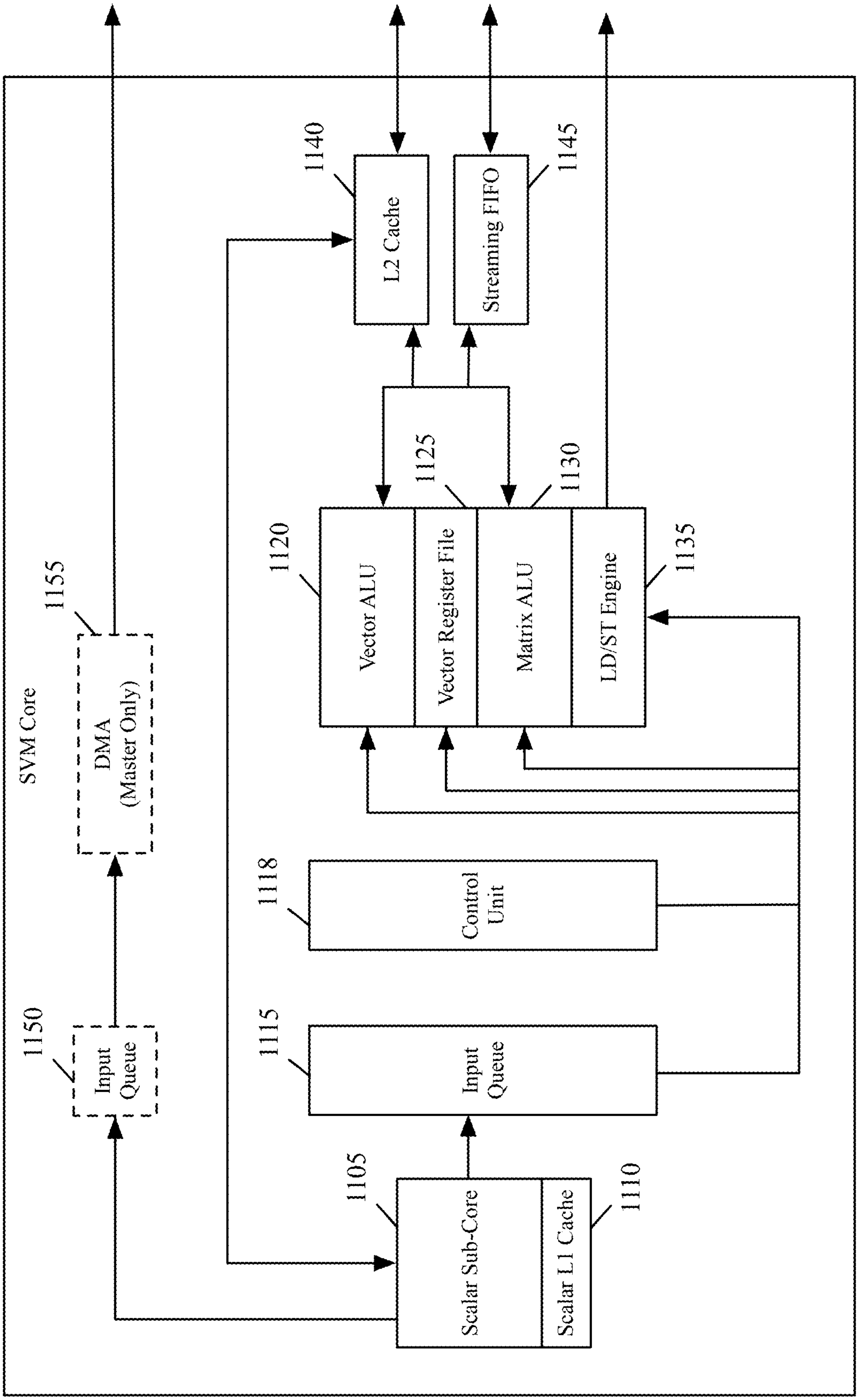
FIG. 11 conceptually illustrates a detailed example of an SVM core of some embodiments.

FIG. 11 conceptually illustrates a more detailed example of an SVM core 1100 of some embodiments. Like the core shown in FIG. 1 and described above, the SVM core 1100 can be used at least for executing scalar, vector, and matrix instructions (e.g., as an accelerator core). In this example, the SVM core 1100 includes a scalar sub-core 1105, a scalar L1 cache 1110, an input queue 1115, a control unit 1118, a vector ALU 1120, a vector register file 1125, a matrix ALU 1130, an LD/ST engine 1135, an L2 cache 1140, and a streaming FIFO 1145. In some embodiments, when the SVM core 1100 is a leader SVM core, it also includes an additional input queue 1150 and a direct memory access (DMA) 1155, which are illustrated using dashed lines. In some embodiments, the leader core has additional circuitry compared to the worker cores of its core array. In other embodiments, all of the cores of the core array have these circuits but do not use the input queue 1150 and DMA 1155 when not designated as a leader core.

The scalar sub-core 1105 in some embodiments is optimal for executing scalar-based instructions (e.g., instructions involving only scalar operands and scalar operations). The scalar sub-core 1105 can be a RISC core (e.g., a RISC-V core), a CISC core, or any other suitable core in different embodiments. In some embodiments, the scalar sub-core 1105 has a scalar control unit that directs a scalar ALU (these circuits not shown separately in the figure) to perform computations on scalar data. The scalar sub-core 1105 may also include one or more components in addition to the control unit and ALU, such as program counters, memory, and any other processor components. In some embodiments, the scalar ALU does not have specialty components (e.g., vector or matrix multipliers, vector or matrix adders, etc.) to perform operations on vector or matrix data in a single clock cycle (though the scalar ALU is capable of performing vector and/or matrix operations over multiple clock cycles).

The instructions processed by the scalar sub-core 1105, vector ALU 1120, and matrix ALU 1130 are in some embodiments defined using a common ISA, as described above. For example, the instructions are in some embodiments RISC-V instructions with vector, matrix, and/or additional extensions. In other embodiments, the scalar instructions are RISC-V instructions while the vector, matrix, and higher-dimensional tensors are other types of instructions (e.g., commands) that the scalar sub-core 1105 dispatches to the vector and/or matrix sub-cores. As the SVM core 1100 receives sets of instructions, the scalar sub-core 1105 receives the instructions and processes any instructions that are scalar instructions. In some embodiments, the scalar sub-core 1105 uses its own dedicated L1 cache 1110 to store data for the processing of scalar instructions. As needed, the scalar sub-core 1105 (e.g., the control unit of the scalar sub-core 1105) places one or more of the received instructions in the input queue 1115 for the vector and/or matrix ALUs 1120 and 1130 to process (e.g., places the instructions in the input queue 1115 when these instructions require vector/matrix operations on vector/matrix operands).

This figure illustrates one input queue 1115 for both the vector and matrix ALUs 1120 and 1130. However, in other embodiments, each of the vector and matrix ALUs is associated with its own separate input queue, to which the scalar sub-core 1105 dispatches vector and matrix instructions as appropriate. In some such embodiments, to ensure that instructions that are dependent on each other are processed in the correct order, the different input queues have interlocks placed on them. That is, if a vector instruction needs to be executed after a first matrix instruction but before a second matrix instruction, interlocks are used to ensure that the vector instruction is not executed until the first matrix instruction is complete (e.g., so that the data for the vector instruction is generated and stored) and that the second matrix instruction is not executed until the vector instruction is complete. Other embodiments, as described further below, use asynchronous execution with synchronization points to ensure that the instructions are not executed out-of-order.

Instructions placed in the input queue 1115 are retrieved by the control unit 1118, which in some embodiments is responsible for directing the operations of the vector and matrix ALUs 1120 and 1130. In some embodiments, the control unit 1118 controls the execution of one instruction by fetching the instruction, decoding the instruction to produce one or more control signals, and directing (via the produced control signals) one of the ALUs 1120 and 1130 to execute the instruction.

Conjunctively or alternatively, the control unit 1118 is in some embodiments responsible for breaking instructions (e.g., vector instructions for the vector ALU 1120 and matrix instructions for the matrix ALU 1130) into smaller vector or matrix instructions (referred to below as microinstructions). In some cases, a vector or matrix instructions received by the SVM core 1100 has one or more operands that are too large to fit into the registers of the ALU that is to execute the instruction (e.g., the vector register file 1125). In this case, the control unit 1118 of some embodiments breaks up the instruction into smaller instructions for the appropriate ALU to execute. For example, the vector register file 1125 in some embodiments has 1,024 vector registers, each 128 bytes wide, so instructions with larger operands can be segmented so that the operands for each of these microinstructions can be stored in the vector register file 1125.

The control unit 1118 may be a hardware control unit (e.g., a hardware control unit that includes a software microcode engine) or a software control unit (e.g., a microcode engine executed by a scalar processor, such as a small RISC-V core) in different embodiments. In some embodiments, the vector and matrix ALUs 1120 and 1130 share the control unit 1118. Alternatively, in some embodiments, the control unit 1118 represents two separate control units for the vector and matrix ALUs 1120 and 1130.

In some embodiments, the lines between the input queue 1115, control unit 1118, and vector and matrix components 1120-1130 act as a bus that collectively represents all control and data lines and signals between the input queue 1115, control unit 1118, vector ALU 1120, vector register file 1125, and matrix ALU 1130. A single bus is shown in order to not obscure the illustration of FIG. 11 with unnecessary detail, but it should be understood that various wiring configurations between these components are possible in different embodiments.

The ALUs 1120 and 1130 perform one or more types of ALU operations that are needed to effectuate execution of instructions decoded by the control unit 1118. Examples of these operations include arithmetic operations (e.g., add, subtract, multiply, divide, etc.), logic operations (e.g., bitwise logic operations such as "AND" operations and "OR" operations), and/or bit shift operations. The vector and matrix ALUs 1120 and 1130 are optimal respectively for performing vector and matrix computations on vector and matrix data (e.g., for performing computations on vector and matrix operands in one clock cycle).

The vector ALU 1120 is optimal for executing a vector-based instruction (e.g., an instruction involving a vector operand and a vector operation), and optimally performs computations on vector data. In some embodiments, the vector ALU 1120 can perform a vector-based computation on a vector operand in one clock cycle. The vector ALU 1120 in some embodiments has one or more specialty components to effectuate such computations. For example, the vector ALU 1120 can include a vector multiply unit, a vector adder unit, etc. In some embodiments, these ALU components enable the vector ALU 1120 to perform computations on the distinct elements of the vector data in parallel in one clock cycle so that the vector ALU 1120 can operate on a vector operand (or set of vector operands, e.g., to add two vectors together) in one clock cycle.

The matrix ALU 1130 is optimal for executing a matrix-based instruction (e.g., an instruction involving a matrix operand and a matrix operation), and optimally performs computations on matrix data. In some embodiments, the matrix ALU 1130 can perform a matrix-based computation on a matrix operand in one clock cycle. The matrix ALU 1130 in some embodiments has one or more specialty components to effectuate such computations. For example, the matrix ALU 1130 can include a matrix multiply unit, a matrix adder unit, etc. In some embodiments, these ALU components enable the matrix ALU 1130 to perform computations on the distinct elements of the matrix data in parallel in one clock cycle so that the matrix ALU 1130 can operate on a matrix operand (or set of matrix operands, e.g., to add two matrices together) in one clock cycle.

In some embodiments, the matrix ALU 1130 can process vector input data, but not as efficiently as the vector ALU 1120. For instance, in some embodiments, processing vector input data with the matrix ALU 1130 does not use the full capacity of the matrix ALU's computation components. Similarly, the vector ALU 1120 can in some embodiments process matrix input data, but not as efficiently (e.g., cannot operate on one 2D matrix operand in one clock cycle) as the matrix ALU 1120. That is, the vector ALU 1120 in some embodiments does not have specialty matrix computational components.

In some embodiments, the scalar sub-core 1105, vector ALU 1120, and matrix ALU 1130 are asynchronous. In such embodiments, the scalar sub-core 1105 is able to continue performing operations (e.g., placing vector and/or matrix instructions in the input queue 1115, executing scalar instructions, etc.) without waiting for the vector and/or matrix ALUs 1120 and 1130 to finish executing their instructions. This allows for even higher performance and greater efficiency of the SVM core 1100.

This asynchronous execution means that the scalar sub-core 1105 continues performing the operations specified by a received instruction set after dispatching a vector or matrix operation to the vector or matrix sub-core (i.e., by placing the vector or matrix instruction in the input queue). In some embodiments, each dispatched instruction includes a synchronization point within the instruction set. That is, if the scalar sub-core 1105 enqueues a vector (or matrix) instruction in the input queue 1115, the scalar sub-core 1105 continues execution of the set of instructions until the synchronization point for that dispatched instruction is reached. Once the synchronization point is reached, the scalar sub-core 1105 pauses execution of that instruction set if the operation has not been completed by the vector (or matrix) ALU 1120 (or 1130). At this point, the scalar sub-core may wait, begin executing another instruction set, or return to execution of a previously-paused instruction set.

In many situations, the asynchronous execution hides the latency involved in retrieving data for a vector and/or matrix operation because the scalar sub-core 1105 executes other instructions during the entire retrieval and execution period for the operation (e.g., as compared to synchronous execution in which the execution of other operations is paused each time such an operation needs to be performed). As further described below, by placing the operation in the input queue 1115, the other components of the core 1100 (e.g., the load/store engine 1135) identify upcoming operations and pre-fetch the data required for those operations from memory (e.g., wherever on the core arrangement that data is located). This ensures that by the time the vector and/or matrix ALUs 1120 and 1130 are directed to execute the operations by the control unit 1118, the data needed for those operations is available to the vector and/or matrix ALUs 1120 and 1130. The asynchronous execution of some embodiments in this manner enables the execution of larger operations more quickly using a single pipeline (or fewer pipelines than would otherwise be needed).

When the vector or matrix ALU 1120 or 1130 is to perform a computation that requires data from memory, the ALU waits to perform the computation until the data is available. To retrieve this data, the SVM core 1100 includes the LD/ST engine 1135. The LD/ST engine 1135 of the SVM core 1100 is in some embodiments a data retriever for at least the vector and matrix ALUs 1120 and 1130. That is, the LD/ST engine 1135 retrieves any data needed for execution of the instructions in the input queue 1115. In this figure, the LD/ST engine 1135 is separate from the control unit 1118. However, in other embodiments, the LD/ST engine 1135 is physically or logically part of the control unit 1118.

In some embodiments, the LD/ST engine 1135 reads vector and matrix instructions from the input queue 1115 to determine when to retrieve the data needed for these instructions. In some embodiments, data stored in the vector register file 1125, the L1 cache 1110 (or any L1 cache associated with the vector or matrix ALUs 1120 and 1130), or the shared L2 cache 1140 does not need to be retrieved by the load/store engine, as this data is already available to the vector and matrix ALUs 1120 and 1130. On the other hand, when the LD/ST engine 1135 reads an instruction that requires data from memory or an L3 cache shared between the SVM cores of a core array, the LD/ST engine 1135 sends a request to memory (not shown) external to the SVM core 1100. The retrieved data is then written to the L2 cache 1140 or the streaming FIFO 1145. In some embodiments, data for vector instructions can be stored in the L2 cache 1140 and/or the streaming FIFO 1145, while matrix instructions are stored in the streaming FIFO 1145. However, in other embodiments, matrix instructions can be stored in the streaming FIFO 1145, the L2 cache 1140, and/or an L3 cache (not shown) of the SVM core 1100. Once the data is stored at the SVM core 1100, the LD/ST engine 1135 can issue a load signal to the correct ALU 1120 or 1130 to perform the computation using the stored data in order to process the instruction. Further information regarding the LD/ST engine 1135 and the streaming FIFO 1145 will be described below in relation to FIG. 13.

The vector and matrix ALUs 1120 and 1130 do not execute instructions requiring data from the LD/ST engine 1135 until that data is available in the L2 cache 1140 or streaming FIFO 1145. As such, the execution of an instruction requiring data from memory is delayed until the ALU 1120 or 1130 has the required data. However, the ALUs 1120 and 1130 are not necessarily idle when this occurs, as they are still able to perform computations for which they have any required data, so long as those computations do not depend on the computations that the ALUs have yet to perform. More specifically, the ALUs 1120 and 1130, while waiting for data, can perform independent computations as long as the required data (if any) for those independent computations is available. The vector and matrix ALUs 1120 and 1130 would only be considered idle if (1) there were no instructions in the input queue 1115 or (2) all instructions in the input queue 1115 either require data that has not yet been retrieved by the LD/ST engine 1135 or depend on instructions that have not yet been executed.

In certain situations, a large set of data that is retrieved by the LD/ST engine 1135 may be too large for the corresponding ALU's register. For example, the LD/ST engine 1135 might be required to retrieve vector or matrix data for use by the vector ALU 1120 or matrix ALU 1130 that is too large to be stored in the vector or matrix ALU's registers. When this occurs, the LD/ST engine 1135 reads the instruction from the input queue 1115 and sends a request to the memory for the required data set, which is then written to the streaming FIFO 1145. The matrix ALU 1130 can then pull the data from the streaming FIFO 1145 while performing the operation for which the data is needed, rather than retrieving the entire set of data and placing all of that data in the registers prior to performing the operation.

In this figure, the SVM core 1100 includes one LD/ST engine 1135 that handles retrieval of data for both the vector and matrix ALUs 1120 and 1130. However, in other embodiments vector and matrix ALUs of one SVM core have their own LD/ST engines. In such embodiments, the LD/ST engines can be part of vector and matrix sub-cores that include the vector and matrix ALUs 1120 and 1130, or they can be external to the sub-cores but still part of the SVM core 1100.

As mentioned above, the SVM core 1100 includes a vector register file 1125, which is used for storing data (e.g., data retrieved by the LD/ST engine 1135) while instructions are being executed by the vector and matrix sub-cores. In some embodiments, this register file 1125 is used only by the vector ALU 1120 when performing vector computations. In other embodiments, the register file is shared by the vector and matrix ALUs 1120 and 1130 when these ALUs respectively perform vector and matrix computations. In still other embodiments, the register file 1125 can be shared by the scalar sub-core 1105, vector ALU 1120, and matrix ALU 1130.

In some embodiments, physical memory of the SVM core 1100 is partitionable (e.g., at bootup time) into different segments. For instance, the vector register file 1125 and the streaming FIFO are two different segments of this partitionable memory in some embodiments. Both the vector register file 1125 and the streaming FIFO can store operands for the vector ALU 1130 (and/or the matrix ALU 1140) in some embodiments. In other embodiments, an L1 cache stores operands and the vector registers are not needed for storing these operands.

The L2 cache 1140 is in some embodiments shared by the scalar sub-core 1105, vector ALU 1120, and matrix ALU 1130. In such embodiments, the scalar sub-core 1105 can use its dedicated L1 cache 1105 and the shared L2 cache 1140 (e.g., depending on whether data is exclusively used by the scalar sub-core 1105 or shared/transferred between the scalar sub-core 1105 and at least one of either the vector ALU 1120 or matrix ALU 1130). In some such embodiments, the vector and matrix ALUs 1120 and 1130 do not have an L1 cache and use only the shared L2 cache 1140. In some embodiments, the vector and matrix ALUs 1120 and 1130 are wide enough (i.e., can handle a large enough number of bits) such that an L1 cache is not needed for storing such data.

In other embodiments, the vector and matrix ALUs 1120 and 1130 can share a second L1 cache of the SVM core 1100, or they can have their own dedicated L1 caches. In still other embodiments, the scalar sub-core 1105 also does not have a dedicated L1 cache and also uses only the shared L2 cache 1140 along with the vector and matrix ALUs 1120 and 1130. That is, different embodiments may use various different combinations of L1 and L2 caches within the SVM core 1100. In some embodiments, the SVM core 1100 also includes an L3 cache that can be shared by two or more of the scalar sub-core 1105, vector ALU 1120, and matrix ALU 1130.

In some embodiments, the scalar sub-core 1105, vector ALU 1120, and matrix ALU 1130 share one unified address space, which can be used to access this shared L2 cache 1140. In some such embodiments, the components 1105, 1120, and 1130 of the SVM core 1100 also share the unified address space with one or more other SVM cores, i.e., they share one or more memory and storage units that are addressable through the unified address space.

In some embodiments, when the SVM core 1100 is a leader SVM core (i.e., when the SVM core performs vISA to pISA conversion operations and/or distributes instructions to worker SVM cores), the SVM core 1100 also includes an additional input queue 1150 and a DMA 1155. In some embodiments, when the scalar sub-core 1105 of the leader SVM core identifies an instruction for which the data should be broadcast to multiple SVM cores, the scalar sub-core places this instruction or a memory request into the DMA input queue 1150. The DMA 1155 reads the input queue 1150 to determine when to request that the memory broadcast data to one or more other SVM cores (i.e., one or more worker SVM cores). For instance, for a convolution operation within a neural network, numerous worker cores might need the same set of weights so that each of these worker cores can compute dot products of the weights with different sets of input activations. In such a situation, the DMA 1155 in some embodiments initiates the broadcast of weights to all of the worker SVM cores in the core array or to the set of worker SVM cores that will use the weights. Rather than each of those worker SVM cores needing to send an individual request to read the same data from memory, the DMA 1155 requests the data once from memory and the memory provides the retrieved data to each of the set of worker SVM cores. Each worker SVM core's streaming FIFO stores this data until it is needed by the worker SVM core in some embodiments.

Figure 12:
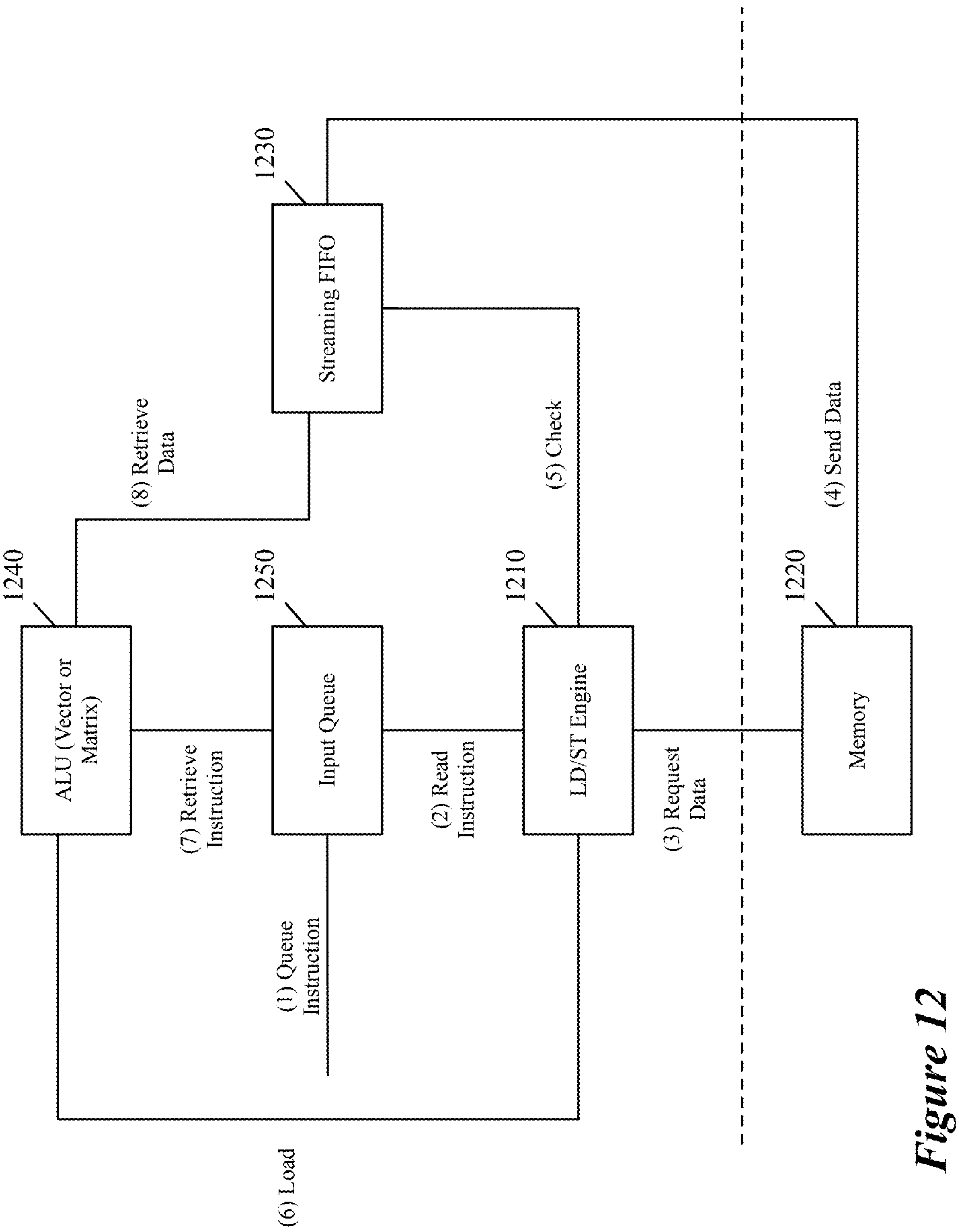
FIG. 12 conceptually illustrates an example data flow diagram of an LD/ST engine that requests data from a memory to be written to a streaming FIFO.

As discussed previously, the LD/ST engine of an SVM core in some embodiments retrieves data to be written into the streaming FIFO for use by a vector and/or matrix ALU. FIG. 12 conceptually illustrates an example data flow diagram of an LD/ST engine 1210 that requests data from a memory 1220 to be written to a streaming FIFO 1230. This data stored in the streaming FIFO 1220 can be used by an ALU 1240 to execute one or more instructions. The ALU 1240 may be a vector ALU that processes at least vector instructions or a matrix ALU that processes at least matrix instructions. This figure also illustrates the input queue 1250 into which instructions for the ALU 1240 are placed. The LD/ST engine 1210, streaming FIFO 1230, ALU 1240, and input queue 1250 are in some embodiments all part of a single SVM core (as shown in FIG. 11), while the memory 1220 resides outside the SVM core (as denoted by the dashed line).

To initiate the data retrieval flow, an instruction to be executed by the ALU 1240 is first placed into the input queue 1250. The instruction is queued in some embodiments by a scalar sub-core (not shown) of the SVM core after identifying the instruction as a vector or matrix instruction for execution by the vector or matrix ALU. Upon the instruction being placed in the input queue 1250, the LD/ST engine 1210 reads the instruction from the input queue 1250 and determines that this instruction requires data that is stored in the memory 1220 (and is not already stored in any of the caches of the SVM core or the streaming FIFO 1230). As such, the ALU 1240 cannot execute the instruction until the data is retrieved. In some embodiments, the ALU 1240 also reads the input queue 1250 at this time and determines that the data needed to execute the instruction is not available. At this point, the ALU 1240 can either wait until the data is available or execute any other queued instructions for which the data is available (and that are not dependent on instructions that have not yet been executed).

The LD/ST engine 1210 sends a request to the memory 1220 for the needed data and the memory 1220 provides this data to the streaming FIFO 1230. The streaming FIFO 1230, in some embodiments, is an optimized temporary storage for data to be accessed by the ALU 1240. In this example, the memory 1220 provides the data directly to the streaming FIFO 1230. In other embodiments, the memory 1220 provides the data to the LD/ST engine 1210, which in turn stores the data in the streaming FIFO 1230.

Next, the LD/ST engine 1210 checks the streaming FIFO 1230 to verify that the requested data is stored in the streaming FIFO 1230. Once it determines that the data is available, the LD/ST engine 1210 issues a load signal to the ALU 1240 to execute the instruction. At this point, the ALU 1240 retrieves the instruction from the input queue 1250 and, based on the instruction, retrieves the data from the streaming FIFO 1230 to execute the instruction. After the ALU 1240 executes the instruction, the input queue 1250 no longer stores the instruction and the streaming FIFO 1230 no longer stores the data.

In this example, the ALU 1240 retrieves the instruction from the input queue 1250 to execute the instruction. However, in other embodiments, the ALU 1240 is part of a sub-core along with a control unit (not shown) which retrieves the instruction from the input queue 1250 and issues control signals to the ALU 1240 to execute the instruction. As described above, this control unit may be a hardware control unit (e.g., a hardware control unit that includes a software microcode engine) or a software control unit (e.g., a microcode engine executed by a scalar processor) in different embodiments. In some such embodiments, the control unit also may decompose the instruction received from the input queue into a set of microinstructions (if necessary, based on the operand size of the instruction) to provide to the ALU 1240 to execute using the data from the streaming FIFO 1230.

As noted above, the LD/ST engine 1210 retrieves the data from memory 1220 after reading the instruction from the input queue 1250 and determining that the required data is not already stored in any of the caches of the SVM core or the streaming FIFO 1230. If the data for the instruction is stored in one of the caches of the SVM core, then some embodiments retrieve the data from this cache without the need for involving the streaming FIFO. In some such embodiments, the vector or matrix ALU 1240 retrieves the data from the cache in order to execute the instruction, while in other such embodiments the ALU 1240 is part of a sub-core along with a control unit that retrieves the data from the cache and provides the data to the ALU 1240. In yet other embodiments, the LD/ST engine 1210 retrieves the data from the cache and provides that data to the ALU 1240 (or to the control unit which provides the data to the ALU 1240).

Figure 13:
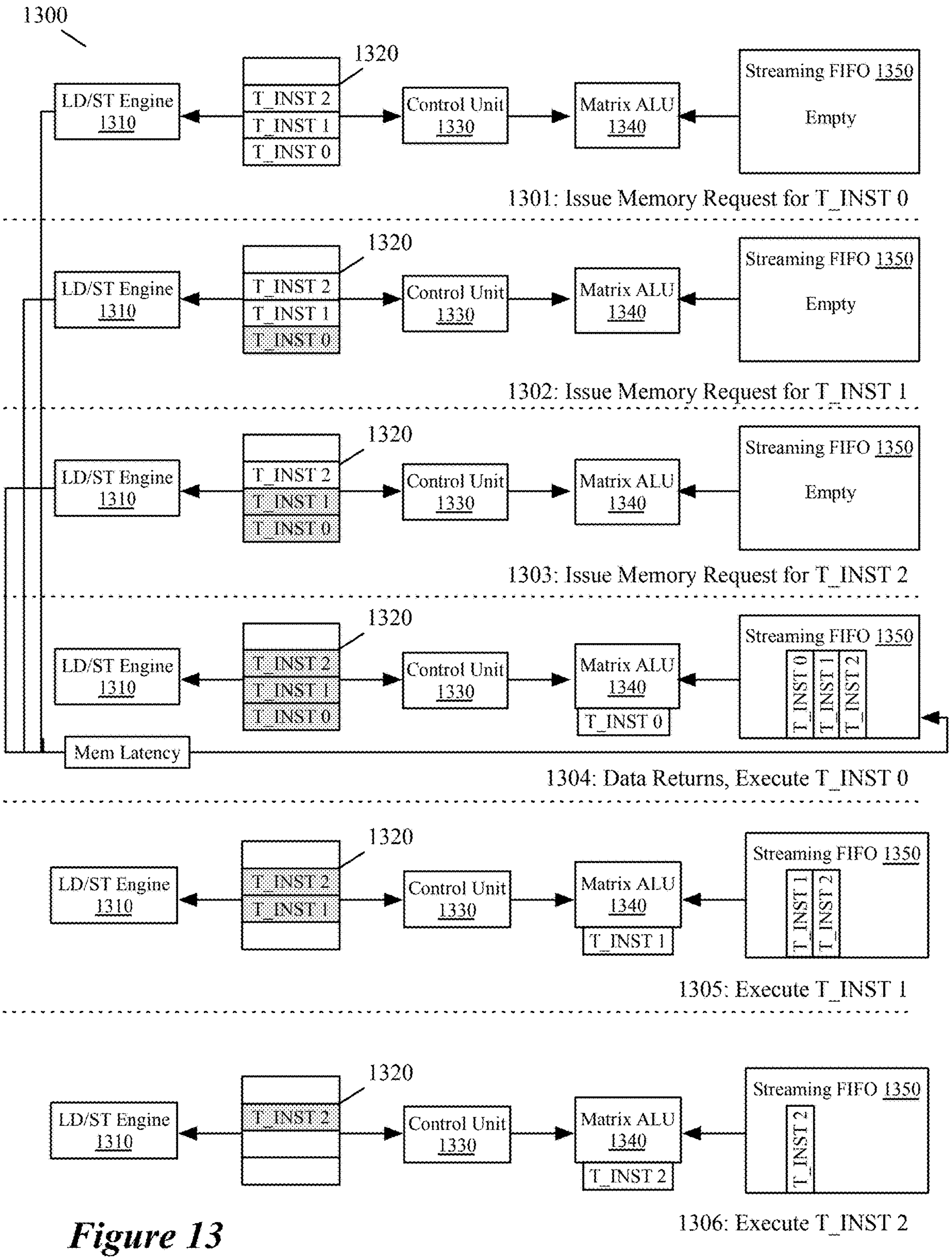
FIG. 13 conceptually illustrates a detailed example of an LD/ST engine retrieving data to a streaming FIFO for use by a matrix ALU.

FIG. 13 conceptually illustrates a more detailed example 1300 of an LD/ST engine 1310 retrieving data to a streaming FIFO 1350 for use by a matrix ALU 1340. This data retrieval and instruction execution process 1300 also involves a control unit 1330 that retrieves the instructions from an input queue 1320 and controls the matrix ALU 1340. The control unit 1330, in some embodiments, also decomposes the instructions into microinstructions as needed. It should be noted that while this figure illustrates a matrix ALU 1340 executing matrix instructions, a similar data retrieval and instruction execution process may also be performed for a vector ALU.

During time steps 1301-1303 (it should be noted that each illustrated time step may take any number of clock cycles), the LD/ST engine 1310 issues three memory requests for each of the instructions (T_INST0, T_INST1, T_INST2) stored in the input queue 1320. The LD/ST engine 1310, in some embodiments, can continue issuing memory requests until the request data count exceeds the capacity of the streaming FIFO 1350. During this time, the matrix ALU 1340 is stalled because there is no data in the streaming FIFO 1350 to supply the instruction(s) in the input queue 1320. The control unit 1330 also does not yet convert the instructions into a size suitable for the matrix ALU 1340, as the matrix ALU 1340 cannot execute the instructions. If the input queue 1320 stored one or more instructions that do not require data from memory and are not dependent on other operations yet to be executed, the control unit 1330 could retrieve those instructions and the matrix ALU 1340 could execute them while waiting for the data from memory.

At time step 1304, data for the three memory requests has returned to the streaming FIFO 1350 after incurring the full memory latency. As the data for the instruction is now available in the streaming FIFO 1350, the control unit 1330 begins issuing microinstructions for the first instruction (T_INST0) to the matrix ALU 1340. In some embodiments, the control unit 1330 starts issuing these microinstructions because the LD/ST engine 1310 monitored the streaming FIFO 1350 to verify that the data for the instructions was now available and issued a load signal to the control unit 1330. In other embodiments, the control unit 1330 monitors the streaming FIFO 1350 itself to determine when to start issuing the microinstructions.

Once the matrix ALU 1340 has both the microinstructions for the first instruction from the control unit 1330 and the data for the first instruction from the streaming FIFO 1350, the matrix ALU 1340 executes the first instruction. Similarly, at time steps 1305 and 1306, the control unit 1330 issues microinstructions respectively for the second and third instructions (T_INST1, T_INST_2) to the matrix ALU 1340, and the matrix ALU 1340 uses the data in the streaming FIFO 1350 to execute the microinstructions for the second and third instructions.

The process 1300 works even when a large amount of data is needed. For instance, a large data block (e.g., a very large matrix) may in some embodiments be partially processed by the LD/ST engine 1310 up until the size of the streaming FIFO 1350 is reached. To prevent a deadlock or denial of service, the LD/ST engine 1310 stops issuing memory requests if there is insufficient space in the streaming FIFO 1350 for the return data. For this reason, for full performance the streaming FIFO 1350 of some embodiments is deep enough to handle the round-trip latency from the LD/ST engine to the return data. In addition, as the streaming FIFO fills up, the control unit 1330 will typically issue microinstructions to the matrix ALU 1340 which causes the streaming FIFO 1350 to empty as the matrix ALU 1340 retrieves the data from the streaming FIFO. As such, a continuous stream of data will be maintained as long as the streaming FIFO 1350 is deep enough.

In these examples, the load/store engine 1135 retrieves data and stores that data in the streaming FIFO 1145. However, in other embodiments, the SVM core does not include a streaming FIFO or does not use the streaming FIFO for all retrieved data. Instead, the load/store engine of some embodiments directly stores retrieved data into the register file 1125. The vector and/or matrix ALUs 1120 and 1130 can then use this retrieve this data as needed from the register file 1125 without use of the streaming FIFO.

The above discussion describes the control unit of an SVM core decomposing an instruction into microinstructions for execution by the matrix or vector ALU. In some embodiments, the control unit is able to directly interpret an entire suite of tensor (vector, matrix, and/or higher-level) tensor operations (e.g., the tensor operator set architecture (TOSA) suite of commands) and convert these operations into low level instructions. In some embodiments, the common ISA shared across cores and sub-cores (e.g., a RISC-V ISA) includes extensions based on such a suite of tensor instructions. In addition, some embodiments implement some or all of the control unit of the SVM core as software (e.g., C++ code) that executes on the scalar sub-core of the SVM core to handle certain features that are not supported by the suite of tensor commands.

The following provides several examples of different types matrix instructions executed by the sub-cores (e.g., by the matrix sub-core) of an SVM core:

T_MATMUL R[0:63]<1024*64*FP16>, R[64:127]<1024*64*FP16>, STREAM0<1024*1024*FP16>

T_ADD R[0:3]<4096*FP16>, R[4:7]<4096*FP16>, R[8:11]<4096*FP16>

T_DOT R[0][0:255]<128*FP16>, R[16:31]<128*128*FP16>, @(S0+480)<128*128*FP16>

T_SUM S0[0:15]<FP16>, R[0:3]<64*64*FP16>

T_ADD R0<512*FP32>, R1<512*FP32>, R2<512*FP32>

In some embodiments, the source and destinations of instructions are tensors (e.g., matrices) and refer to a block of registers, a block of memory, or a stream. In some embodiments, the dimensions of each tensor are defined by the leader SVM core of an array such that register assignment has already occurred by the time a control unit of a worker SVM core's sub-core sees the instruction. For example, FP16<64*4096> (a 64×4096 matrix of 16-bit floating point values) requires 512 KB, which could be mapped to R[0:255](256 2048-byte registers).

Three examples of register operands used in some embodiments are the following:

R[0:63]<64*1024*FP16>

R[256:511]<64*256*16*FP16>

R[16:31]<32*16*16*FP32>

Two examples of memory operands used in some embodiments are the following:

@(S0+0)<4096*4096*FP16>, a 32 MB memory block storing a 4096×4096 matrix of 16-bit floating point values @(S3+0x24000)<32*256*256*FP32>, an 8 MB memory block storing a 32×256×256 tensor of 32-bit floating point values Two examples of stream operands used in some embodiments are the following:

STREAM0<4096*4096*FP16>

STREAM0<32*256*256*FP32>

Some embodiments support at least two streams (i.e., at least STREAM0 and STREAM1), or up to 4 independent streams. Also, in some embodiments, only the leader SVM core of an SVM core array can issue the DMA commands needed to fill these streams. In some such embodiments, these DMA commands have a broadcast component allowing the same data to be broadcast to multiple worker SVM cores (similar to the DMA 1155 of FIG. 11).

Memory and stream operands in some embodiments take on different sizes and can be used as operands for any matrix instruction (e.g., matrix multiply (MATMUL)). In some embodiments, using memory or stream operands are advantageous because (1) register space does not need to be allocated for the operands and (2) the operands can be larger than the available register space. Also, for stream operands, latency hiding is taken care of by the streaming FIFO and data can be broadcast to multiple SVM cores (using DMA commands), which greatly reduces memory bandwidth.

The use of stream operands is critical to supporting the desired bandwidth and latency hiding of some embodiments. For example, to stream weights and key-value (KV) cache values (e.g., for a large language model (LLM) network), the leader SVM core sets up its DMA to stream all the weights for the entire network or a portion of the network. These weights and/or KV cache values are broadcast to the streaming FIFOs of all SVM cores executing instructions to implement the network. As each SVM core reaches the point in its instruction stream where it needs the weights or KV cache values, these values are specified as stream operands in the instruction and the matrix (or vector) execution unit pulls these values directly from its streaming FIFO.

In some embodiments, model parallelism requires communication between SVM cores. This is accomplished in some embodiments by directly copying into another SVM core's register space, e.g., with an instruction such as:

T_COPY RISCVn:R[32:95], R[0:63]

The value "n" identifies the SVM core that is assigned by the instruction, such as an parallelized call instruction as described in the concurrently filed U.S. patent application Ser. No. 18/916,645, entitled "Generation and Distribution of Commands for Parallel Execution at Core Array," which is incorporated by reference above. The receiving SVM core needs notification that data has been received. In some embodiments, this is done by waiting on a write to a specific register. For example, for the above-mentioned example, this would be done by waiting on the last register in the block (R95), using an instruction such as:

T_WAIT R95.

The use of interconnect fabric to copy data from the registers of one SVM core to another SVM core is further described below by reference to FIG. 16.

Figure 14:
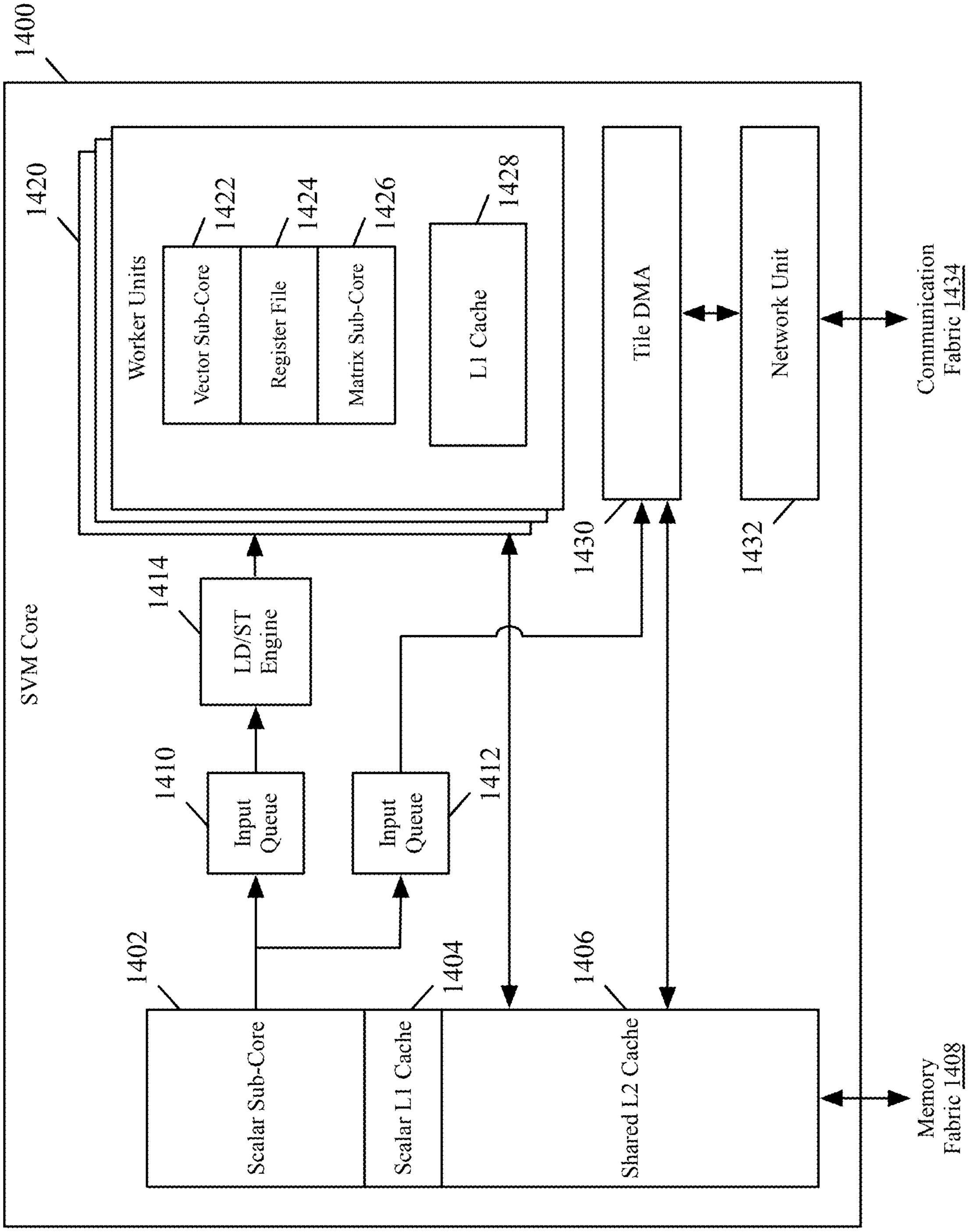
FIG. 14 conceptually illustrates another implementation of a heterogenous SVM core that executes at least scalar, vector, and matrix instructions.

The above figures describe different components of an SVM core of some embodiments and their operations. However, other embodiments of an SVM core may include one or more different components. FIG. 14 conceptually illustrates another implementation of a heterogenous SVM core 1400, which also executes at least scalar, vector, and matrix instructions (e.g., as an accelerator for a CPU of a host computer or other device). Similar to the SVM core 1100 of FIG. 11, the SVM core 1400 includes a scalar sub-core 1402, a scalar L1 cache 1404, a shared L2 cache 1406, an input queue 1410, and an LD/ST engine 1414.

These components perform operations similar to their corresponding components in FIG. 11.

This figure illustrates one scalar sub-core 1402 and multiple worker units 1420, with each worker unit 1420 having one vector sub-core 1422 and one matrix sub-core 1426 that share a register file 1424 and an L1 cache 1427. These vector and matrix sub-cores 1422 and 1426 in some embodiments include vector and matrix ALUs (similar to the vector and matrix ALUs 1120 and 1130 of FIG. 11) and control units (such as hardware control units or microcode engines). While the scalar sub-core 1402 has its own dedicated L1 cache 1404 (which can be alternatively referred to as a layer 0 (L0) cache), the vector and matrix sub-cores 1422 and 1426 of each worker unit 1420 share both an L1 cache 1428 and a register file 1424.

The scalar sub-core 1402 and the vector and matrix sub-cores 1422 and 1426 of the worker units 1420 share an L2 cache 1406. That is, within each worker unit 1420, the individual vector and matrix sub-cores 1422 and 1426 share an L1 cache 1420, while all of the vector and matrix sub-cores collectively share an L2 cache 1406 with the scalar sub-core 1402. This shared L2 cache 1406 is connected to a memory fabric 1408 in some embodiments, which connects the SVM core 1400 to the shared memory. Conjunctively or alternatively, the SVM core 1400 in some embodiments includes an L2 cache that is shared with one or more other SVM cores (e.g., other SVM cores of the same virtual or physical SVM core array).

To avoid unnecessary detail that would hinder the understanding of the SVM core 1400, some elements are not shown, such as a streaming FIFO and an additional L2 cache for storing data retrieved from memory. However, the SVM core 1400 of some embodiments may also include one or more of these elements.

In this figure, the SVM core 1400 also includes a tile DMA 1430, an input queue 1412 for the tile DMA 1430, and a network unit 1432. This tile DMA 1430, in some embodiments, provides a high-bandwidth and low-latency method for the movement of data between neighboring cores in a core array. In some embodiments, the tile DMA 1430 is responsible for moving data (1) between the SVM core 1400 and one or more other SVM cores, (2) between the SVM core 1400 and memory residing outside of the SVM core 1400, and (3) between packages, nodes, and/or physical units (e.g., other core arrays) through a network.

The network unit 1432 is in some embodiments a transition layer for the tile DMA 1430, especially for remote access across SVM cores and/or nodes. In some such embodiments, this remote access requires the use of one or more third-party networks, such as the Internet. Using the network unit 1432, the tile DMA 1430 is able to access a communication fabric 1434 in order to perform its responsibilities and move data to and from the SVM core 1400.

Figure 15:
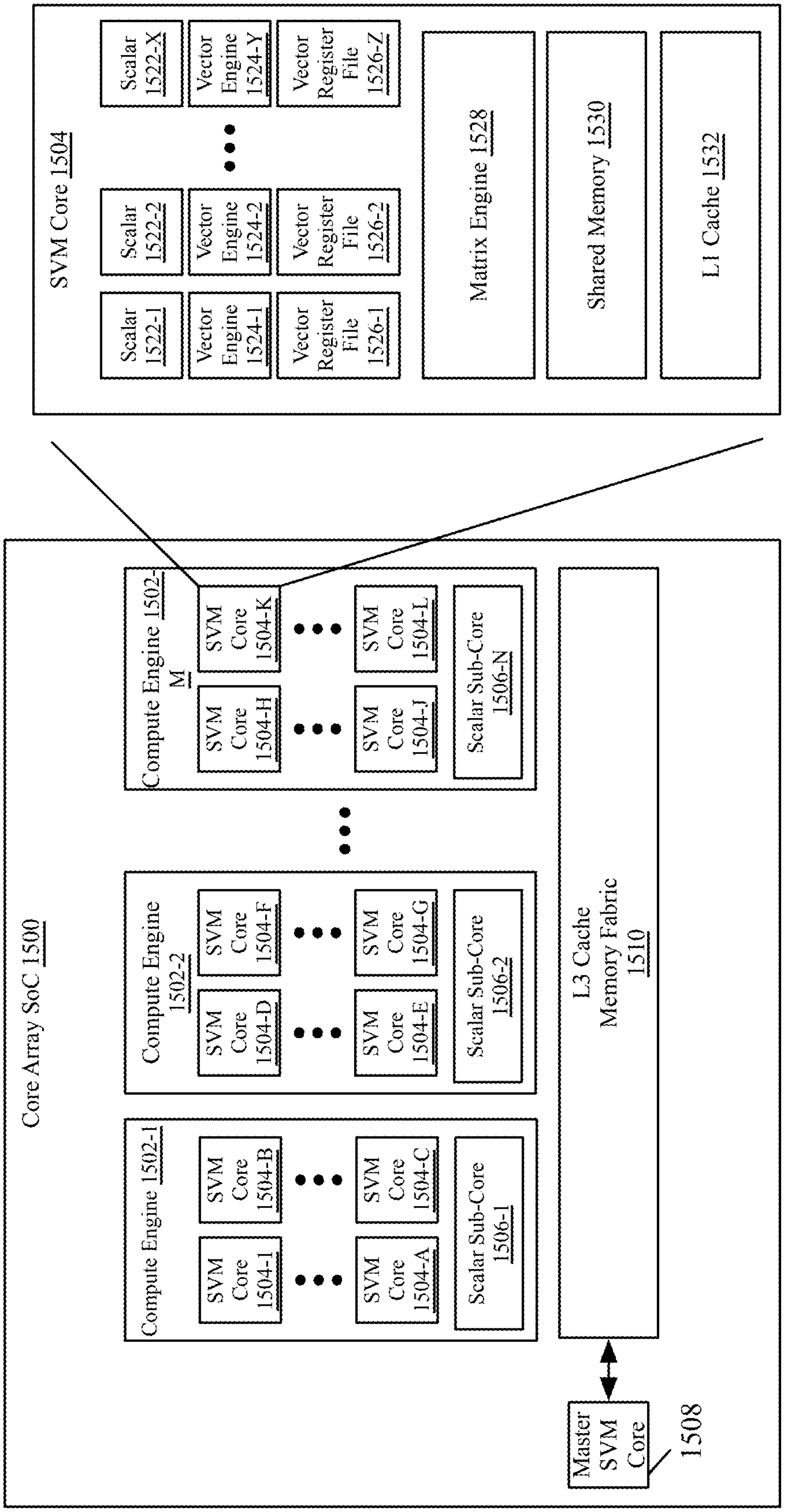
FIG. 15 conceptually illustrates another example SVM core that is part of a core array System on Chip (SoC).

FIG. 15 conceptually illustrates yet another example SVM core 1504, which is part of a core array System on Chip (SoC) 1500. This core array 1500 can be connected to a device (e.g., a host computer) to accelerate a subset of operations of the device. In this example, the core array SoC 1500 includes (1) a set of one or more compute engines 1502, each having one or more SVM cores 1504 and a scalar sub-core 1506, (2) a leader SVM core 1508, and (3) an L3 cache memory fabric 1510.

In some embodiments, the different compute engines 1502 are on different single compute block physical units, such as different IC dies or different chiplets. Each compute engine 1502 of the core array SoC 1500 includes a set of SVM cores 1504 and a scalar sub-core 1506. The scalar sub-cores 1506 are responsible for providing instructions to the SVM cores 1504 for execution. Each SVM core 1504 includes one or more scalar engines 1522 for executing scalar instructions, one or more vector engines 1524 for executing vector instructions, and a matrix engine 1528 for executing matrix instructions. The scalar engines 1522 in some embodiments support scalar instructions (e.g., RISC-V instructions) with vector extensions, and are part of the SVM cores 1504 to dispatch vector and matrix instructions to the vector and matrix engines. In some embodiments, the scalar engines 1522 also support SPMD and/or Single Instruction Multiple Threads (SIMT) code.

Each SVM core 1504 also includes one or more register files 1526 for the vector engines 1524, a shared memory 1530, and a shared L1 cache 1532. In some embodiments, the matrix engine 1528 is able to access both the register files 1526 and the shared memory 1530. In other embodiments, the matrix engine 1528 accesses only the shared memory 1530. The L1 cache 1532, in different embodiments, is shared between different combinations of the scalar engines 1522, vector engines 1524, and matrix engine 1528.

The leader SVM core 1508 has the same components as each of the SVM cores 1504 in some embodiments. In some such embodiments, the scalar engine of the leader SVM core 1508 dispatches the instructions to the SVM cores 1504 (e.g., via the scalar sub-cores 1506). In some embodiments, one or more scalar engines, one or more vector engines, and/or one or more matrix engines of the leader SVM core 1508 executes instructions in addition to the SVM cores 1504.

The L3 cache memory fabric 1510 of the core array SoC 1500 is shared by each of the compute engines 1502. In some embodiments, the leader core 1508 dispatches parallel instructions to the SVM cores 1504 of the compute engines 1502 through the shared L3 cache memory fabric 1510. In some embodiments, the leader SVM core 1508 dispatches heavy scalar operations to the scalar sub-cores 1506 for execution instead of the SVM cores 1504.

In some embodiments, SVM cores of an SVM core array have an interconnect fabric that communicatively links the SVM cores to each other. Some embodiments also use multiple SVM core arrays to form larger multi-processor systems. In some such embodiments, each SVM core array is a distinct compute block (CB) with interconnect fabric that connects the core array to other core arrays (i.e., to other compute blocks).

Figure 16:
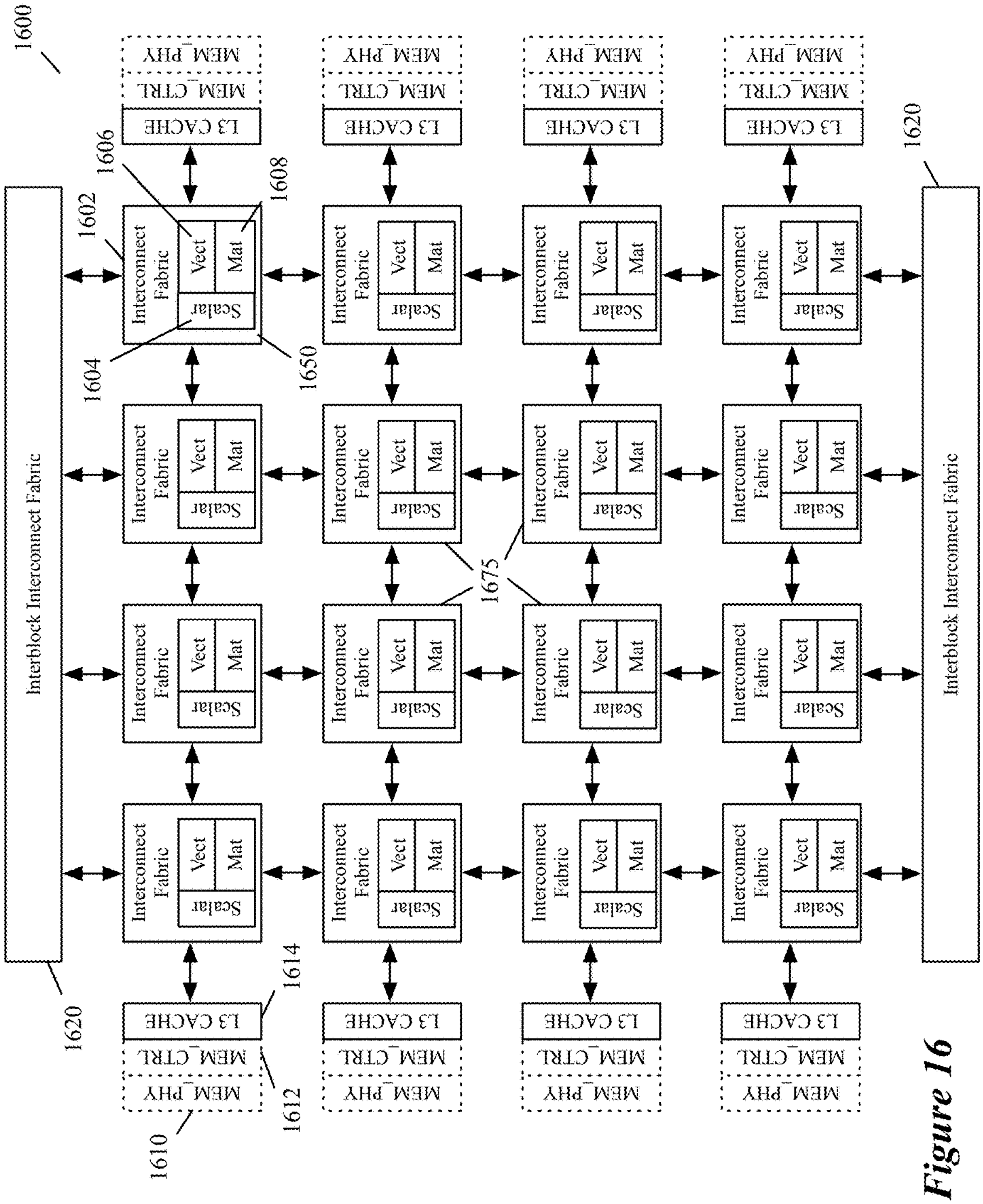
FIG. 16 conceptually illustrates an example of an SVM core array with two types of interconnect fabrics that (1) connect the cores to other cores in the same array and (2) connect the core array to other core arrays.

FIG. 16 illustrates an example of an SVM core array 1600 with two types of interconnect fabrics that (1) connect the cores to other cores in the same array 1600 and (2) connect the core array 1600 to other core arrays. In this example, the array 1600 is a 4×4 array of SVM cores 1650, but it can be any size array (e.g., 3×3, 5×5, 8×8, or N×M array of 9, 25, 64 or N*M SVM cores, where N and M are integers and can be the same or different values). As shown, each SVM core includes a scalar sub-core 1604, a vector sub-core 1606, and a matrix sub-core 1608. These sub-cores 1604-1608 are similar in some embodiments to the above-described scalar, vector, and matrix sub-cores of FIG. 1, 11, 14, or 15.

In FIG. 16, the two types of interconnect fabrics are (1) a first set of interconnect fabric 1602 that connects each SVM core in the array to other SVM cores within the array 1600, and (2) a second set of interconnect fabric 1620 that connects the SVM core array 1600 to other SVM core arrays (i.e., connects the compute block 1600 to other compute blocks).

This figure also illustrates interfaces 1610 and 1614 to cache and memory units that can be shared among the SVM cores in the array 1600. Through the L3 cache interface 1614, the SVM cores of the array 1600 connect to an L3 cache that is shared among the cores of the array 1600. This cache can have a two dimensional (2D), two-and-half dimensional (2.5D) or three dimensional (3D) arrangement with respect to the SVM core array.

For instance, in some embodiments, one or more L3 caches (that connect through the L3 cache interface 1614 with the cores of the core array 1600) can be on the same planar surface as the core array and connect through interfaces typically used to connect dies or chips that are on the same planar surface. Alternatively, in other embodiments, one or more L3 cache units have a 2.5D connection with the SVM cores of the array 1600 when a silicon interposer is used, or a 3D connection with these cores when the L3 cache unit(s) are stacked vertically above or below the SVM core array 1600 (i.e., on a different plane above or below the SVM core array).

Through the memory physical interfaces (MEM_PHY) 1610 and memory controllers (MEM_CTRL) 1612, the SVM cores of the array 1600 connect to one or more memory units. These memory units can be any number and arrangement of memory units, such as four to eight memory units that neighbor the SVM core array 1600 on a two dimension planar surface or on a silicon interposer, or one to N memory units that stack vertically over the core array 1600 or are placed on the same interposer as the core array 1600, or any combination of 2D, 2.5D and/or 3D arrangements of memory units and core array 1600.

As mentioned above, the interconnect fabric 1602 of an SVM core allows this core to connect to other SVM cores within the array 1600. In some embodiments, the interconnect fabric 1602 includes (1) interconnect circuitry (e.g., hub, switch, etc.) and (2) physical interconnect connection (e.g., wiring (such as IC metal wiring of an IC die), substrate interconnect, etc.). Using the interconnect fabric 1602, SVM cores in the array 1600 can send data to and receive data from each other.

For example, when an instruction requires copying of a set of data from a first register file of a first set of vector and matrix sub-cores to a second register file of a second set of vector and matrix sub-cores, the set of data is in some embodiments sent through interconnect fabric 1602 of one or more SVM cores to reach the second register file. The interconnect fabric 1602 can also facilitate communication between scalar sub-cores 1604. Similarly, in some embodiments, the interconnect fabric 1602 between two SVM cores of an array allows data to be copied from the cache of one SVM core to the cache or registers of the other SVM core.

Through the interconnect fabric 1602, each SVM core accesses the L3 cache interface 1614 and/or a memory interface 1610/1612 in order to access an L3 cache and/or a memory that is shared by two or more SVM cores 1650 (e.g., all SVM cores) in the core array 1600. For example, when an LD/ST engine (not shown) of an SVM core in some embodiments sends a data request to the memory for its associated vector or matrix sub-core 1606/1608, this data request is sent through the interconnect fabric 1602 of the LD/ST engine's SVM core to reach the memory through its memory interface and control 1610 and 1612. The data is then sent from the memory and back through its interface and control 1610 and 1612, through the interconnect fabric 1602 to reach the LD/ST engine's SVM core (e.g., where it is stored in the streaming FIFO of the core).

In other embodiments, some of the locations in the array are memory circuits rather than SVM cores. In the example illustrated in FIG. 16, all of the 16 locations in the 4×4 array are SVM cores which are interconnected by the interconnect fabric 1602. However, in some embodiments the internal four locations 1675 could be memory circuits with the external twelve locations being SVM cores 1650. For larger core arrays (e.g., 8×8 arrays), some embodiments intersperse memory circuits with the SVM cores or have a larger number of internal memory circuits (e.g., the internal 4×4 grid within the array).

As mentioned above, the SVM core array 1600 is treated as a distinct compute block (CB) in some embodiments, and the interblock interconnect fabric 1620 of this CB 1600 allows this block to connect to multiple other CBs (e.g., to multiple other SVM core arrays) to form a large multi-processor system. In some embodiments, the interblock interconnect fabric 1620 includes (1) physical interconnect (e.g., wiring (such as metal wiring of an IC die/interposer and/or pin/ball grid arrays), substrate interconnect, etc.) and (2) circuitry (e.g., a switch that connects the switch/hub circuits 1602 of two or more SVM cores in the array 1600 to the physical interconnect of the interblock interconnect fabric 1620). The interblock interconnect fabric 1620 allows an SVM core in one CB to communicate with, or have access to the resources of, an SVM core in another CB (i.e., in another core array).

In some embodiments, each CB (i.e., each SVM core array) is not only treated as a different computational unit than the other CBs but is also implemented as a different physical unit. For instance, each CB in some embodiments is implemented on a different IC die. In some of these embodiments, each CB's IC die is a chiplet that is placed on one silicon interposer along with other CB chiplets such that a portion of the interblock interconnect fabric 1620 is established through the silicon interposer.

The multi-processor system of some embodiments includes multiple CBs in a single CB arrangement (e.g., one CB array), and the CBs in this arrangement (e.g., array) share one or more memory units. In some such embodiments, one particular CB can access a memory unit that is a "local" memory unit of the particular CB as it is near the particular CB (e.g., is a physical adjacent neighbor of the CB), or can access a more "remote" memory unit that is not a neighbor of the particular CB (e.g., is not physically adjacent to the particular CB) or is not near the particular CB.

In the multi-processor system of some embodiments, multiple CBs in a CB array share a common memory address space to access several memory units shared among the CBs. In some embodiments, one example of a remote memory unit for a particular CB is a memory unit that is a local memory unit of another CB (e.g., as it is a physically adjacent neighbor of the other CB), where the other CB does not neighbor the particular CB in the CB array. Other embodiments define a remote memory unit for a particular CB differently (e.g., specify that the remote memory unit is a memory unit on another CB than the particular CB).

In some embodiments, all the CBs that use the common memory address space to access a common set of memory units use one memory addressing scheme to access all the memory units. In other words, all the CBs in these embodiments use a common set of addresses to access all the memory units that are within one address space as each location in each memory is identifiable through just one address.

Other embodiments allow CBs to access memories through local addresses for local memories of the CBs and through global addresses for remote memories of the CB. In other words, a particular CB in some embodiments uses a local addressing scheme to access a memory that is local to the particular CB, but uses a global addressing scheme to access a remote memory that is not local to the particular CB (e.g., a memory that is not near the particular CB or does not neighbor the particular CB). However, in some of these embodiments, the local and remote memories of the CBs are within one common memory address space as each location in any memory is addressable through one unique local address and one unique global address.

As mentioned above, some embodiments use a common ISA to define the instructions that need to be executed by all of the sub-cores of the heterogeneous SVM core. Similarly, some embodiments use the common ISA to define the instructions that need to be executed by all the CBs in a CB arrangement (e.g., CB array). This is the case even for some embodiments that employ different types of CBs in the CB arrangement. Examples of such different types of CBs include cache compute blocks (CCBs), memory compute blocks (MCBs), and network compute blocks (NCBs).

As mentioned above, some embodiments use one leader core to provide for the common scheduling and distribution of instructions for all of the cores of a core array. Similarly, some embodiments use one leader core of one core array to provide common scheduling and distribution of instructions for all of the cores of multiple core arrays (i.e., use one leader core of one CB as the leader core for all the cores of all the CBs that are in one CB array). This is further described in the above-incorporated concurrently filed U.S. patent application Ser. No. 18/916,645, entitled "Generation and Distribution of Commands for Parallel Execution at Core Array", as well as below by reference to FIGS. 23 and 24.

Figure 17:
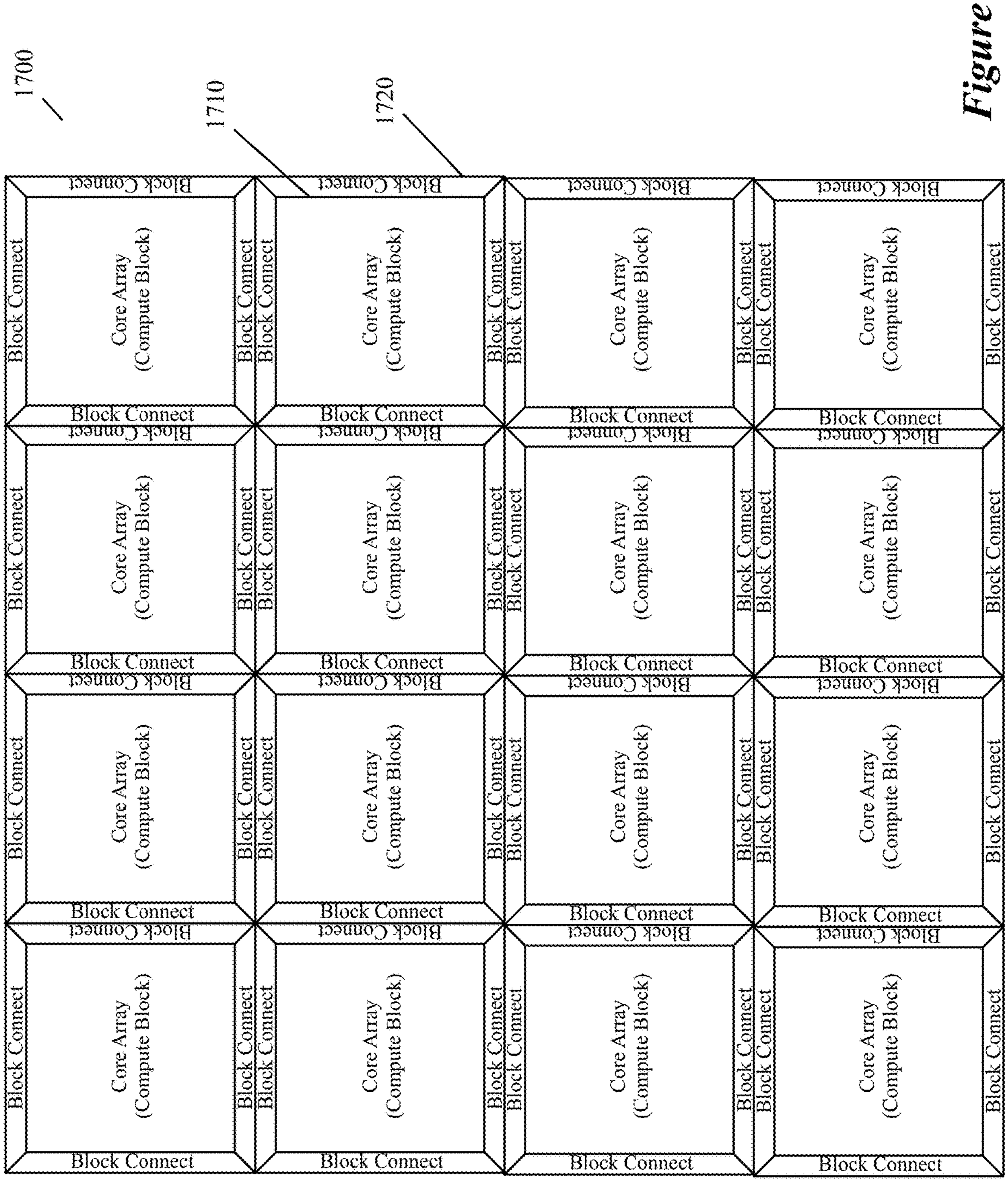
FIG. 17 conceptually illustrates an example of connecting multiple CBs through the interblock interconnect fabric to form a robust multi-processor system.

FIG. 17 conceptually illustrates an example of connecting multiple CBs (i.e., multiple SVM core arrays) through the interblock interconnect fabric 1620 to form a robust multi-processor system 1700. The multi-processor system in this example is a 4×4 array 1700 that is formed by 16 CBs that are placed in four columns and four rows. In some embodiments, the CBs in this array form a larger scale computational unit that has the computational power of its constituent 16 CBs 1710. Other embodiments use a different number of CBs in a CB array, or use other arrangements of CBs rather than using the array illustrated in FIG. 17.

In some embodiments, each CB can have any number of SVM cores arranged in any number of arrangements. Also, in some embodiments, all the CBs in the CB array 1700 have the same type, number and/or arrangement of SVM cores. In other embodiments, however, some or all of the CBs in the array 1700 have different types, numbers, and/or arrangements of SVM cores. Also, in some embodiments, each CB 1710 is manufactured on its own individual die and does not share its die with any other CBs in the array 1700. In some such embodiments, each CB is a chiplet and connects to other CBs through a silicon interposer. The manufacturing of individual chiplets rather than a larger chip with all of the CBs on a single die makes the manufacturing process more robust to defects (as a defect in a core only affects an individual CB rather than an entire array of otherwise defect-free CBs). In other embodiments, two or more CBs are manufactured on one die.

In FIG. 17, the CBs 1710 are interconnected with interblock fabric 1720. The interblock fabric 1720 includes CB interfaces used to stitch the CBs 1710 together to form the array 1700 and allows for a scalable multi-processor core array architecture. Multiple terabyte/second bandwidth can be achieved through the interblock fabric 1720 in some embodiments. Examples of such interblock fabric used in some embodiments include interconnects provided by Silicon Box Ltd., NuLink™ chiplet interconnect offered by Eliyan Inc., and Smart Substrate™ offered by ChipletZ Inc.

Some embodiments use multiple CB arrangements (e.g., multiple CB arrays) to implement an even more robust multi-processor system. In some such embodiments, each CB arrangement (e.g., each CB array) is treated as a separate computational unit. Moreover, each CB arrangement (e.g., each CB array) is implemented as it own distinct physical unit (e.g., is implemented on a different PCB than other CB arrays).

Figure 18:
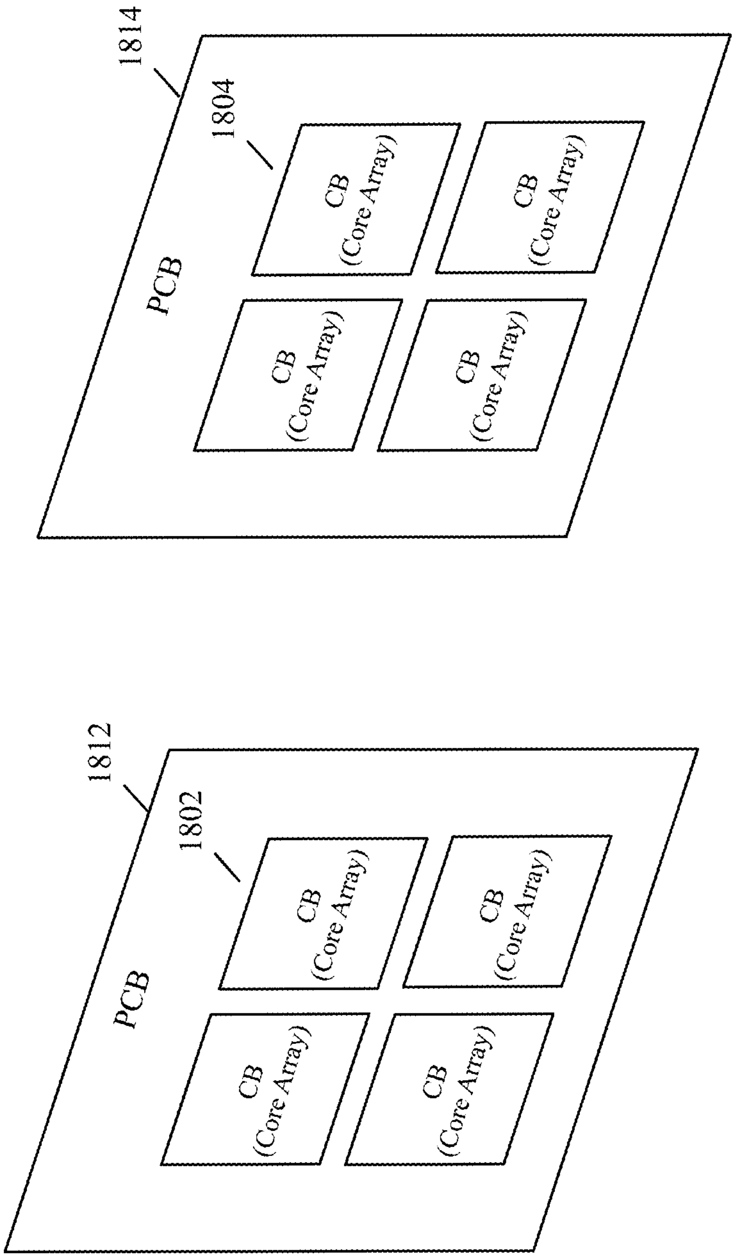
FIG. 18 conceptually illustrates an example of multi-processor system formed by two CB arrays that are implemented on two PCBs.

FIG. 18 conceptually illustrates an example of multi-processor system 1800 that is formed by two CB arrays 1802-1804, which are implemented on two PCBs 1812-1814. In this example, each CB array is a 2×2 CB array formed by four CBs that are placed on one PCB 1812 or 1814. In some embodiments, each PCB 1812 or 1814 plugs into a host computer's interface (e.g., its PCIE interface) to provide hardware acceleration operations for the host computer. Instead of using multiple PCBs to implement multiple CB arrangements (e.g., multiple CB arrays), other embodiments use other multi compute block physical unit realizations to implement multiple CB arrangements.

Figure 19:
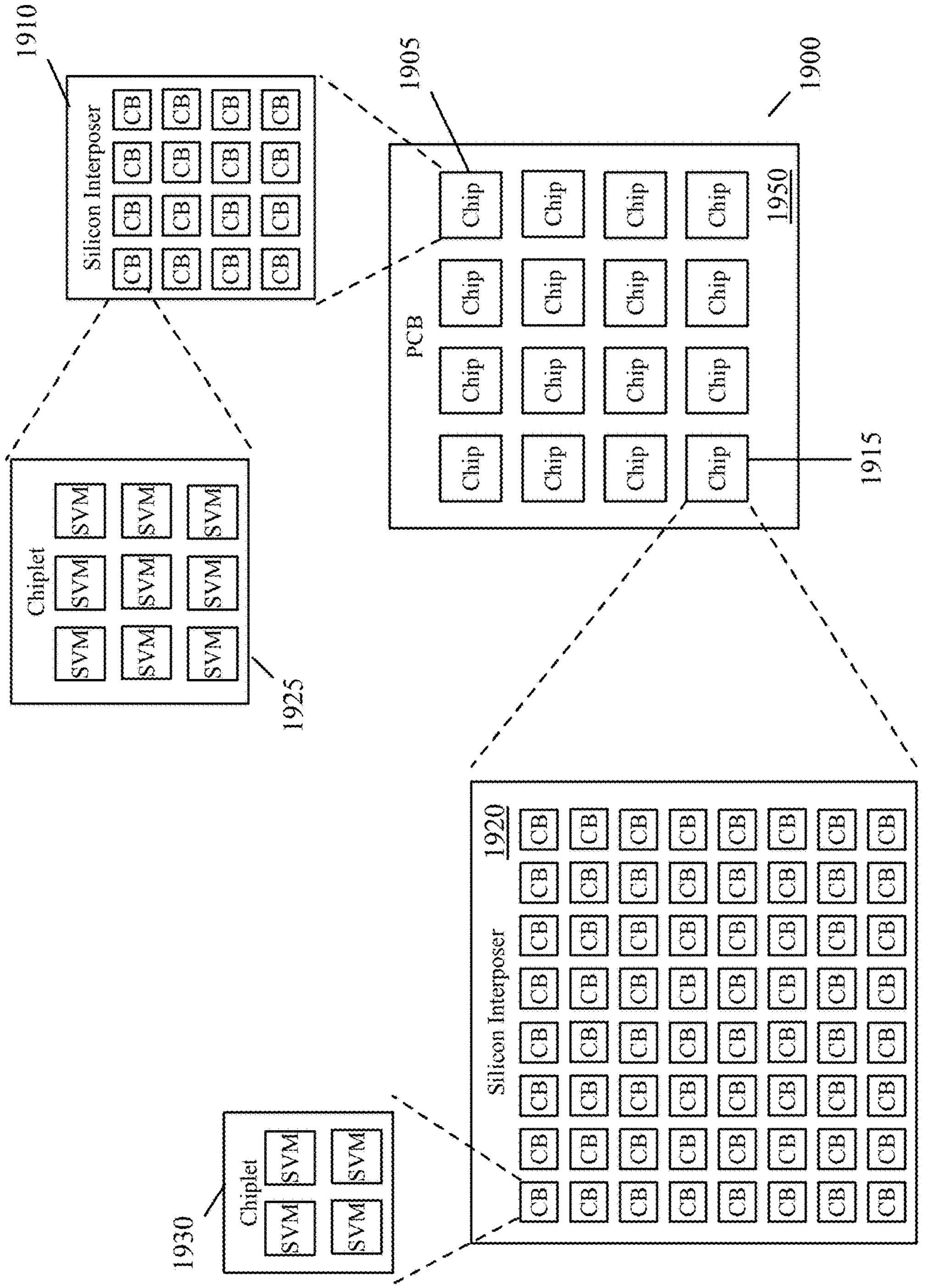
FIG. 19 conceptually illustrates a multi-processor system with multiple CB arrays (chips) placed on a single PCB.

For instance, FIG. 19 conceptually illustrates a multi-processor system 1900 with multiple CB arrays (chips) placed on a single PCB (e.g., a single motherboard) 1950. In this case, 16 chips are placed on the PCB 1950 in a 4×4 chip array, but any number of chips can be placed on such a PCB in some embodiments to form a large core arrangement. This core arrangement may be an array of chips (as shown in this figure) or a different arrangement, in some embodiments. In some embodiments, each of these chips includes a silicon interposer on which an array of CBs is placed. These CB arrays, in some embodiments, can also have different dimensions (e.g., any N×M dimensions, where N and M are integers that are equal or different). For instance, the chip 1905 includes a silicon interposer 1910 on which 16 CBs are placed in a 4×4 array. Meanwhile, the chip 1915 includes a silicon interposer 1920 on which 64 CBs are placed in an 8×8 array. Each of the CBs is a chiplet (e.g., a die) holding an array of cores (e.g., SVM cores, as shown in previous examples). For instance, on the chip 1905, one of the CBs 1925 is a chiplet with 9 SVM cores in a 3×3 array. On the chip 1915, one of the CBs 1930 is a chiplet with 4 SVM cores in a 2×2 array.

All the CBs in the multi-processor system 1800 of FIG. 18 or the multi-processor system 1900 of FIG. 19 share one or more memory units in some embodiments. In some such embodiments, one particular CB can access a memory unit that is a "local" memory unit of the particular CB as it is near the particular CB (e.g., is a physical adjacent neighbor of the CB or, in the multi-processor system 1800, is on the same PCB), or can access a more "remote" memory unit that is not a neighbor of the particular CB (e.g., is not physically adjacent to the particular CB), or is not near the particular CB (e.g., is on another PCB than the particular CB in the multi-processor system 1800).

The CBs on the different PCBs 1812 and 1814 or on the PCB 1950 share a common memory address space to access the memory units shared among these CBs (i.e., within and across CB arrays) in some embodiments. Like the CBs within one CB arrangement, the CBs of different CB arrangements that are part of the same multi-processor system in some embodiments use one memory addressing scheme to access all the memory units. In other words, all the CBs on the two arrays 1802 and 1804 (or on the 16 chips on the PCB 1950) in these embodiments use a common set of addresses to access all the memory units that are within one address space as each location in each memory is identifiable through just one address.

Other embodiments allow the CBs in one particular CB or CB array to access memories through local addresses of local memories of the particular CB or CB array and through global addresses for remote memories that are associated with other PCB arrays (e.g., on the PCB of the other CB array in FIG. 18). However, in some of these embodiments, the local and remote memories of the CB arrays are within one common memory address space as each location in each memory is addressable through one unique local address and one unique global address.

In addition, some embodiments use the common ISA to define the instructions that need to be executed by all the CBs in the different CB arrangements (e.g., in the CB arrays 1812 and 1814 or on all 16 chips on the PCB 1950). Also, some embodiments use one leader core of one CB in one CB arrangement to provide a common node for generating, scheduling and distributing of instructions for all of the cores of all the CBs of all the CB arrangements. In other embodiments, one leader core generates the instructions for all of the cores of all of the CBs of all CB arrangements, but uses other leader cores of another CB arrangement to schedule and/or distribute the instructions that the other CB arrangement has to execute. In still other embodiments, different CB arrangements have different leader cores that generate, schedule and distribute the instructions for the cores in their own CB arrays. This is further described in the above-incorporated concurrently filed U.S. patent application Ser. No. 18/916,645, entitled "Generation and Distribution of Commands for Parallel Execution at Core Array", as well as below by reference to FIG. 25.

Figure 20:
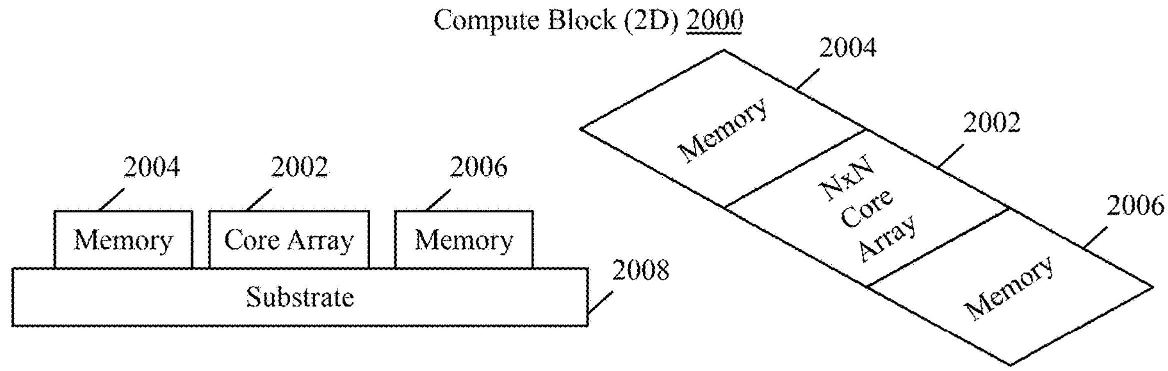
FIGS. 20-22 conceptually illustrate 2D, 2.5D, and 3D implementations of a CB.
Figure 21:
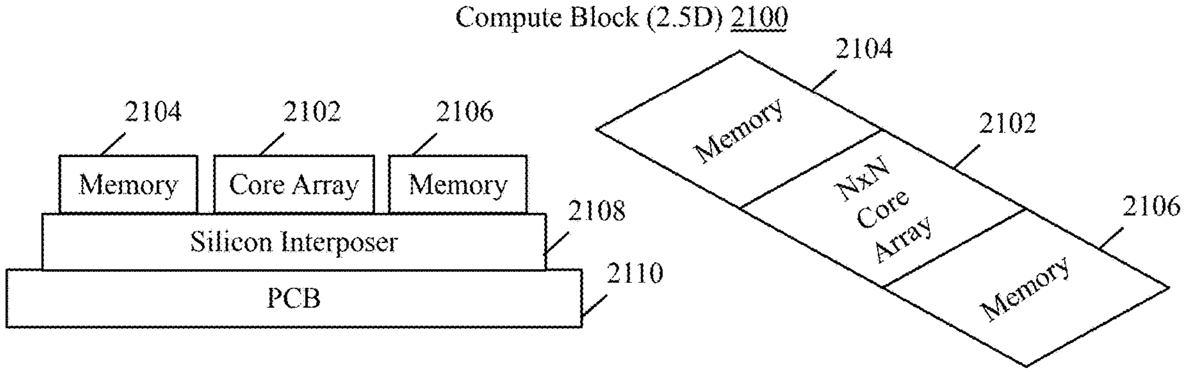
Figure 22:
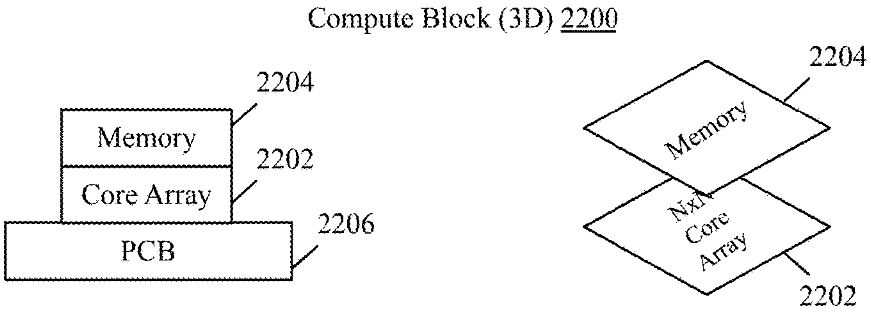

Different embodiments may manufacture compute block chiplets using different packaging techniques, such as 2D, 2.5D, and 3D, to package the compute cores along with the memory and/or cache onto a substrate. FIGS. 20-22 conceptually illustrate various different physical implementations of compute blocks that use different packaging techniques. FIG. 20 conceptually illustrates a compute block 2000 manufactured using a 2D packaging technique. This compute block 2000 has an N×N core array 2002 and adjacent memories 2004-2006 (e.g., Low-Power Double Data Rate 5 (LDPPR5) or High Bandwidth Memory 3 (HBM3) memories). In some embodiments, the compute block 2000 may include one or more adjacent caches (e.g., high-speed static random access memory (SRAM)), either as an alternative to or in addition to the memories 2004-2006. These components 2002-2006 are placed next to each other on a substrate (e.g., a PCB) 2008 through which the components 2002-2006 are connected (e.g., using wire bonding or a ball grid array). That is, the core array 2002 may connect to the memory 2004 or 2006 through the use of wires. In some embodiments, the substrate 2008 is a more recently-developed type of substrate that allows for fast and higher-bandwidth communication between the components 2002-2006 (e.g., an organic substrate, a glass substrate, etc.). Such technologies have much smaller bumps (e.g., 45-55 microns) between the components and the substrate and allow for significantly finer pitches for metal wires, reducing the need for a silicon interposer.

FIG. 21 conceptually illustrates a compute block 2100 manufactured using a 2.5D packaging technique. This compute block 2100 also has an N×N core array 2102 with adjacent memories 2104 and 2106 (e.g., LPDDR5 or HBM3 memories). In some embodiments, the compute block 2100 may include one or more caches (e.g., high-speed static random access memory (SRAM)), either as an alternative to or in addition to the memories 2004-2006. These components 2102-2106 all sit next to each other on top of a silicon interposer 2108, which sits on top of a PCB 2110. In some embodiments, caches replace the memories 2104-2106 on the silicon interposer 2108, while memories may still sit on the PCB 2110. The silicon interposer enables faster connections between the core array 2102 and the memories 2104 and 2106 directly through the interposer, as compared to the wire bonding used in the 2D packaging example described above. In addition, it should be noted that some embodiments also include a substrate between the PCB 2110 and the silicon interposer 2108.

Some embodiments, rather than using a silicon interposer, use silicon bridges between pairs of components (e.g., one silicon bridge between memory 2104 and core array 2102 and a second silicon bridge between memory 2106 and core array 2102). To incorporate these bridges, some embodiments manufacture the bridges into holes in a substrate (located on top of the PCB 2110). A silicon bridge allows for faster connections like a silicon interposer but is a significantly smaller piece of silicon than an interposer. Current technology limits the size of silicon interposers, but the use of silicon bridges enables larger-area chips to be connected to each other through silicon in some embodiments.

FIG. 22 conceptually illustrates a compute block 2200 manufactured using 3D packaging technique. The compute block 2200 has an N×N core array 2202 with a memory 2204 (e.g., HBM4) stacked on top (these also sit on a PCB 2206). In some embodiments, multiple memory blocks (of the same or different types) and/or cache blocks may be stacked on top or below the core array 2202. In this case, 3D connections are used for fast connection between the cores of the array 2202 and the memory or memories. It should also be noted that, in some embodiments, multiple 3D stacks of components may be connected using silicon interposers, silicon bridges, or directly through substrate.

As described in detail above, various different core arrangements in some embodiments may involve multiple different arrays of SVM cores (i.e., multiple CBs) working together (e.g., as an accelerator). In addition, the above description (e.g., by reference to FIGS. 5-10) discusses the use of one or more leader SVM cores to handle the generation of work items (instruction sets for the worker SVM cores) as well as the scheduling and distribution of these work items.

Figure 23:
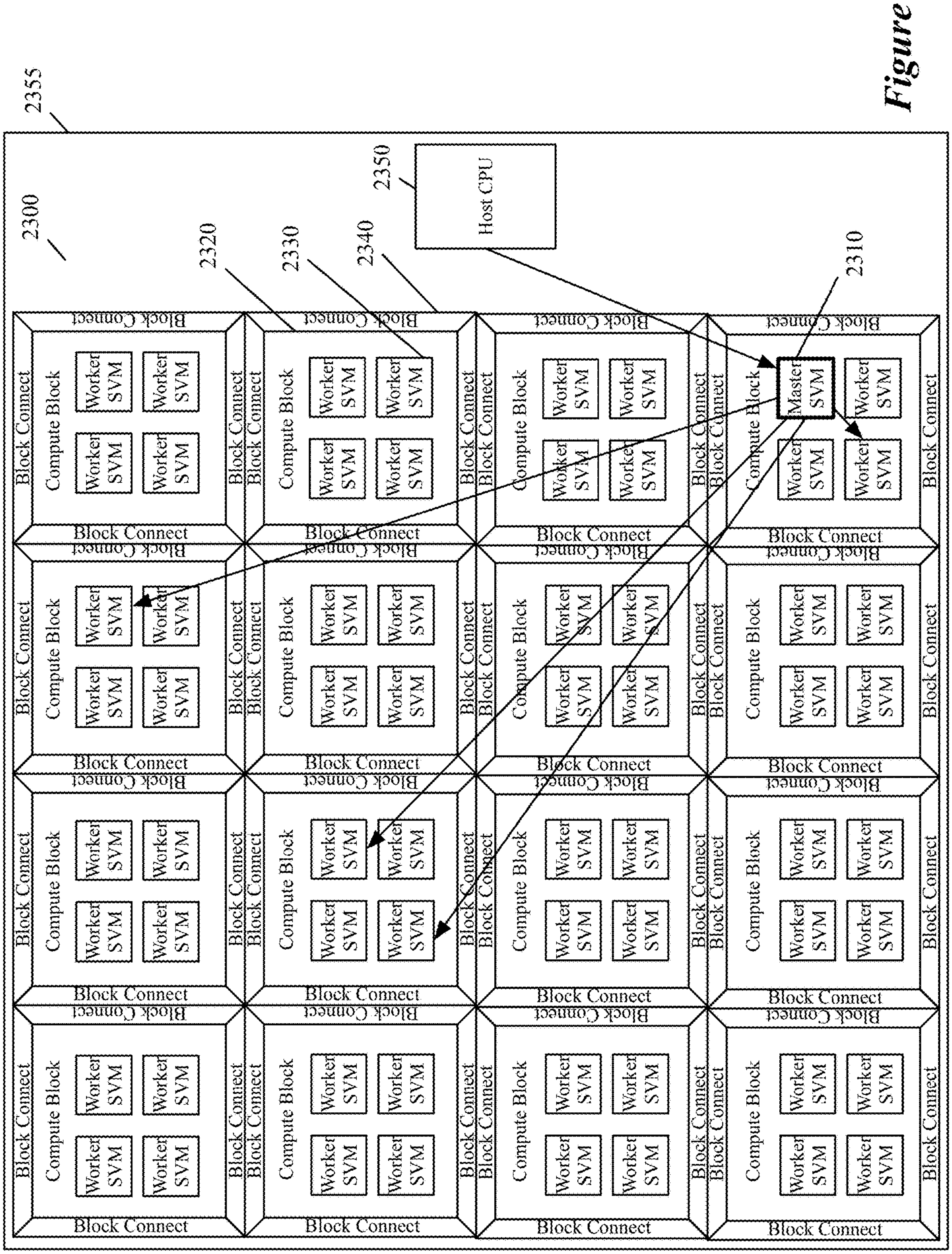
FIG. 23 conceptually illustrates an example CB array for which one SVM core is designated as the leader SVM core to perform work item generation as well as scheduling and distribution for the entire CB array.

For larger systems with multiple CBs, different embodiments use different configurations with respect to how many leader SVM cores are designated. FIG. 23 conceptually illustrates an example CB array 2300 for which one SVM core 2310 is designated as the leader SVM core to perform work item generation as well as scheduling and distribution for the entire CB array 2300. This CB array 2300 can be used for executing large sets of instructions (e.g., scalar, vector, and/or matrix instructions) for a host computer 2355 (e.g., as an accelerator for the host computer 2355). In this example, each CB 2320 of the array 2300 includes four SVM cores 2330, though it should be understood from the above description that various different sizes of core arrays may be included in a CB array in various different embodiments. Each CB 2320 connects to other CBs using block connects 2340 described above (e.g., die interfaces).

A host CPU 2350 of the host computer 2355 uses the CB array 2300 to accelerate execution of various operations in some embodiments. As shown, the host CPU 2350 sends instructions to the designated leader core 2310 of the CB array 2300 for the cores of the CB array to execute. In this example, a single leader SVM core 2310 is designated as the leader for the entire CB array (i.e., for all of the SVM cores of the core arrays). The leader SVM core 2310 performs the generation of work items, including the conversion of instructions from vISA instructions to pISA instructions and the parallelization of instructions, and provides these work items to the worker SVM cores 2330 across the compute blocks 2320 (e.g., using either a push or pull distribution mechanism). In this example, the leader SVM core 2310 provides work items to four of the worker SVM cores 2330, but it can pass instruction sets to any number of worker SVM cores in the CB array 2300.

Figure 24:
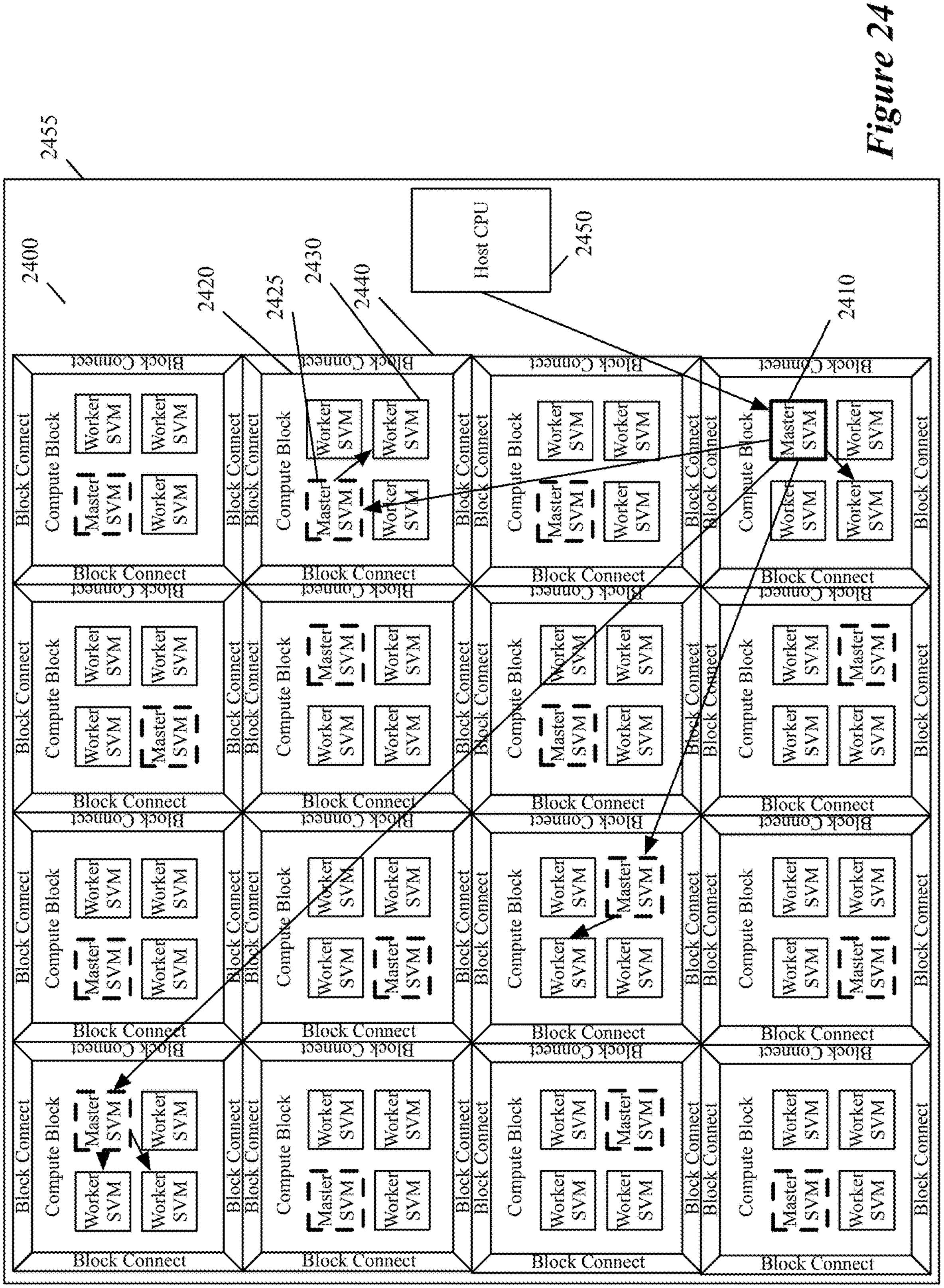
FIG. 24 conceptually illustrates an example CB array for which one primary leader SVM core is designated to perform work item generation along with a set of secondary leader SVM cores that work with the primary leader SVM core to perform scheduling and distribution of the work items.

In other embodiments, each CB (or group of CBs) of a CB array has its own leader SVM core. FIG. 24 conceptually illustrates an example CB array 2400 for which one primary leader SVM core 2410 is designated to perform work item generation along with a set of secondary leader SVM cores 2425 that work with the primary leader SVM core to perform scheduling and distribution of the work items. This CB array 2400 can be used for executing large sets of instructions (e.g., scalar, vector, and/or matrix instructions) for a host computer 2455 (e.g., as an accelerator for the host computer 2455). In this example, each CB 2420 of the array 2400 includes four SVM cores 2430, though it should be understood from the above description that various different sizes of core arrays may be included in a CB array in various different embodiments. Each CB 2420 connects to other CBs using block connects 2340 described above (e.g., die interfaces).

A host CPU 2450 of the host computer 2455 uses the CB array 2400 to accelerate execution of various operations in some embodiments. As shown, the host CPU 2450 sends instructions to the designated primary leader core 2410 of the CB array 2410 for the cores of the CB array to execute. In this example, the primary leader SVM core 2410 performs the generation of work items, including the conversion of instructions from vISA instructions to pISA instructions and the parallelization of instructions. The primary leader core 2410 provides work items to worker SVM cores 2430 of its own core array 2420 and to the secondary leader cores 2425 of the other core arrays. These secondary leader cores 2425 in turn provide work items for execution to the worker cores 2430 of their own core arrays (in both cases, using either a push or pull distribution mechanism). In this example, the leader SVM core 2410 provides work items to secondary leader SVM cores 2425 at three of the other core arrays 2420, but it can pass instruction sets to any number of secondary leader SVM cores in the CB array 2400.

Figure 25:
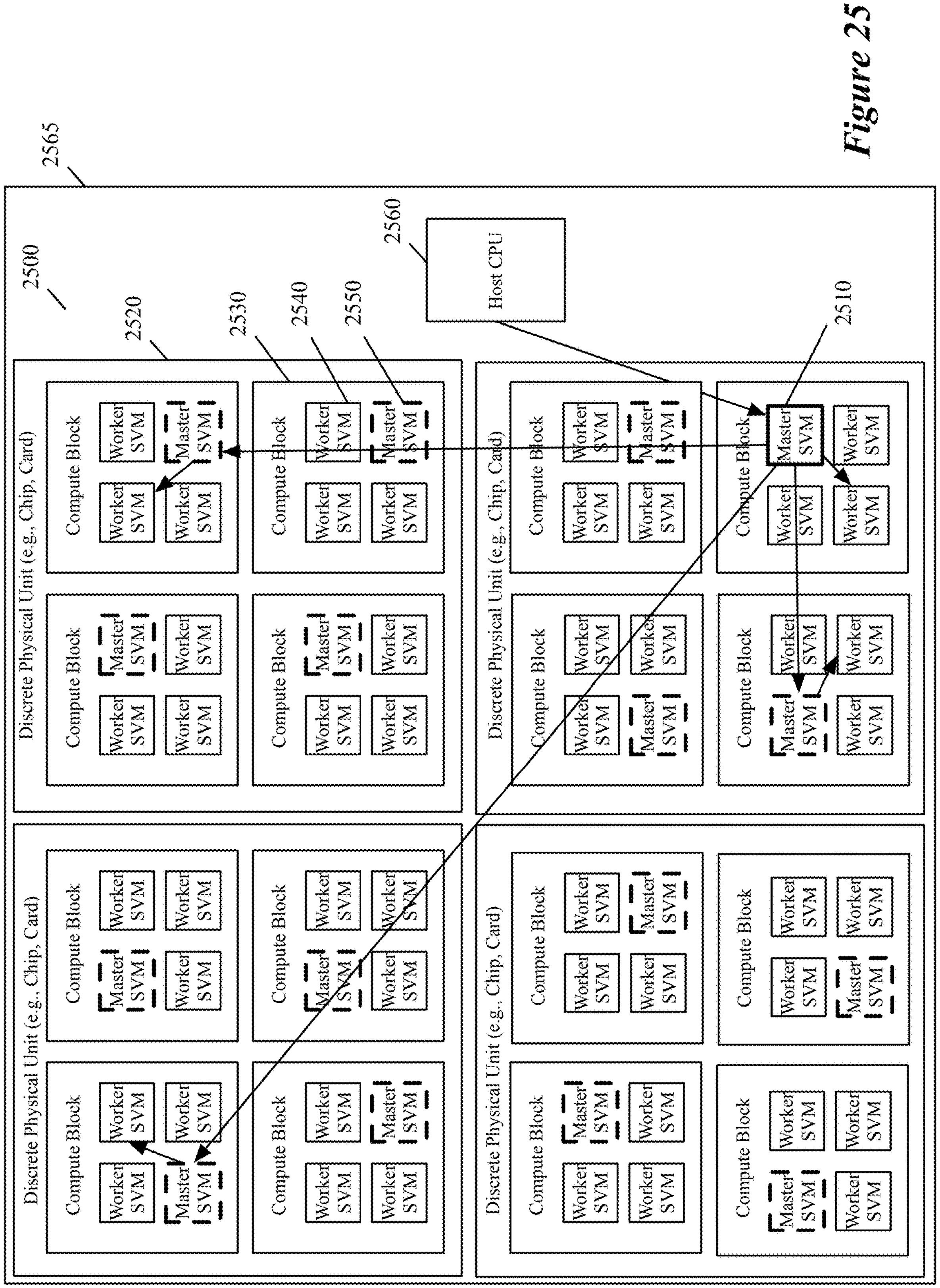
FIG. 25 conceptually illustrates an example set of physical units (each of which includes a CB array) for which one primary leader SVM core is designated to perform work item generation along with a set of secondary leader SVM cores that work with the primary leader SVM core to perform scheduling and distribution of the work items.

As also described above, some embodiments employ multiple CB arrays with each CB array on its own discrete multi compute block physical unit (e.g., card, chip, etc.). In some such embodiments, one SVM core is designated as the primary leader SVM core for the entire core arrangement, with secondary leader SVM cores designated per CB or per CB array to facilitate the distribution of the work items. FIG. 25 conceptually illustrates an example set of physical units 2500 (each of which includes a CB array) for which one primary leader SVM core 2510 is designated to perform work item generation along with a set of secondary leader SVM cores 2525 that work with the primary leader SVM core to perform scheduling and distribution of the work items. This CB array set 2500 can be used for executing large sets of instructions (e.g., scalar, vector, and/or matrix instructions) for a host computer 2555 (e.g., as an accelerator for the host computer 2555). In this example, each discrete physical unit 2520 of the array set 2500 includes four CBs 2530, each of which includes four SVM cores 2540, though it should be understood from the above description that various different sizes of CB arrays and core arrays are possible in various different embodiments.

A host CPU 2550 of the host computer 2555 uses the CB array set 2500 to accelerate execution of various operations in some embodiments. As shown, the host CPU 2550 sends instructions to the designated primary leader core 2510 of the CB arrangement 2500 for the cores of the CB array to execute. In this example, the primary leader SVM core 2510 performs the generation of work items, including the conversion of instructions from vISA instructions to pISA instructions and the parallelization of instructions. The primary leader core 2510 provides work items to worker SVM cores 2430 of its own CB array and to the secondary leader cores 2550 of the other core arrays, both on the same CB array and on other CB arrays. These secondary leader cores 2550 in turn provide work items for execution to the worker cores 2540 of their own core arrays (in both cases, using either a push or pull distribution mechanism). In this example, the leader SVM core 2410 provides work items to secondary leader SVM cores 2425 at three of the other CB arrays 2420, but it can pass instruction sets to any number of secondary leader SVM cores in the CB array 2400. In addition, in other embodiments, a single secondary leader SVM core is designated per CB array for distributing work items to worker cores at any of the other CBs in the CB array.

Figure 26:
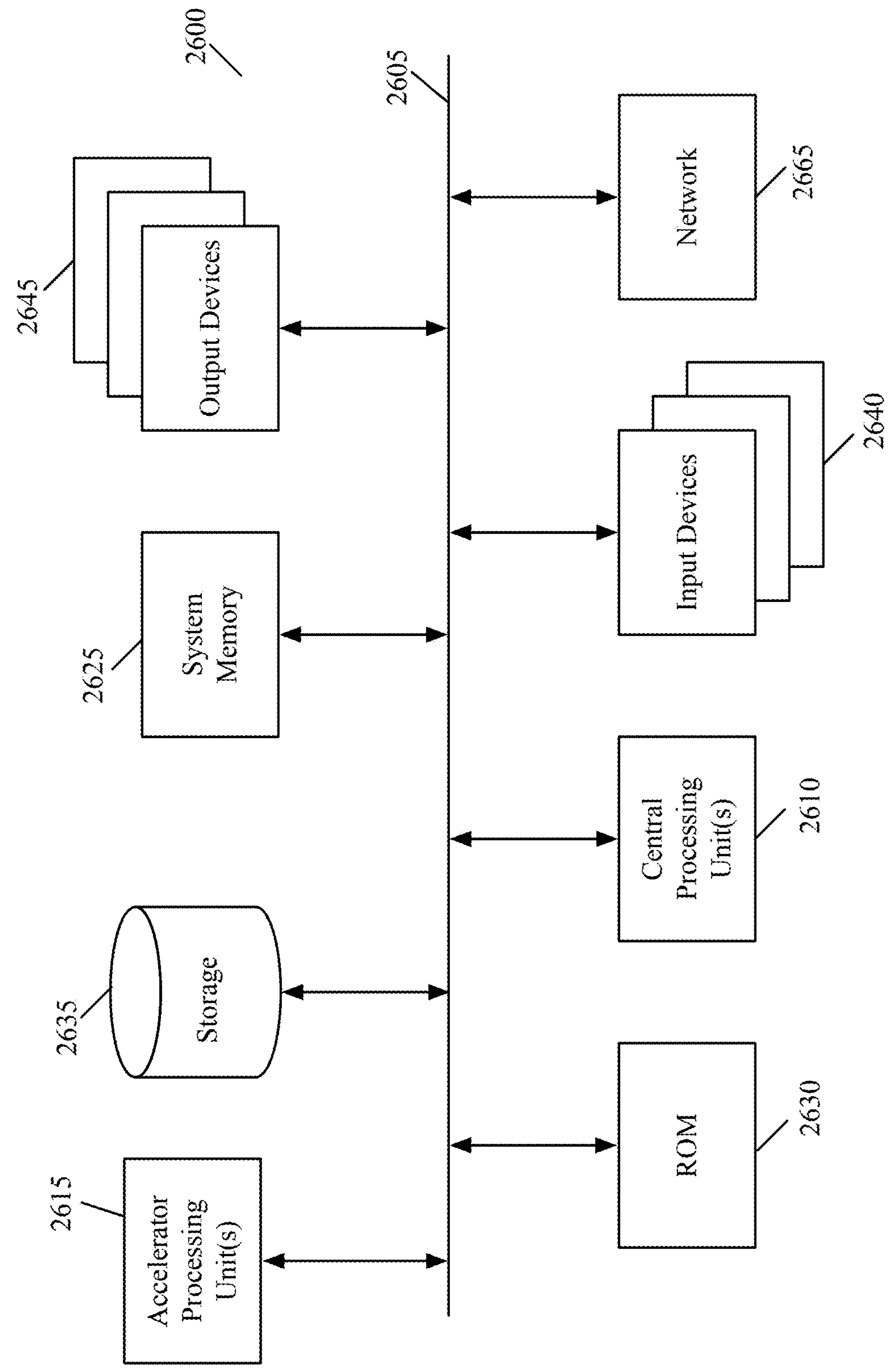
FIG. 26 conceptually illustrates a computer system with which some embodiments of the invention are implemented.

FIG. 26 conceptually illustrates a computer system 2600 with which some embodiments of the invention are implemented. The computer system 2600 can be used to implement any of the above-described computers and servers. As such, it can be used to execute any of the above described processes. This computer system includes various types of non-transitory machine readable media and interfaces for various other types of machine readable media. Computer system 2600 includes a bus 2605, central processing unit(s) 2610, accelerator processing unit(s) 2615, a system memory 2625, a read-only memory 2630, a permanent storage device 2635, input devices 2640, and output devices 2645.

The bus 2605 collectively represents all system, peripheral, and chipset buses that communicatively connect the numerous internal devices of the computer system 2600. For instance, the bus 2605 communicatively connects the central processing unit(s) 2610 with the accelerator processing unit(s) 2615, the read-only memory 2630, the system memory 2625, and the permanent storage device 2635.

From these various memory units, the central processing unit(s) 2610 retrieve instructions to execute and data to process in order to execute the processes of the invention. The processing unit(s) may be a single processor or a multi-core processor in different embodiments. The accelerator processing unit(s) 2615, in some embodiments, may include the various core arrangements described in this application, to which the central processing unit(s) 2610 may dispatch instruction sets for acceleration.

The read-only-memory (ROM) 2630 stores static data and instructions that are needed by the processing unit(s) 2610 and other modules of the computer system. The permanent storage device 2635, on the other hand, is a read-and-write memory device. This device is a non-volatile memory unit that stores instructions and data even when the computer system 2600 is off. Some embodiments of the invention use a mass-storage device (such as a magnetic or optical disk and its corresponding disk drive) as the permanent storage device 2635.

Other embodiments use a removable storage device (such as a flash drive, etc.) as the permanent storage device. Like the permanent storage device 2635, the system memory 2625 is a read-and-write memory device. However, unlike storage device 2635, the system memory is a volatile read-and-write memory, such a random access memory. The system memory stores some of the instructions and data that the processor needs at runtime. In some embodiments, the invention's processes are stored in the system memory 2625, the permanent storage device 2635, and/or the read-only memory 2630. From these various memory units, the processing unit(s) 2610 retrieve instructions to execute and data to process in order to execute the processes of some embodiments.

The bus 2605 also connects to the input and output devices 2640 and 2645. The input devices enable the user to communicate information and select commands to the computer system. The input devices 2640 include alphanumeric keyboards and pointing devices (also called "cursor control devices"). The output devices 2645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 26, bus 2605 also couples computer system 2600 to a network 2665 through a network adapter (not shown). In this manner, the computer can be a part of a network of computers (such as a local area network ("LAN"), a wide area network ("WAN"), or an Intranet, or a network of networks, such as the Internet. Any or all components of computer system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. An integrated circuit (IC) operating on a device comprising a CPU (central processing unit), the IC comprising:

a plurality of processor cores placed in an arrangement on one IC die, the plurality of processor cores forming a multi-core processor system, the plurality of processor cores comprising a leader processor core and a plurality of worker processor cores, and the leader processor core (i) to receive instructions, from the CPU of the device, that the multi-core processor system has to execute and (ii) to distribute sets of instructions to the worker processor cores to execute in order to effectuate the execution of the received instructions, wherein the CPU sends to the leader processor core a particular set of instructions comprising at least (i) a scalar first instruction to be executed by the leader processor core and (ii) a vertex or matrix second instruction to be parallel processed by the worker processor cores of the IC.

2. The IC of claim 1, wherein the leader processor core receives a first set of instructions that the multi-core processor system has to execute, generates a second set of instructions from the first set of instructions, and distributes the second set of instructions to the worker processor cores to process.

3. The IC of claim 1, wherein the leader processor core operates as a bridge core that distributes instructions that the leader processor core receives among the worker processor cores.

4. The IC of claim 2, wherein the leader processor core uses a push model to distribute the second set of instructions among the worker processor cores.

5. The IC of claim 2, wherein the leader processor core uses a pull model to distribute the second set of instructions among the worker processor cores.

6. The IC of claim 4, wherein the leader processor core (i) distributes a particular instruction among a set of two or more worker processor cores by adding a plurality of instances of the particular instruction to a queue accessible by the worker processor cores and (ii) sends a signal to the set of two or more worker processor cores to each retrieve and execute one instance of the particular instruction.

7. The IC of claim 6, wherein at least one worker core in the set of two or more worker cores executes at least two instances of the particular instruction from the queue.

8. The IC of claim 6 further comprising a storage shared by the plurality of processor cores, the shared storage to store the queue of instances of the particular instruction.

9. IC of claim 1, wherein the arrangement is a first array and the plurality of processor cores is a first plurality of processor cores, the IC further comprising:

a second plurality of processor cores placed in a second array, the multi-core processor system comprising the first and second plurality of processor cores, wherein:

the processor cores in the second pluralities of processor cores are worker processor cores; and the leader processor core is to distribute the second set of instructions to the worker processor cores in the first and second pluralities of processor cores to process.

10. The IC of claim 9, wherein the first and second pluralities of processor cores are on the IC die.

11. The IC of claim 9, wherein the IC die is a first IC die and the second plurality of processor cores is on a second IC die.

12. The IC of claim 1, wherein the IC is part of a hardware accelerator of the device that is used by the CPU of the device to accelerate execution of a subset of operations of the device by using the plurality of processor cores.

13. The IC of claim 1, wherein the CPU sends to the leader processor core another set of instructions that should be parallel processed by the processor cores of the IC.

14. The IC of claim 13, wherein the other set of instructions includes vector instructions or matrix instructions for parallel processing on the processor cores of the IC.

15. The IC of claim 1, wherein the CPU sends to the leader processor core another set of instructions comprising a function to be processed by each of a plurality of the processor cores of the IC.

16. The IC of claim 15, wherein the function is to be processed for different data by each of the plurality of processor cores of the IC.

17. The IC of claim 1, wherein the leader core has a similar set of ALUs as the worker cores but has more hardware resources for its set of ALUs than the worker cores.

18. The IC of claim 2, wherein the second set of instructions comprises a plurality of instances of the first set of instructions.

19. The IC of claim 2, wherein the first set of instructions is specified according to a hardware-agnostic virtual instruction set architecture and the second set of instructions is specified according to a hardware-specific physical instruction set architecture.

20. The IC of claim 2, wherein:

the first set of instructions are in a virtual instruction set architecture (ISA) format that is not tied to the specific types of resources of the processor cores; and the second set of instructions are in a physical instruction set architecture (pISA) format that is tied to the specific resources of the first and second sets of worker cores.

21. The IC of claim 1, wherein the leader processor core is also one of the worker processor cores that executes one or more of the instructions distributed by the leader processor core for execution.

22. The IC of claim 1, wherein the leader processor core is not one of the worker processor cores.

* * * * *